US012643370B2

(12) United States Patent
Shiratori et al.

(10) Patent No.: US 12,643,370 B2
(45) Date of Patent: Jun. 2, 2026

(54) THERMAL MANAGEMENT SYSTEM

(71) Applicant: DENSO CORPORATION, Kariya-city (JP)

(72) Inventors: Kosuke Shiratori, Kariya-city (JP); Satoshi Suzuki, Kariya-city (JP); Takahiro Maeda, Kariya-city (JP); Satoshi Nita, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 168 days.

(21) Appl. No.: 18/585,232

(22) Filed: Feb. 23, 2024

(65) Prior Publication Data

US 2024/0190213 A1 Jun. 13, 2024

Related U.S. Application Data

(63) Continuation of application No. PCT/JP2022/030695, filed on Aug. 11, 2022.

(30) Foreign Application Priority Data

Aug. 27, 2021 (JP) ................................. 2021-138774

(51) Int. Cl.
B60H 1/00 (2006.01)
(52) U.S. Cl.
CPC ................................. B60H 1/00907 (2013.01)
(58) Field of Classification Search
CPC .. B60H 1/00907; B60H 1/00278; B60H 1/22;

B60H 1/32284; B60H 2001/00307; F25B 1/00; H01M 10/613; H01M 10/625; H01M 10/651; H01M 10/6569
See application file for complete search history.

(56) References Cited

U.S. PATENT DOCUMENTS

| | | | |
|---|---|---|---|
| 2014/0374081 A1 | 12/2014 | Kakehashi et al. | |
| 2015/0000327 A1 | 1/2015 | Kakehashi et al. | |
| 2016/0339767 A1* | 11/2016 | Enomoto | B60H 1/00864 |
| 2018/0142936 A1 | 5/2018 | Kakehashi et al. | |
| 2021/0291626 A1 | 9/2021 | Makimoto et al. | |

(Continued)

FOREIGN PATENT DOCUMENTS

| | | | |
|---|---|---|---|
| JP | 5880863 B2 | 3/2016 | |
| JP | 2018058573 A | 4/2018 | |

(Continued)

*Primary Examiner* — Marc E Norman
(74) *Attorney, Agent, or Firm* — Harness, Dickey & Pierce, PLC

(57) ABSTRACT

In a thermal management system, a low-temperature side heat medium circuit includes a first circuit, a second circuit, a coupling part, and a flow rate adjustment part. The first circuit includes a first heat exchange unit, and is configured such that a heat medium can circulate via a chiller and the first heat exchange unit. The second circuit includes a second heat exchange unit, and is configured such that the heat medium can circulate via the second heat exchange unit and a heat medium pump. A controller controls an operation of the flow rate adjustment part and adjusts the flow rate of the heat medium in the coupling part, so as to make a temperature zone of the heat medium flowing through the first circuit and a temperature zone of the heat medium flowing through the second circuit have respective determined values.

8 Claims, 19 Drawing Sheets

(56)        References Cited

U.S. PATENT DOCUMENTS

2022/0234416 A1     7/2022   Suzuki et al.
2023/0382195 A1*   11/2023   Yamada ............... B60H 1/3213
2025/0162380 A1*    5/2025   Nakabayashi ..... B60H 1/00885
2025/0196583 A1*    6/2025   Sugimura ............... F25B 41/42

FOREIGN PATENT DOCUMENTS

JP          2020104841 A     7/2020
WO     WO-2021075181 A1     4/2021
WO     WO-2022158153 A1     7/2022

* cited by examiner

FIG. 16

THERMAL MANAGEMENT SYSTEM

CROSS REFERENCE TO RELATED APPLICATION

The present application is a continuation application of International Patent Application No. PCT/JP2022/030695 filed on Aug. 11, 2022, which designated the U.S. and claims the benefit of priority from Japanese Patent Application No. 2021-138774 filed on Aug. 27, 2021. The entire disclosures of all of the above applications are incorporated herein by reference.

TECHNICAL FIELD

The present disclosure relates to a thermal management system that manages, by a heat pump cycle, a plurality of temperature adjustment targets for which respectively different temperature zones are required.

BACKGROUND

Conventionally, two evaporators of an air-conditioning evaporator and a chiller may be connected in parallel in a heat pump cycle, such that the cooling capacity of the heat pump cycle is distributed to the use of cooling air-conditioning ventilation air and the use of cooling a heat medium.

SUMMARY

A thermal management system according to an aspect of the present disclosure includes a heat pump cycle, a low-temperature side heat medium circuit and a controller. The heat pump cycle includes a compressor configured to compress and discharge a refrigerant, a condenser configured to condense the refrigerant discharged from the compressor, a decompression unit configured to decompress the refrigerant flowing out of the condenser, and a chiller configured to exchange heat between the refrigerant decompressed by the decompression unit and a heat medium to evaporate the refrigerant.

The low-temperature side heat medium circuit may be configured to circulate the heat medium cooled by the chiller. The low-temperature side heat medium circuit includes a first circuit, a second circuit, a coupling part and a flow rate adjustment part. The first circuit has a first heat exchange unit configured to cool a first temperature adjustment target by heat exchange between the heat medium cooled by the chiller and the first temperature adjustment target associated with a predetermined first temperature zone. The first circuit is configured to circulate the heat medium via the chiller and the first heat exchange unit.

The second circuit has a second heat exchange unit configured to exchange heat between a second temperature adjustment target associated with a second temperature zone higher than the first temperature zone and the heat medium cooled by the chiller. The second circuit is configured to circulate the heat medium via the second heat exchange unit.

The coupling part is configured to connect the first circuit and the second circuit and to flow in and out of the heat medium. The flow rate adjustment part is configured to adjust a flow rate of the heat medium flowing in and out between the first circuit and the second circuit, in the coupling part. The controller is configured to control an operation of the flow rate adjustment part and to adjust the flow rate of the heat medium in the coupling part, to make a temperature zone of the heat medium flowing through the first circuit and a temperature zone of the heat medium flowing through the second circuit have respective values that are determined respectively. Thus, the thermal management system can create a plurality of different temperature zones by using cold heat created with the single chiller via heat medium circuits.

BRIEF DESCRIPTION OF DRAWINGS

The above object and other objects, features, and advantages of the present disclosure will become more apparent from the following detailed description with reference to the accompanying drawings. In the accompanying drawings:

FIG. 16 is an explanatory view illustrating a flow of the heat medium in an example of a three-circuit linkage mode of the first embodiment;

DESCRIPTION OF EMBODIMENTS

Figure 1:
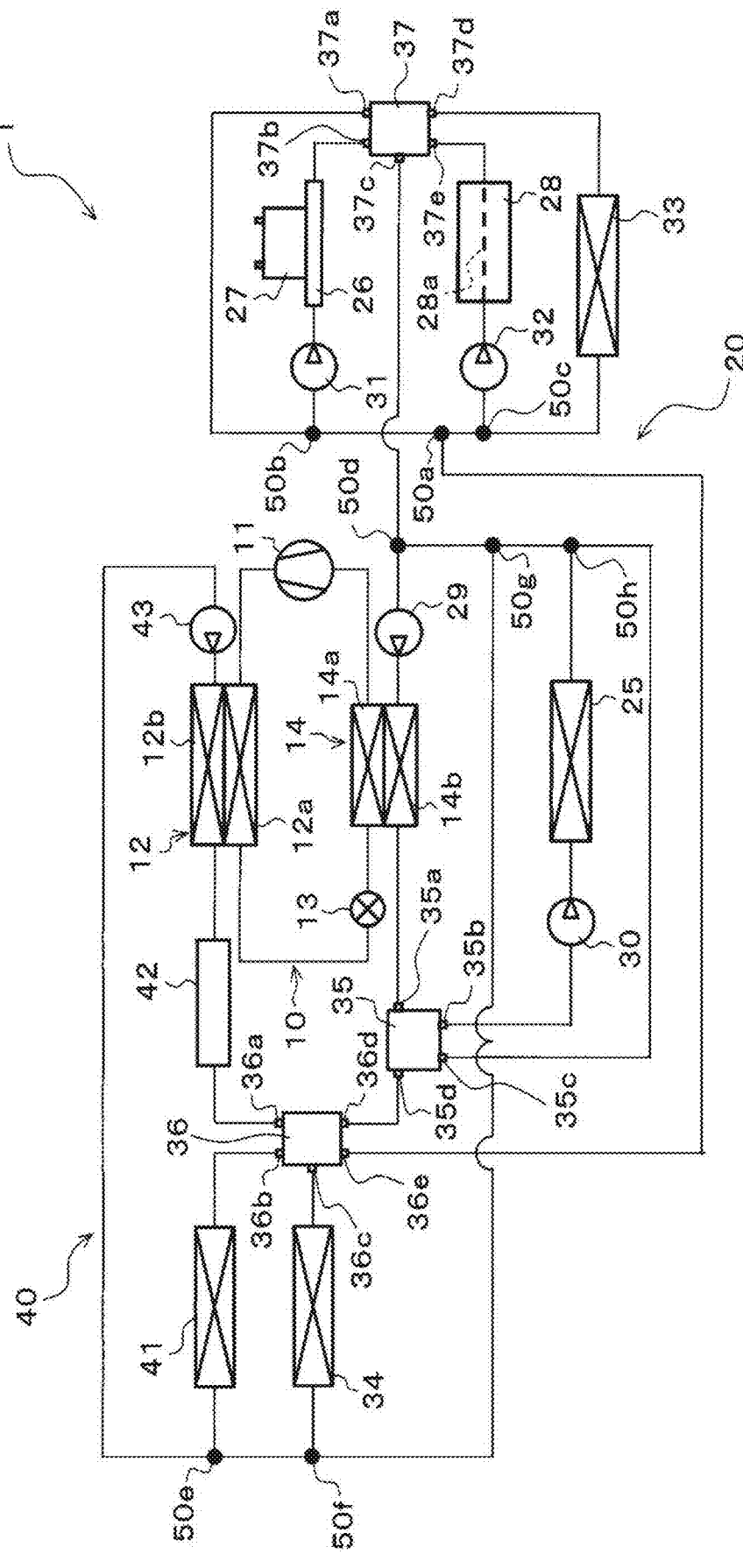
FIG. 1 is an overall configuration view of a thermal management system according to a first embodiment.

For example, two evaporators such as an air-conditioning evaporator and a chiller may be connected in parallel in a heat pump cycle, such that the cooling capacity of the heat pump cycle is distributed to the use of cooling air-conditioning ventilation air and the use of cooling a heat medium.

In such a thermal management system, if an evaporator is not used among a plurality of evaporators, functional components, such as an oil recovery control and a check valve, are added in order to avoid a system failure due to refrigerant or oil stagnation, which may lead to an assumption that the control may become complicated and the cost may increase.

If the use of cold heat, such as air conditioning or battery cooling, is assigned to each of the plurality of evaporators, the temperature zones required for the respective evaporators may be different. In order to create different temperature zones in the plurality of evaporators disposed in parallel in the heat pump cycle, it is necessary to perform intermittent operation while increasing the degree of superheating of the chiller, thereby causing a decrease in efficiency, and securing a refrigerant flow rate necessary for oil return. In the complicated control in such a heat pump cycle, it may be difficult to accurately create a desired temperature zone in each evaporator because a phase change or the like in the refrigerant is interposed.

In the thermal management system, it is also conceivable to deal with the uses of clod heat, such as air conditioning and battery cooling, by using heat medium circuits through which a heat medium cooled by the chiller circulates. However, the chiller can create only one temperature zone of cold heat, and thus if any one of the requirements is met, the other requirements cannot be met. Therefore, it may be difficult to deal with temperature zones related to a plurality of uses.

In view of the above points, an object of the present disclosure is to provide a thermal management system that can simplify the configuration and control of a heat pump cycle and create a plurality of different temperature zones via heat medium circuits.

A thermal management system according to an exemplar of the present disclosure includes a heat pump cycle, a low-temperature side heat medium circuit and a controller. The heat pump cycle includes a compressor configured to compress and discharge a refrigerant, a condenser configured to condense the refrigerant discharged from the compressor, a decompression unit configured to decompress the refrigerant flowing out of the condenser, and a chiller configured to exchange heat between the refrigerant decompressed by the decompression unit and a heat medium to evaporate the refrigerant.

The low-temperature side heat medium circuit is configured to circulate therein the heat medium cooled by the chiller. The low-temperature side heat medium circuit includes a first circuit, a second circuit, a coupling part and a flow rate adjustment part. The first circuit has a first heat exchange unit configured to cool a first temperature adjustment target by heat exchange between the heat medium cooled by the chiller and the first temperature adjustment target associated with a predetermined first temperature zone. The first circuit is configured to circulate the heat medium via the chiller and the first heat exchange unit.

The second circuit has a second heat exchange unit configured to exchange heat between a second temperature adjustment target associated with a second temperature zone higher than the first temperature zone and the heat medium cooled by the chiller. The second circuit is configured to circulate the heat medium via the second heat exchange unit.

The coupling part is configured to connect the first circuit and the second circuit and to flow in and out of the heat medium. The flow rate adjustment part is configured to adjust a flow rate of the heat medium flowing in and out between the first circuit and the second circuit, in the coupling part. The controller is configured to control an operation of the flow rate adjustment part and to adjust the flow rate of the heat medium in the coupling part, to make a temperature zone of the heat medium flowing through the first circuit and a temperature zone of the heat medium flowing through the second circuit have respective values that are determined respectively.

According to the thermal management system, the flow rate adjustment part adjusts the flow rate of the heat medium flowing through the coupling part, so that the temperature zone of the heat medium flowing through the first circuit and the temperature zone of the heat medium flowing through the second circuit can be respectively adjusted to predetermined values using the heat medium cooled by the single chiller. As a result, the thermal management system can distribute a cooling capability realized by the single chiller to the first heat exchange unit and the second heat exchange unit by the flow rate of the heat medium flowing through the coupling part, and can realize the distribution of the cooling capacity in a simple control aspect than in the case of the distribution in a vapor compression refrigeration cycle or the like. Thus, the thermal management system can create a plurality of different temperature zones by using cold heat created with the single chiller via heat medium circuits.

Hereinafter, a plurality of embodiments for carrying out the present disclosure will be described with reference to the drawings. In each embodiment, parts corresponding to the matters described in the preceding embodiments are denoted by the same reference numerals, and redundant description may be omitted. In a case where only a part of a configuration is described in each embodiment, the other embodiments described precedingly can be applied to the other parts of the configuration. It is possible not only to combine parts that respective embodiments specifically state that they can be combined, but also to partially combine embodiments even if not explicitly stated as long as there are no problems with the combination.

First Embodiment

First, a first embodiment of the present disclosure will be described with reference to the drawings. A thermal management system 1 according to the first embodiment is mounted on an electric car that is a vehicle that obtains traveling driving force from an electric motor. In the electric car, the thermal management system 1 performs air conditioning of the vehicle interior, a space to be air conditioned, and has an in-vehicle equipment temperature control function of adjusting the temperature of a battery 27 and cooling in-vehicle equipment. That is, the thermal management system 1 can also be referred to as an air conditioner with the equipment temperature control function.

The battery 27 is a secondary battery that stores power supplied to the in-vehicle equipment such as the electric motor, and is, for example, a lithium ion battery. The battery 27 is a so-called assembled battery formed by disposing a plurality of battery cells in a stacked state and electrically connecting these battery cells in series or in parallel.

In this type of battery, input and output are limited at a low temperature, and output is likely to decrease at a high temperature. Therefore, the temperature of the battery needs to be maintained within an appropriate temperature range (in the present embodiment, 5° C. or higher and 55° C. or lower) in which the charge/discharge capacity of the battery can be sufficiently utilized.

In addition, in the battery 27 of this type, the deterioration of the cells constituting the battery 27 proceeds more easily as the temperature of the battery 27 becomes higher. In other words, when the temperature of the battery 27 is maintained at a certain low temperature, the deterioration of the battery 27 can be suppressed from proceeding. Therefore, in the thermal management system 1, the battery 27 can be cooled by cold heat created with a heat pump cycle 10.

On the electric car according to the present embodiment, an inverter, a motor generator, a transaxle device, and the like are mounted as examples of heat generating equipment that generates heat during operation. The inverter is a power conversion part that converts a direct current into an alternating current. The motor generator outputs the traveling driving force by being supplied with power, and generates regenerative power during deceleration or the like. The transaxle device is a device in which a transmission and a final gear/differential gear (differential gear) are integrated.

In order to effectively utilize the waste heat occurring as this heat generating equipment are operated, the thermal management system 1 is configured to recover the waste heat occurring in the heat generating equipment by using the heat pump cycle 10.

As illustrated in FIG. 1, the thermal management system 1 according to the first embodiment includes the heat pump cycle 10, a low-temperature side heat medium circuit 20, a high-temperature side heat medium circuit 40, an interior air conditioning unit 60, a control device 70, and the like. The heat pump cycle 10 can cool or heat a heat medium circulating through the low-temperature side heat medium circuit 20 or the high-temperature side heat medium circuit 40 by heat exchange with a refrigerant.

The heat pump cycle 10 includes, as components, a compressor 11, a water-refrigerant heat exchanger 12, an expansion valve 13, and a chiller 14. In the heat pump cycle 10, an HFO refrigerant (specifically, R1234yf) is adopted as the refrigerant. The heat pump cycle 10 constitutes a vapor compression subcritical refrigeration cycle in which the pressure of the high-pressure refrigerant discharged from the compressor 11 does not exceed the critical pressure of the refrigerant. Refrigerator oil (specifically, PAG oil) for lubricating the compressor 11 is mixed in the refrigerant. A part of the refrigerator oil circulates through the cycle together with the refrigerant.

The compressor 11 sucks, compresses, and discharges the refrigerant in the heat pump cycle 10. The compressor 11 is disposed in a drive device room on the front side of the vehicle interior. The drive device room forms a space where at least a part of a drive device (e.g., the electric motor) for outputting the traveling driving force is disposed.

The compressor 11 is an electric compressor in which a fixed capacity type compression mechanism having a fixed discharge capacity is rotationally driven by the electric motor. The rotation speed (i.e., the refrigerant discharge capacity) of the compressor 11 is controlled by a control signal output from the control device 70 to be described later.

The refrigerant inlet side of the water-refrigerant heat exchanger 12 is connected to the discharge port of the compressor 11. The water-refrigerant heat exchanger 12 includes a refrigerant passage 12a that causes the high-pressure refrigerant discharged from the compressor 11 to flow through and a heat medium passage 12b that causes the heat medium circulating through the high-temperature side heat medium circuit 40 to flow through.

The water-refrigerant heat exchanger 12 is a heating heat exchanger that exchanges heat between the high-pressure refrigerant flowing through the refrigerant passage 12a and the heat medium flowing through the heat medium passage 12b to heat the heat medium by the heat of the high-pressure refrigerant. The water-refrigerant heat exchanger 12 condenses the high-pressure refrigerant flowing through the refrigerant passage 12a by the heat exchange with the heat medium flowing through the heat medium passage 12b, and thus the water-refrigerant heat exchanger 12 corresponds to an example of a condenser.

The expansion valve 13 is connected to the outlet of the refrigerant passage 12a in the water-refrigerant heat exchanger 12. The expansion valve 13 is a decompression unit that decompresses the refrigerant having flowed out of the refrigerant passage 12a in the water-refrigerant heat exchanger 12 and adjusts the flow rate of the refrigerant that is caused to flow out to the downstream side. The expansion valve 13 is an electric variable throttle mechanism including a valve body configured to be capable of changing a throttle opening degree and an electric actuator (specifically, a stepping motor) that displaces the valve body. The operation of the expansion valve 13 is controlled by a control signal (specifically, a control pulse) output from the control device 70.

The inlet side of a refrigerant passage 14a in the chiller 14 is connected to the refrigerant outlet of the expansion valve 13. The chiller 14 includes the refrigerant passage 14a that causes the low-pressure refrigerant decompressed by the expansion valve 13 to flow through and a heat medium passage 14b that causes the heat medium circulating through the low-temperature side heat medium circuit 20 to flow through. The chiller 14 is an evaporation part that exchanges heat between the low-pressure refrigerant flowing through the refrigerant passage 14a and the heat medium flowing through the heat medium passage 14b to evaporate the low-pressure refrigerant so as to exert an endothermic action. The suction port side of the compressor 11 is connected to the outlet side of the refrigerant passage 14a in the chiller 14.

That is, the heat pump cycle 10 according to the first embodiment is a refrigeration cycle in which the compressor 11, the water-refrigerant heat exchanger 12, the expansion valve 13, and the chiller 14 are connected, and a simple configuration can be realized.

Next, a configuration of the low-temperature side heat medium circuit 20 in the thermal management system 1 according to the first embodiment will be described with reference to the drawings. The low-temperature side heat medium circuit 20 is a heat medium circulation circuit through which the heat medium cooled by the chiller 14 circulates. As the heat medium, a solution containing ethylene glycol, dimethylpolysiloxane, nano-fluid, or the like, an antifreeze solution, or the like can be adopted.

As illustrated in FIG. 1, the low-temperature side heat medium circuit 20 is configured by connecting, with heat medium flow paths, a cooler core 25, a battery heat exchange unit 26, an equipment heat exchange unit 28, a first low-temperature side pump 29 to a fourth low-temperature side pump 32, a first outside air heat exchanger 33, a second outside air heat exchanger 34, and the like.

The low-temperature side heat medium circuit 20 includes, as circulation circuits that can each independently circulate the heat medium cooled by the chiller 14, an air cooling circuit 20a, a battery temperature control circuit 20b, an equipment waste heat recovery circuit 20c, and an outside air heat absorption circuit 20d. Configurations of these circulation circuits will be described later. The low-temperature side heat medium circuit 20 according to the first embodiment is configured by connecting, with heat medium flow paths, among the air cooling circuit 20a, the battery temperature control circuit 20b, the equipment waste heat recovery circuit 20c, and the outside air heat absorption circuit 20d in a way in which the heat medium can flow in and out.

In the low-temperature side heat medium circuit 20, the discharge port side of the first low-temperature side pump 29 is connected to the inlet side of the heat medium passage 14b in the chiller 14, as illustrated in FIG. 1. The first low-temperature side pump 29 is a heat medium pump that sucks and discharges the heat medium flowing through the low-temperature side heat medium circuit 20, and for example, an electric water pump can be adopted. The first low-temperature side pump 29 pumps the heat medium toward the inlet side of the heat medium passage 14b in the chiller 14.

A first inflow-outlet 35a of a four-way valve 35 is connected to the outlet side of the heat medium passage 14b in the chiller 14. The four-way valve 35 is a flow regulating valve including four heat medium inflow-outlets of the first inflow-outlet 35a to a fourth inflow-outlet 35d. The four-way valve 35 adjusts the flow rate of the heat medium that has flowed in from any one of the first inflow-outlet 35a to the fourth inflow-outlet 35d and flows out of the other inflow-outlets.

The four-way valve 35 can switch a flow path configuration for the heat medium flowing through the low-temperature side heat medium circuit 20 by adjusting the flow rate of the heat medium flowing through the first inflow-outlet 35a to the fourth inflow-outlet 35d. Therefore, the four-way valve 35 also functions as a flow path switching part.

The suction port side of the second low-temperature side pump 30 is connected to the second inflow-outlet 35b of the four-way valve 35. The heat medium outlet side of the cooler core 25 is connected to the third inflow-outlet 35c of the four-way valve 35 via an eighth connection part 50h to be described later.

The second low-temperature side pump 30 is a heat medium pump that sucks and discharges the heat medium having flowed out of the second inflow-outlet 35b of the four-way valve 35, and can adopt the same configuration as that of the first low-temperature side pump 29. The second low-temperature side pump 30 pumps the heat medium toward the heat medium inlet side of the cooler core 25.

The cooler core 25 is a cooling heat exchange unit that exchanges heat between the heat medium flowing through the low-temperature side heat medium circuit 20 and ventilation air to be supplied to the vehicle interior, a space to be air conditioned, in order to cool the ventilation air. The cooler core 25 is disposed inside an interior air conditioning unit 60 to be described later, and causes the heat medium to absorb heat from the ventilation air to be blown into the vehicle interior.

The fourth inflow-outlet 36d side of a first five-way valve 36 is connected to the fourth inflow-outlet 35d of the four-way valve 35. The first five-way valve 36 is a flow regulating valve including a first inflow-outlet 36a to a fifth inflow-outlet 36e. The first five-way valve 36 adjusts the flow rate of the heat medium that has flowed in from the first inflow-outlet 36a or the fourth inflow-outlet 36d and flows out of the second inflow-outlet 36b, the third inflow-outlet 36c, and the fifth inflow-outlet 36e. The first five-way valve 36 can be formed by, for example, combining a plurality of three-way flow regulating valves.

The heat medium inlet side of the second outside air heat exchanger 34 is connected to the third inflow-outlet 36c of the first five-way valve 36. The second outside air heat exchanger 34 is an outside air heat exchanger that exchanges heat between the heat medium having flowed out of the third inflow-outlet 36c of the first five-way valve 36 and the outside air outside the vehicle interior.

The second outside air heat exchanger 34 functions as a heat absorber that causes the heat medium to absorb the heat of the outside air when the temperature of the heat medium is lower than the outside air temperature, and functions as a radiator that causes the heat of the heat medium to be dissipated to the outside air when the temperature of the heat medium is higher than the outside air temperature. The heat medium outlet of the second outside air heat exchanger 34 is connected to the suction port side of the first low-temperature side pump 29 via a sixth connection part 50f, a seventh connection part 50g, and a fourth connection part 50d to be described later.

The heat medium outlet side of an electric heater 42 is connected to the first inflow-outlet 36a of the first five-way valve 36. The heat medium inlet side of a heater core 41 is connected to the second inflow-outlet 36b of the first five-way valve 36.

A first connection part 50a is connected to the fifth inflow-outlet 36e of the first five-way valve 36. The first connection part 50a is formed in a three-way joint shape including three inflow-outlets communicating with each other. As the first connection part 50a, a joint member formed by joining a plurality of pipes, or a joint member formed by providing a plurality of refrigerant passages in a metal block or a resin block, can be adopted.

As described above, the fifth inflow-outlet 36e of the first five-way valve 36 is connected to one of the inflow-outlets of the first connection part 50a. The suction port side of a third low-temperature side pump 31 is connected to another of the inflow-outlets of the first connection part 50a via a second connection part 50b. The suction port side of the fourth low-temperature side pump 32 is connected to yet another of the inflow-outlets of the first connection part 50a via a third connection part 50c.

Here, the thermal management system 1 according to the first embodiment includes the second connection part 50b to an eighth connection part 50h. The configurations of the second connection part 50b to the eighth connection part 50h are the same as that of the first connection part 50a, and are formed in a three-way joint shape including three inflow-outlets communicating with each other.

The third low-temperature side pump 31 is a heat medium pump that sucks and discharges the heat medium having flowed through the second connection part 50b, and can adopt the same configuration as that of the first low-temperature side pump 29. The heat medium inlet side of the battery heat exchange unit 26 is connected to the discharge port of the third low-temperature side pump 31. Therefore, the third low-temperature side pump 31 pumps the heat medium toward the heat medium inlet side of the battery heat exchange unit 26.

The battery heat exchange unit 26 is a heat exchange unit for adjusting the temperature of the battery 27 by exchanging heat between the heat medium having flowed through the second connection part 50b and the battery cells constituting the battery 27. Inside the battery heat exchange unit 26, a heat medium passage, in which a plurality of passages are connected in parallel, is formed. As a result, the heat medium passage in the battery heat exchange unit 26 is formed such that waste heat of the battery 27 can be uniformly absorbed from the entire area of the battery 27. In other words, the heat medium passage in the battery heat exchange unit 26 is formed to uniformly absorb the heat of all the battery cells and uniformly cool all the battery cells. A second inflow-outlet 37b of a second five-way valve 37 is connected to the heat medium outlet side of the battery heat exchange unit 26.

Since the battery 27 generates heat during operation (i.e., during charging and discharging), it corresponds to an example of the heat generating equipment. Therefore, the battery heat exchange unit 26 exchanges heat between the heat medium and the heat generating equipment, and thus it corresponds to an example of the equipment heat exchange unit.

Note that the battery heat exchange unit 26 may be formed by disposing the heat medium passage between the battery cells disposed in a stacked state. Alternatively, the battery heat exchange unit 26 may be formed integrally with the battery 27. The battery heat exchange unit may be formed integrally with the battery 27 by, for example, providing the heat medium passage in a dedicated case that houses the battery cells disposed in a stacked state.

The fourth low-temperature side pump 32 is a heat medium pump that sucks and discharges the heat medium having flowed out of the third connection part 50c, and can adopt the same configuration as that of the first low-temperature side pump 29. The heat medium inlet side of the equipment heat exchange unit 28 is connected to the discharge port of the fourth low-temperature side pump 32. Therefore, the fourth low-temperature side pump 32 pumps the heat medium toward the heat medium inlet side of the equipment heat exchange unit 28.

The equipment heat exchange unit 28 is a heat exchange unit that is mounted on the electric car and exchanges heat between the heat generating equipment that generates heat during operation and the heat medium having flowed through the third connection part 50c. As described above, examples of the heat generating equipment in the present embodiment include an inverter, a motor generator, and a transaxle device.

The equipment heat exchange unit 28 is configured by forming the heat medium passage, through which the heat medium having flowed out of the third connection part 50c flows, in a housing part or a case part forming an outer shell for each of an inverter, a motor generator, a transaxle device, and the like that are the heat generating equipment. As a result, when passing through the heat medium passage formed in the housing part or the like, the heat medium exchanges heat with each heat generating equipment, so that waste heat occurring in the heat generating equipment can be recovered by the heat medium. The heat medium outlet of the equipment heat exchange unit 28 is connected to a fifth inflow-outlet 37e side of the second five-way valve 37.

Here, the second five-way valve 37 is a flow regulating valve including a first inflow-outlet 37a to the fifth inflow-outlet 37e. The second five-way valve 37 adjusts the flow rate of the heat medium that has flowed in from the second inflow-outlet 37b or the fifth inflow-outlet 37e and flows out of the first inflow-outlet 37a, the third inflow-outlet 37c, and the fourth inflow-outlet 37d. The second five-way valve 37 can be formed by, for example, combining a plurality of three-way flow regulating valves, similarly to the first five-way valve 36. The suction port side of the first low-temperature side pump 29 is connected to the third inflow-outlet 37c of the second five-way valve 37 via the fourth connection part 50d.

The suction port side of the third low-temperature side pump 31 is connected to the first inflow-outlet 37a of the second five-way valve 37 via the second connection part 50b. Therefore, in the thermal management system 1, the heat medium can be circulated via the third low-temperature side pump 31, the battery heat exchange unit 26, and the second five-way valve 37, which can constitute the battery temperature control circuit 20b.

The heat medium inlet side of the first outside air heat exchanger 33 is connected to the fourth inflow-outlet 37d of the second five-way valve 37. The first outside air heat exchanger 33 is an outside air heat exchanger that exchanges heat between the heat medium having flowed out of the fourth inflow-outlet 37d of the second five-way valve 37 and the outside air. Therefore, the first outside air heat exchanger 33 can dissipate the heat of the heat medium having flowed out of the fourth inflow-outlet 37d to the outside air.

The suction port side of the fourth low-temperature side pump 32 is connected to the heat medium outlet of the first outside air heat exchanger 33 via the third connection part 50c. Therefore, according to the thermal management system 1, the heat medium can be circulated via the fourth low-temperature side pump 32, the equipment heat exchange unit 28, and the second five-way valve 37, which can constitute the equipment waste heat recovery circuit 20c.

Subsequently, a configuration of the high-temperature side heat medium circuit 40 in the thermal management system 1 according to the first embodiment will be described with reference to the drawings. The high-temperature side heat medium circuit 40 is a heat medium circulation circuit through which the heat medium heated by the water-refrigerant heat exchanger 12 circulates.

The discharge port of a high-temperature side pump 43 is connected to the inlet side of the heat medium passage 14b in the water-refrigerant heat exchanger 12. The high-temperature side pump 43 is a heat medium pump that sucks and discharges the heat medium having flowed out of the third connection part 50*c*, and can adopt the same configuration as that of the first low-temperature side pump 29 or the like. Therefore, the high-temperature side pump 43 pumps the heat medium toward the inlet side of the heat medium passage 12*b* in the water-refrigerant heat exchanger 12.

The heat medium inlet side of the electric heater 42 is connected to the outlet side of the heat medium passage 14*b* in the water-refrigerant heat exchanger 12. The electric heater 42 includes a heat medium passage through which the heat medium having flowed out of the water-refrigerant heat exchanger 12 flows, and is a heating unit that heats the heat medium passing through the heat medium passage.

In the present embodiment, a PTC heater, including a PTC element that generates heat by being supplied with power, is adopted as the electric heater 42. The calorific value of the electric heater 42 is controlled by a control voltage output from the control device 70. The first inflow-outlet 36*a* of the first five-way valve 36 is connected to the heat medium outlet side of the electric heater 42.

The heat medium inlet side of the heater core 41 is connected to the second inflow-outlet 36*b* of the first five-way valve 36. The heater core 41 is disposed in the interior air conditioning unit 60, and is a heating heat exchange unit that exchanges heat between the heat medium having flowed out of the second inflow-outlet 36*b* and the ventilation air to be supplied to the vehicle interior. In the heater core 41, the heat of the heat medium is dissipated to the ventilation air to heat the ventilation air. The suction port side of the high-temperature side pump 43 is connected to the heat medium outlet of the heater core 41 via a fifth connection part 50*e*.

Here, in the thermal management system 1 according to the first embodiment, the first connection part 50*a* to the eighth connection part 50*h* having a three-way joint shape are disposed in the heat medium circuits. Connection destinations of each of the first connection part 50*a* to the eighth connection part 50*h* will be described.

First, one of the inflow-outlets of the first connection part 50*a* is connected to the fifth inflow-outlet 36*e* of the first five-way valve 36. Another of the inflow-outlets of the first connection part 50*a* is connected to one of the inflow-outlets of the second connection part 50*b*. Yet another of the inflow-outlets of the first connection part 50*a* is connected to one of the inflow-outlets of the third connection part 50*c*.

Next, the one of the inflow-outlets of the second connection part 50*b* is connected to the another of the inflow-outlets of the first connection part 50*a*, as described above. Another of the inflow-outlets of the second connection part 50*b* is connected to the suction port side of the third low-temperature side pump 31. Yet another of the inflow-outlets of the second connection part 50*b* is connected to the first inflow-outlet 37*a* of the second five-way valve 37.

As described above, the one of the inflow-outlets of the third connection part 50*c* is connected to the yet another of the inflow-outlets of the first connection part 50*a*. Another of the inflow-outlets of the third connection part 50*c* is connected to the suction port side of the fourth low-temperature side pump 32. Yet another of the inflow-outlets of the third connection part 50*c* is connected to the fourth inflow-outlet 37*d* of the second five-way valve 37.

Subsequently, one of the inflow-outlets of the fourth connection part 50*d* is connected to the third inflow-outlet 37*c* of the second five-way valve 37. Another of the inflow-outlets of the fourth connection part 50*d* is connected to another of the inflow-outlets of the seventh connection part 50*g*. Yet another of the inflow-outlets of the fourth connection part 50*d* is connected to the suction port side of the first low-temperature side pump 29.

One of the inflow-outlets of the fifth connection part 50*e* is connected to the heat medium outlet side of the heater core 41. Another of the inflow-outlets of the fifth connection part 50*e* is connected to the suction port side of the high-temperature side pump 43. Yet another of the inflow-outlets of the fifth connection part 50*e* is connected to another of the inflow-outlets of the sixth connection part 50*f*.

One of the inflow-outlets of the sixth connection part 50*f* is connected to the heat medium outlet side of the second outside air heat exchanger 34. Another of the inflow-outlets of the sixth connection part 50*f* is connected to one of the inflow-outlets of the seventh connection part 50*g*. As described above, yet another of the inflow-outlets of the sixth connection part 50*f* is connected to the yet another of the inflow-outlets of the fifth connection part 50*e*.

Next, one of the inflow-outlets of the seventh connection part 50*g* is connected to the another of the inflow-outlets of the sixth connection part 50*f*, as described above. The another of the inflow-outlets of the seventh connection part 50*g* is connected to the another of the inflow-outlets of the fourth connection part 50*d*. Yet another of the inflow-outlets of the seventh connection part 50*g* is connected to another of the inflow-outlets of the eighth connection part 50*h*.

One of the inflow-outlets of the eighth connection part 50*h* is connected to the heat medium outlet side of the cooler core 25. Yet another of the inflow-outlets of the eighth connection part 50*h* is connected to the third inflow-outlet 35*c* of the four-way valve 35. As described above, the another of the inflow-outlets of the eighth connection part 50*h* is connected to the yet another of the inflow-outlets of the seventh connection part 50*g*.

Figure 2:
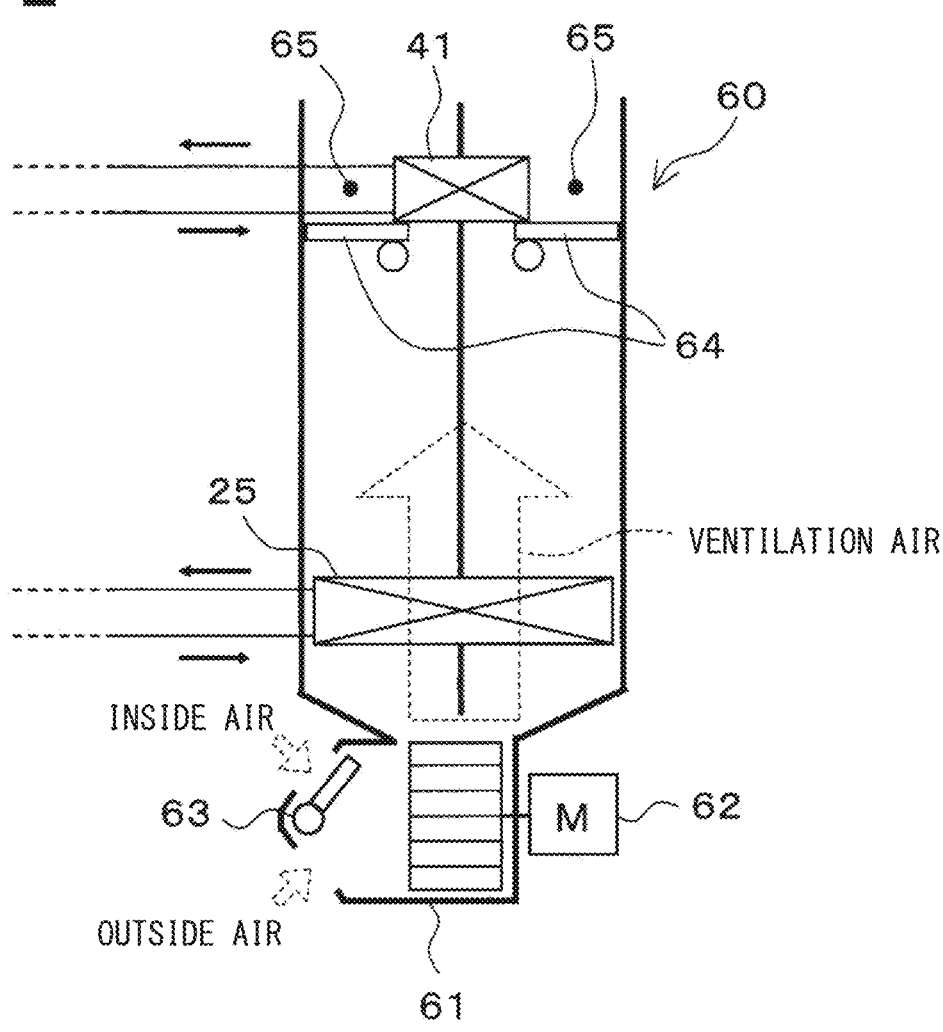
FIG. 2 is a configuration view of an interior air conditioning unit in the thermal management system.

Next, the interior air conditioning unit 60 constituting the thermal management system 1 will be described with reference to FIG. 2. The interior air conditioning unit 60 is for blowing out the ventilation air, the temperature of which has been adjusted by the heat pump cycle 10, into the vehicle interior. The interior air conditioning unit 60 is disposed inside an instrument panel in the foremost part of the vehicle interior.

The interior air conditioning unit 60 houses a blower 62, the cooler core 25, the heater core 41, and the like in an air passage formed in a casing 61 forming the outer shell of the interior air conditioning unit. The casing 61 forms the air passage for the ventilation air to be blown into the vehicle interior. The casing 61 is formed of a resin (e.g., polypropylene) having a certain degree of elasticity and an excellent strength.

An inside/outside air switching device 63 is disposed on the most upstream side, in the ventilation air flow, of the casing 61. The inside/outside air switching device 63 switches between inside air (air inside the vehicle interior) and outside air (air outside the vehicle interior) to introduce the air into the casing 61.

The inside/outside air switching device 63 continuously adjusts, with an inside/outside air switching door, opening areas of an inside air introduction port, through which the inside air is introduced into the casing 61, and an outside air introduction port, through which the outside air is introduced, to change an introduction ratio between an introduction air volume of the inside air and an introduction air volume of the outside air. The inside/outside air switching door is driven by an electric actuator for the inside/outside air switching door. The operation of the electric actuator is controlled by a control signal output from the control device 70.

The blower 62 is disposed on the downstream side, in the ventilation air flow, of the inside/outside air switching device 63. The blower 62 blows the air sucked via the inside/outside air switching device 63 toward the vehicle interior. The blower 62 is an electric blower that drives a centrifugal multi-blade fan by an electric motor. The rotation speed (i.e., the air blowing capacity) of the blower 62 is controlled by a control voltage output from the control device 70.

On the downstream side, in the ventilation air flow, of the blower 62, the cooler core 25 and the heater core 41 are disposed in this order with respect to the ventilation air flow. That is, the cooler core 25 is disposed on the upstream side, in the ventilation air flow, of the heater core 41.

In the casing 61, a cold air bypass passage 65, that causes the ventilation air having passed through the cooler core 25 to flow through while bypassing the heater core 41, is provided. In addition, an air mix door 64 is disposed on the downstream side, in the ventilation air flow, of the cooler core 25 and on the upstream side, in the ventilation air flow, of the heater core 41 in the casing 61.

The air mix door 64 is an air volume ratio adjustment part that adjusts an air volume ratio between, of the ventilation air having passed through the cooler core 25, an air volume of the ventilation air to pass through the heater core 41 side and an air volume of the ventilation air to be caused to pass through the cold air bypass passage 65. The air mix door 64 is driven by an electric actuator for the air mix door. The operation of the electric actuator is controlled by a control signal output from the control device 70.

A mixing space is disposed on the downstream side, in the ventilation air flow, of the heater core 41 and the cold air bypass passage 65 in the casing 61. The mixing space is a space for mixing the ventilation air heated by the heater core 41 and the ventilation air that has passed through the cold air bypass passage 65 and is not heated.

Opening holes for blowing the ventilation air mixed in the mixing space (i.e., conditioned air) into the vehicle interior, a space to be air-conditioned, are disposed in downstream portions, in the ventilation air flow, of the casing 61. As the opening holes, a face opening hole, a foot opening hole, and a defroster opening hole (none of which are illustrated) are provided.

The face opening hole is an opening hole for blowing the conditioned air toward the upper body of an occupant in the vehicle interior. The foot opening hole is an opening hole for blowing the conditioned air toward the feet of the occupant. The defroster opening hole is an opening hole for blowing the conditioned air toward the inner surface of the vehicle front window glass.

The face opening hole, the foot opening hole, and the defroster opening hole are connected to a face blow-out port, a foot blow-out port, and a defroster blow-out port (none of which are illustrated) provided in the vehicle interior via ducts forming the air passages, respectively.

Therefore, the temperature of the conditioned air to be mixed in the mixing space is adjusted by the air mix door 64 adjusting the air volume ratio between the air volume to be caused to pass through the heater core 41 and the air volume to be caused to pass through the cold air bypass passage 65. Then, the temperature of the ventilation air (conditioned air) to be blown from each blow-out port into the vehicle interior is adjusted.

On the upstream sides, in the ventilation air flow, of the face opening hole, the foot opening hole, and the defroster opening hole, a face door, a foot door, and a defroster door (none of which are illustrated) are disposed, respectively. The face door adjusts the opening area of the face opening hole. The foot door adjusts the opening area of the foot opening hole. The defroster door adjusts the opening area of the defroster opening hole.

The face door, the foot door, and the defroster door constitute a blow-out port mode switching device that switches a blow-out port mode. These doors are coupled to an electric actuator for driving a blow-out port mode door via a link mechanism or the like, and are operated to rotate in conjunction therewith. The operation of the electric actuator is also controlled by a control signal output from the control device 70.

Specific examples of the blow-out port mode to be switched by the blow-out port mode switching device include a face mode, a bi-level mode, and a foot mode. The face mode is a blow-out port mode in which the face blow-out port is fully opened to blow air from the face blow-out port toward the upper body of an occupant in the vehicle interior.

The bi-level mode is a blow-out port mode in which both the face blow-out port and the foot blow-out port are opened to blow air toward the upper body and feet of an occupant in the vehicle interior. The foot mode is a blow-out port mode in which the foot blow-out port is fully opened and the defroster blow-out port is opened by a small opening degree to mainly blow air from the foot blow-out port.

Furthermore, the defroster mode can be switched to by the occupant manually operating a blow-out mode selector switch provided on an operation panel 71. The defroster mode is a blow-out port mode in which the defroster blow-out port is fully opened to blow air from the defroster blow-out port to the inner surface of the front window glass.

Next, an outline of an electric control unit of the thermal management system 1 will be described with reference to FIG. 3. The control device 70 (controller) includes a known microcomputer including a CPU, a ROM, a RAM, and the like, and peripheral circuits thereof. The control device 70 performs various calculations and processing on the basis of air conditioning control programs stored in the ROM, and controls operations of various control target equipment that are connected to the output side. The control device 70 corresponds to an example of the controller.

The various control target equipment include the compressor 11 and the expansion valve 13. Furthermore, examples of the various control target equipment include the four-way valve 35, the first five-way valve 36, the second five-way valve 37, the first low-temperature side pump 29 to the fourth low-temperature side pump 32, the high-temperature side pump 43, the electric heater 42, the blower 62, the inside/outside air switching device 63, and the air mix door 64.

Figure 3:
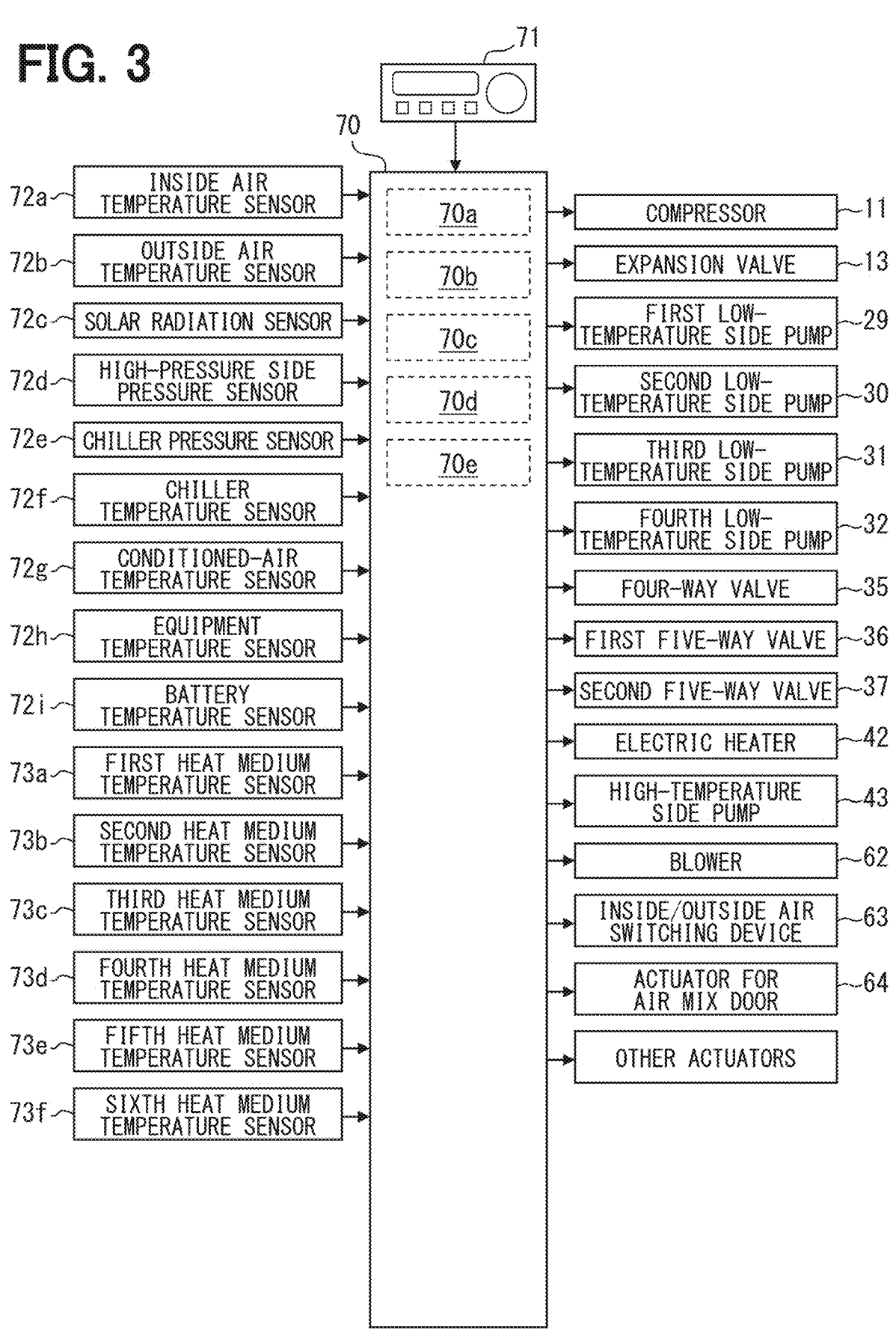
FIG. 3 is a block diagram illustrating a control system of the thermal management system.

As illustrated in FIG. 3, various control sensors are connected to the input side of the control device 70. The control sensors include an inside air temperature sensor 72*a*, an outside air temperature sensor 72*b*, a solar radiation sensor 72*c*, a high-pressure side pressure sensor 72*d*, a chiller pressure sensor 72*e*, and a chiller temperature sensor 72*f*. The control sensors further include a conditioned air temperature sensor 72*g*, an equipment temperature sensor 72*h*, and a battery temperature sensor 72*i*.

The inside air temperature sensor 72*a* is an inside air temperature detection part that detects an inside air temperature Tr that is a temperature in the vehicle interior. The outside air temperature sensor 72*b* is an outside air temperature detection part that detects an outside air temperature Tam that is a temperature outside the vehicle interior. The solar radiation sensor 72*c* is a solar radiation amount detection part that detects a solar radiation amount As with which the vehicle interior is irradiated.

The high-pressure side pressure sensor 72d is a high-pressure pressure detection part that detects a high-pressure pressure Pd that is a pressure of the high-pressure refrigerant discharged from the compressor 11. The chiller pressure sensor 72e is a refrigerant pressure detection part that detects a refrigerant evaporation pressure in the refrigerant passage 14a in the chiller 14. Specifically, the chiller pressure sensor 72e detects the pressure of the outlet side refrigerant in the refrigerant passage 14a in the chiller 14.

The chiller temperature sensor 72f is a chiller side refrigerant temperature detection part that detects a refrigerant evaporation temperature in the refrigerant passage 14a in the chiller 14. Specifically, the chiller temperature sensor 72f detects the temperature of the outlet side refrigerant in the refrigerant passage 14a in the chiller 14. The conditioned air temperature sensor 72g is a conditioned air temperature detection part that detects a blown air temperature TAV of the blown air to be blown from the mixing space into the vehicle interior.

The equipment temperature sensor 72h is an equipment temperature detection part that detects the temperature of an inverter or the like mounted as the heat generating equipment. The equipment temperature sensor 72h includes a plurality of temperature detection parts, and can detect the equipment temperature of each of the inverter, the motor generator, and the transaxle device.

The battery temperature sensor 72i is a battery temperature detection part that detects a battery temperature TB that is a temperature of the battery 27. The battery temperature sensor 72i includes a plurality of temperature detection parts, and detects temperatures at a plurality of locations of the battery 27. Therefore, the control device 70 can also detect a temperature difference between respective portions of the battery 27. Furthermore, an average value of the detection values of a plurality of temperature sensors is adopted as the battery temperature TB.

A plurality of heat medium temperature sensors are connected to the input side of the control device 70 in order to detect the temperatures of the heat medium in the low-temperature side heat medium circuit 20 and the high-temperature side heat medium circuit 40. The plurality of heat medium temperature sensors include a first heat medium temperature sensor 73a to a sixth heat medium temperature sensor 73f.

The first heat medium temperature sensor 73a is disposed in the outlet portion of the heat medium passage 14b in the chiller 14, and detects the temperature of the heat medium to flow out of the chiller 14. The second heat medium temperature sensor 73b is disposed in the inflow port portion of the cooler core 25, and detects the temperature of the heat medium to pass through the cooler core 25.

The third heat medium temperature sensor 73c is disposed in the inlet portion of the heat medium passage in the second outside air heat exchanger 34, and detects the temperature of the heat medium to pass through the second outside air heat exchanger 34. The fourth heat medium temperature sensor 73d is disposed in the inflow port portion of the heat medium passage in the battery heat exchange unit 26, and detects the temperature of the heat medium to pass through the battery heat exchange unit 26.

The fifth heat medium temperature sensor 73e is disposed in the inflow port portion of the heat medium passage in the equipment heat exchange unit 28, and detects the temperature of the heat medium to pass through the heat medium passage 28a in the equipment heat exchange unit 28. The sixth heat medium temperature sensor 73f is disposed in the heat medium inlet portion of the heater core 41, and detects the temperature of the heat medium to pass through the heater core 41.

The thermal management system 1 controls the heat pump cycle 10, the low-temperature side heat medium circuit 20, and the high-temperature side heat medium circuit 40 with reference to the detection results of the first heat medium temperature sensor 73a to the sixth heat medium temperature sensor 73f.

Furthermore, the operation panel 71, disposed in the vicinity of the instrument panel in the front portion of the vehicle interior, is connected to the input side of the control device 70. Operation signals from various operation switches provided on the operation panel 71 are input to the control device 70.

Specific examples of the various operation switches provided on the operation panel 71 include an auto switch, an air conditioner switch, an air volume setting switch, and a temperature setting switch. The auto switch is an operation switch that sets or cancels the automatic control operation of the heat pump cycle 10.

The air conditioner switch is an operation switch that requires the cooler core 25 to cool the ventilation air. The air volume setting switch is an operation switch operated when the air volume of the blower 62 is manually set. The temperature setting switch is an operation switch that sets a target temperature Tset in the vehicle interior.

In the control device 70 of the present embodiment, control parts, which control the various control target equipment connected to the output side of the control device, are integrally configured. Therefore, a configuration for controlling the operation of each of the control target equipment (i.e., hardware and software) constitutes the control part that controls the operation of each of the control target equipment.

For example, a configuration that controls the refrigerant discharge capacity (e.g., the rotation speed) of the compressor 11 in the heat pump cycle 10 corresponds to a compressor control part 70a of the control device 70. In the first embodiment, the compressor control part 70a controls the refrigerant discharge capacity of the compressor 11 depending on the overall heating capacity that is required, as the thermal management system 1, for the heat pump cycle 10.

A configuration that controls the decompression level in the expansion valve 13 (i.e., the throttle opening degree of the expansion valve 13) in the heat pump cycle 10 corresponds to a decompression control part 70b of the control device 70. In the first embodiment, the decompression control part 70b controls the decompression level in the expansion valve 13 depending on the overall cooling capacity that is required, as the thermal management system 1, for the heat pump cycle 10.

A configuration that controls the operations of the four-way valve 35, the first five-way valve 36, and the second five-way valve 37 to adjust the flow rate of the heat medium in the low-temperature side heat medium circuit 20 constitutes a flow regulating control part 70c of the control device 70. The flow regulating control part 70c regulates the flow rate of the heat medium to be distributed by the four-way valve 35 or the like depending on a required capacity based on each function such as cooling of the ventilation air, temperature adjustment of the battery 27, waste heat recovery from the heat generating equipment, or heat absorption from the outside air.

A configuration that controls the pumping capacities for the heat medium in the first low-temperature side pump 29 to the fourth low-temperature side pump 32 and the high-temperature side pump 43 constitutes a pumping capacity control part 70*d* of the control device 70. The pumping capacity control part 70*d* controls the pumping capacities for the heat medium in the first low-temperature side pump 29 and the like depending on a request related to each function realized in the thermal management system 1.

In the thermal management system 1 according to the first embodiment, circulation circuits, such as the air cooling circuit 20*a*, the battery temperature control circuit 20*b*, the equipment waste heat recovery circuit 20*c*, and the outside air heat absorption circuit 20*d*, can be configured in the low-temperature side heat medium circuit 20, as described above.

The air cooling circuit 20*a* is a circulation circuit configured such that the heat medium can circulate in order to cool the ventilation air to be blown into the space to be air conditioned by heat exchange with the heat medium cooled by the chiller 14. When the air cooling circuit 20*a* is configured, the heat medium flows through the first low-temperature side pump 29, the heat medium passage 14*b* in the chiller 14, the four-way valve 35, the second low-temperature side pump 30, and the cooler core 25 in this order. Subsequently, the heat medium flows through the eighth connection part 50*h*, the seventh connection part 50*g*, the fourth connection part 50*d*, and the first low-temperature side pump 29 in this order and circulates.

The battery temperature control circuit 20*b* is a circulation circuit configured such that the heat medium can circulate in order to adjust the temperature of the battery 27 mounted on the electric car by heat exchange with the heat medium circulating through the low-temperature side heat medium circuit 20. When the battery temperature control circuit 20*b* is configured, the heat medium flows through the third low-temperature side pump 31, the battery heat exchange unit 26, the second five-way valve 37, the second connection part 50*b*, and the third low-temperature side pump 31 in this order and circulates.

The equipment waste heat recovery circuit 20*c* is a circulation circuit configured such that the heat medium can circulate in order to recover the waste heat occurring in the in-vehicle equipment by heat exchange with the heat medium circulating through the low-temperature side heat medium circuit 20. When the equipment waste heat recovery circuit 20*c* is configured, the heat medium flows through the fourth low-temperature side pump 32, the equipment heat exchange unit 28, the second five-way valve 37, the first outside air heat exchanger 33, the third connection part 50*c*, and the fourth low-temperature side pump 32 in this order and circulates.

The outside air heat absorption circuit 20*d* is a circuit configured such that the heat medium can circulate in order to absorb heat from the outside air outside the vehicle interior of the electric car by heat exchange with the heat medium flowing through the low-temperature side heat medium circuit 20. When the outside air heat absorption circuit 20*d* is configured, the heat medium flows through the first low-temperature side pump 29, the heat medium passage 14*b* in the chiller 14, the four-way valve 35, the first five-way valve 36, and the second outside air heat exchanger 34 in this order. Then, the heat medium flows through the sixth connection part 50*f*, the seventh connection part 50*g*, the fourth connection part 50*d*, and the first low-temperature side pump 29 in this order and circulates.

In the thermal management system 1 according to the first embodiment, a circulation circuit referred to as an air heating circuit 40*a* can be configured in the high-temperature side heat medium circuit 40. The air heating circuit 40*a* is a circulation circuit for cooling the ventilation air to be blown into the space to be air conditioned by heat exchange with the heat medium flowing through the high-temperature side heat medium circuit 40. When the air heating circuit 40*a* is configured, the heat medium flows through the high-temperature side pump 43, the heat medium passage 12*b* in the water-refrigerant heat exchanger 12, the electric heater 42, the first five-way valve 36, the heater core 41, the fifth connection part 50*e*, and the high-temperature side pump 43 in this order and circulates.

In the thermal management system 1, a part of the heat medium flowing through any one of the air cooling circuit 20*a*, the battery temperature control circuit 20*b*, the equipment waste heat recovery circuit 20*c*, and the outside air heat absorption circuit 20*d* can be caused to flow into and out of another circulation circuit by controlling the four-way valve 35, the first five-way valve 36, and the second five-way valve 37.

As a result, the temperature zones of the heat medium flowing through the respective circulation circuits can be made different, and thus the thermal management system 1 can create a plurality of heat medium temperature zones that are different depending on the uses of the respective circulation circuits by using the heat medium cooled with one chiller 14.

Hereinafter, the operation mode of the thermal management system 1, in which a plurality of different temperature zones are created with one chiller 14 by adjusting the flow of the heat medium to flow in and out between the plurality of circulation circuits, will be described in detail with reference to the drawings.

In the plurality of circulation circuits, a state in which each of the circulation circuits independently causes the heat medium to circulate through is referred to as an independent circulation state, and a state in which the heat medium is allowed to flow in and out between the plurality of circulation circuits is referred to as a circuit linkage state.

As an example of the operation mode in which a plurality of different temperature zones are created with one chiller 14 by linking the plurality of circulation circuits, an air conditioning/battery cooling mode can be taken. The air conditioning/battery cooling mode will be described with reference to FIGS. 4 to 6.

The temperature zone of the heat medium, required for the battery heat exchange unit 26 when the battery 27 is cooled, is lower than the temperature zone of the heat medium required for the cooler core 25 to cool the ventilation air when the air conditioning is performed. Therefore, in the air conditioning/battery cooling mode, the refrigerant discharge capacity of the compressor 11 and the decompression level in the expansion valve 13 are determined to satisfy the cooling capacity required for the cooler core 25.

In the air conditioning/battery cooling mode, the temperature zone of the heat medium required for the battery heat exchange unit 26 corresponds to a first temperature zone, and the temperature zone of the heat medium required for the cooler core 25 corresponds to a second temperature zone. At this time, the battery 27 whose temperature is adjusted by the battery heat exchange unit 26 corresponds to a first temperature adjustment target, and the ventilation air cooled by the cooler core 25 corresponds to a second temperature adjustment target.

In the low-temperature side heat medium circuit 20 in the air conditioning/battery cooling mode, the air cooling circuit 20*a* and the battery temperature control circuit 20*b* are configured as the circulation circuits. In the low-temperature side heat medium circuit 20 in the air conditioning/battery cooling mode, the independent circulation state and the circuit linkage state are switched for the air cooling circuit 20*a* and the battery temperature control circuit 20*b*. In the independent circulation state, the heat medium circulates independently through the air cooling circuit 20*a* and the battery temperature control circuit 20*b*, respectively. In the circuit linkage state, a part of the heat medium flowing through the air cooling circuit 20*a* or the battery temperature control circuit 20*b* flows into the other circulation circuit and the circulation of the heat medium is continued.

In the independent circulation state in the air conditioning/battery cooling mode, the first low-temperature side pump 29 and the second low-temperature side pump 30 are first caused to exert predetermined pumping capacities. The four-way valve 35 is controlled such that the heat medium having flowed in from the first inflow-outlet 35*a* flows out of the second inflow-outlet 35*b*. As a result, the air cooling circuit 20*a* is configured.

In the air cooling circuit 20*a*, the heat medium flows through the first low-temperature side pump 29, the heat medium passage 14*b* in the chiller 14, the first inflow-outlet 35*a* of the four-way valve 35, and the third inflow-outlet 35*c* in this order. Thereafter, the heat medium flows through the second low-temperature side pump 30, the cooler core 25, the eighth connection part 50*h*, a ninth connection part 50*i*, and the fourth connection part 50*d* in this order and circulates.

In the independent circulation state in the air conditioning/battery cooling mode, the third low-temperature side pump 31 is caused to exert a predetermined pumping capacity. The second five-way valve 37 is controlled such that the heat medium having flowed in from the second inflow-outlet 37*b* flows out of the first inflow-outlet 37*a*. As a result, the battery temperature control circuit 20*b* is configured.

In the battery temperature control circuit 20*b*, the heat medium flows through the third low-temperature side pump 31, the battery heat exchange unit 26, the second inflow-outlet 37*b* of the second five-way valve 37, the first inflow-outlet 37*a* of the second five-way valve 37, the second connection part 50*b*, and the third low-temperature side pump 31 in this order and circulates. Therefore, in the air conditioning/battery cooling mode, the air cooling circuit 20*a* corresponds to the first circuit, and the battery temperature control circuit 20*b* corresponds to the second circuit, as illustrated in FIG. 5.

In the air cooling circuit 20*a* in the independent circulation state in the air conditioning/battery cooling mode, the cooling capacity of the chiller 14 is controlled by controlling the operation of the heat pump cycle 10, so that the cooling capacity of the chiller 14 corresponds to the target blowing temperature related to an air conditioning operation. Therefore, the temperature zone of the heat medium to pass through the chiller 14 is adjusted to a temperature zone determined to correspond to the target blowing temperature.

Figure 5:
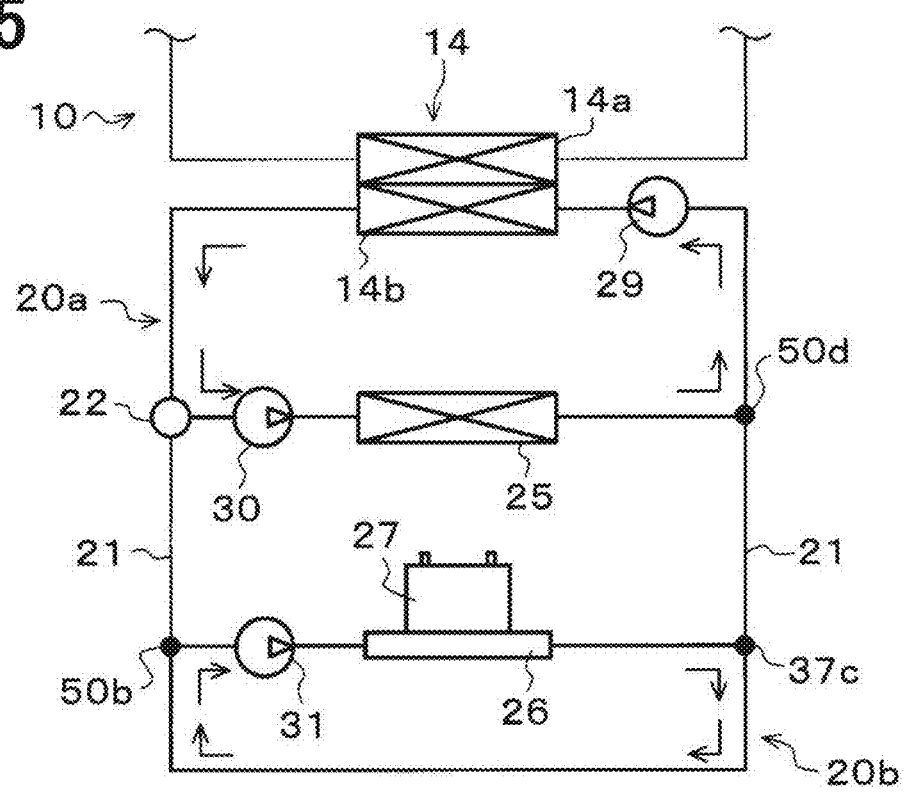
FIG. 5 is an explanatory view illustrating an independent circulation state in the air conditioning/battery cooling mode of the first embodiment.

On the other hand, in the battery temperature control circuit 20*b* in the independent circulation state in the air conditioning/battery cooling mode, the heat medium is circulated via the battery heat exchange unit 26 by the third low-temperature side pump 31, as illustrated in FIG. 5. Since the heat medium in the battery temperature control circuit 20*b* in the independent circulation state exchanges heat with the battery 27 when passing through the battery heat exchange unit 26, the temperature of the heat medium rises. That is, in the independent circulation state in the air conditioning/battery cooling mode, the temperature zone of the heat medium circulating through the battery temperature control circuit 20*b* is higher than the temperature zone of the heat medium circulating through the air cooling circuit 20*a*.

The independent circulation state in the air conditioning/battery cooling mode can be referred to as an operation state in which the temperature difference between the temperature zone of the heat medium circulating through the air cooling circuit 20*a* and the temperature zone of the heat medium circulating through the battery temperature control circuit 20*b* is increased.

Figure 4:
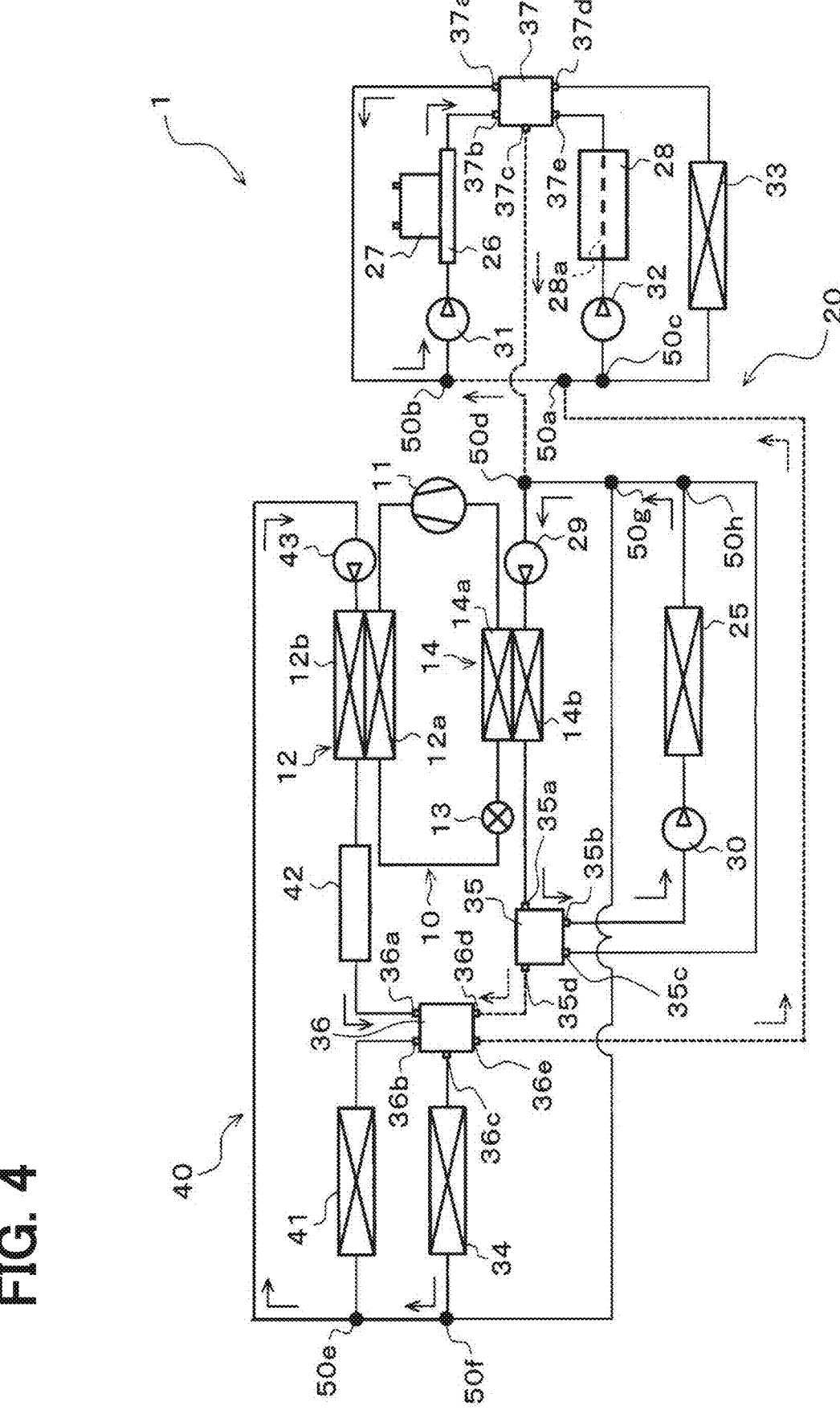
FIG. 4 is an explanatory view illustrating a flow of a heat medium in an air conditioning/battery cooling mode of the first embodiment.
Figure 6:
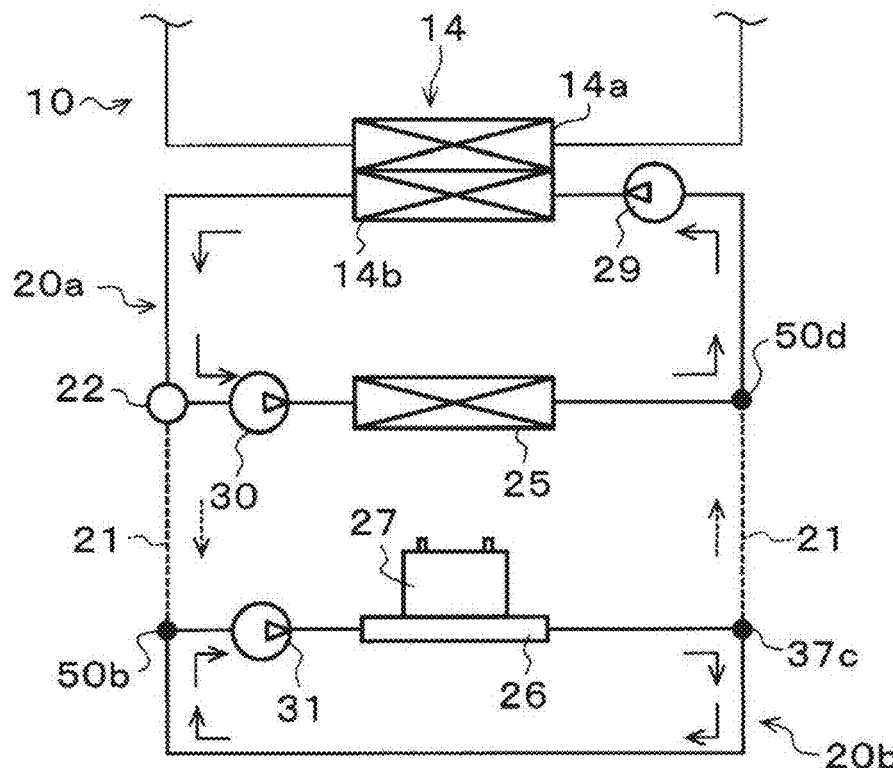
FIG. 6 is an explanatory view illustrating a circuit linkage state in the air conditioning/battery cooling mode of the first embodiment.

Here, in the air conditioning/battery cooling mode, the heat medium can be caused to flow in and out between the air cooling circuit 20*a* and the battery temperature control circuit 20*b* by controlling the operations of the four-way valve 35, the first five-way valve 36, and the second five-way valve 37. By allowing the heat medium to flow in and out between the air cooling circuit 20*a* and the battery temperature control circuit 20*b*, it is possible to switch to the circuit linkage state in the air conditioning/battery cooling mode, as illustrated in FIGS. 4 and 6.

Specifically, the four-way valve 35 distributes the heat medium having flowed in from the first inflow-outlet 35*a* to a flow to flow out of the second inflow-outlet 35*b* and a flow to flow out of the fourth inflow-outlet 35*d*. At this time, the ratio between the flow rate of the heat medium on the second inflow-outlet 35*b* side and the flow rate of the heat medium on the fourth inflow-outlet 35*d* side is determined depending on the difference between the target battery temperature determined for the battery 27 and the temperature of the heat medium flowing through the battery temperature control circuit 20*b*.

The first five-way valve 36 is controlled such that the heat medium having flowed in from the fourth inflow-outlet 36*d* flows out of the fifth inflow-outlet 36*e* and the heat medium having flowed in from the first inflow-outlet 36*a* flows out of the third inflow-outlet 36*c*.

The second five-way valve 37 distributes the heat medium having flowed in from the second inflow-outlet 37*b* to a flow to flow out of the first inflow-outlet 37*a* and a flow to flow out of the third inflow-outlet 37*c*. The ratio between the flow rate of the heat medium on a side of the first inflow-outlet 37*a* and the flow rate of the heat medium on a side of the third inflow-outlet 37*c* is linked to the flow rate ratio on a side of the four-way valve 35.

In the air conditioning/battery cooling mode, when the four-way valve 35 and the first five-way valve 36 are controlled in this manner, a part of the heat medium flowing through the air cooling circuit 20*a* can be caused to flow into the battery temperature control circuit 20*b* via the four-way valve 35, the first five-way valve 36, the first connection part 50*a*, and the second connection part 50*b*. By controlling the second five-way valve 37, a part of the heat medium flowing through the battery temperature control circuit 20*b* can be caused to flow into the air cooling circuit 20*a* via the second five-way valve 37 and the fourth connection part 50*d*.

That is, in the air conditioning/battery cooling mode, the heat medium flow path connecting the four-way valve 35, the first five-way valve 36, the first connection part 50*a*, and the second connection part 50*b* connects the air cooling circuit 20*a* and the battery temperature control circuit 20*b* such that the heat medium can flow in and out. Similarly, the heat medium flow path connecting the second five-way valve 37 and the fourth connection part 50*d* also connects between the air cooling circuit 20*a* and the battery temperature control circuit 20*b*. Therefore, in this case, the heat medium flow path connecting the four-way valve 35, the first five-way valve 36, the first connection part 50*a*, and the second connection part 50*b*, and the heat medium flow path connecting the second five-way valve 37 and the fourth connection part 50*d*, correspond to a coupling part 21. The four-way valve 35, the first five-way valve 36, and the second five-way valve 37 correspond to a flow rate adjustment part 22.

In the air cooling circuit 20*a*, the heat medium circulates via the chiller 14 and the cooler core 25 as described above, and thus the heat medium is cooled to a predetermined target temperature by the endothermic action of the refrigerant in the chiller 14.

Therefore, as the flow rate of the heat medium flowing from the air cooling circuit 20*a* into the battery temperature control circuit 20*b* via the coupling part 21 increases, the temperature of the heat medium flowing through the battery temperature control circuit 20*b* can be lowered. That is, by controlling the flow rate of the heat medium to flow in and out between the air cooling circuit 20*a* and the battery temperature control circuit 20*b*, the temperature zone of the heat medium flowing through the battery temperature control circuit 20*b* can be adjusted to a desired temperature zone higher than the temperature zone of the heat medium flowing through the air cooling circuit 20*a*. In other words, the temperature zone of the heat medium flowing through the air cooling circuit 20*a* can be brought close to a temperature zone corresponding to the target blowing temperature related to the air conditioning operation, and the temperature zone of the heat medium flowing through the battery temperature control circuit 20*b* can be brought close to a temperature zone determined based on the proper temperature range of the battery 27.

For the high-temperature side heat medium circuit 40 in the air conditioning/battery cooling mode, the high-temperature side pump 43 is caused to exert a predetermined pumping capacity. Therefore, in the high-temperature side heat medium circuit 40, the heat medium flows through the high-temperature side pump 43, the heat medium passage 12*b* in the water-refrigerant heat exchanger 12, the electric heater 42, the first five-way valve 36, the second outside air heat exchanger 34, and the high-temperature side pump 43 in this order and circulates. As a result, in the high-temperature side heat medium circuit 40, the heat pumped up by the heat pump cycle 10 can be dissipated to the outside air by the second outside air heat exchanger 34.

In the air conditioning/battery cooling mode, temperature zones suitable for the air conditioning and the battery cooling can be created respectively with one chiller 14 by adjusting the switching between the independent circulation state and the circuit linkage state and the flow rate of the heat medium between the air cooling circuit 20*a* and the battery temperature control circuit 20*b*, as described above.

Next, as another example of the operation mode in which a plurality of different temperature zones are created with one chiller 14 by linking the plurality of circulation circuits, a dehumidification-heating/outside air heat absorption mode will be described with reference to FIGS. 7 to 9.

In the dehumidification-heating/outside air heat absorption mode, the temperature zone of the heat medium required for the second outside air heat exchanger 34 to absorb heat from the outside air is lower than the temperature zone of the heat medium required for the cooler core 25 to dehumidify the ventilation air when dehumidification-heating is performed. Therefore, in the dehumidification-heating/outside air heat absorption mode, the refrigerant discharge capacity of the compressor 11 and the decompression level in the expansion valve 13 are determined to satisfy the cooling capacity required for the second outside air heat exchanger 34 to absorb heat from the outside air.

In the dehumidification-heating/outside air heat absorption mode, the temperature zone of the heat medium required for the second outside air heat exchanger 34 corresponds to the first temperature zone, and the temperature zone of the heat medium required for the cooler core 25 corresponds to the second temperature zone. The outside air whose heat is absorbed by the second outside air heat exchanger 34 corresponds to the first temperature adjustment target, and the ventilation air cooled by the cooler core 25 corresponds to the second temperature adjustment target.

The low-temperature side heat medium circuit 20 in the dehumidification-heating/outside air heat absorption mode includes the outside air heat absorption circuit 20*d* and the air cooling circuit 20*a* as the circulation circuits, and the independent circulation state or the circuit linkage state is switched to between the outside air heat absorption circuit 20*d* and the air cooling circuit 20*a*. In the dehumidification-heating/outside air heat absorption mode, the outside air heat absorption circuit 20*d* corresponds to the first circuit, and the air cooling circuit 20*a* corresponds to the second circuit.

In the independent circulation state in the dehumidification-heating/outside air heat absorption mode, the first low-temperature side pump 29 is first caused to exert a predetermined pumping capacity. The four-way valve 35 is controlled such that the heat medium having flowed in from the first inflow-outlet 35*a* flows out of the fourth inflow-outlet 35*d*. The first five-way valve 36 is controlled such that the heat medium having flowed in from the fourth inflow-outlet 36*d* flows out of the third inflow-outlet 37*c* and the heat medium having flowed in from the first inflow-outlet 36*a* flows out of the second inflow-outlet 36*b*. As a result, the outside air heat absorption circuit 20*d* is configured.

In the outside air heat absorption circuit 20*d*, the heat medium flows through the first low-temperature side pump 29, the heat medium passage 14*b* in the chiller 14, the first inflow-outlet 35*a* of the four-way valve 35, the fourth inflow-outlet 35*d*, the fourth inflow-outlet 36*d* of the first five-way valve 36, and the third inflow-outlet 36*c* in this order. Thereafter, the heat medium flows through the second outside air heat exchanger 34, the sixth connection part 50*f*, the seventh connection part 50*g*, and the first low-temperature side pump 29 and circulates.

In the independent circulation state in the dehumidification-heating/outside air heat absorption mode, the second low-temperature side pump 30 is further caused to exert a predetermined pumping capacity. The four-way valve 35 is further controlled such that the heat medium having flowed in from the third inflow-outlet 35*c* flows out of the second inflow-outlet 35*b*. As a result, the air cooling circuit 20*a* is configured in the dehumidification-heating/outside air heat absorption mode.

In the air cooling circuit 20*a* in this case, the heat medium flows through the second low-temperature side pump 30, the cooler core 25, the eighth connection part 50*h*, the third inflow-outlet 35*c* of the four-way valve 35, the second inflow-outlet 35*b*, and the second low-temperature side pump 30 in this order and circulates. Therefore, in the dehumidification-heating/outside air heat absorption mode, the outside air heat absorption circuit 20*d* corresponds to the first circuit, and the air cooling circuit 20*a* corresponds to the second circuit, as illustrated in FIG. 8.

In the outside air heat absorption circuit 20*d* in the independent circulation state in the dehumidification-heating/outside air heat absorption mode, the cooling capacity of the chiller 14 is adjusted by controlling the operation of the heat pump cycle 10, so that the heat medium temperature in the second outside air heat exchanger 34 becomes lower than the outside air temperature. Therefore, the temperature zone of the heat medium to pass through the second outside air heat exchanger 34 is adjusted to a predetermined temperature zone determined to be lower than the outside air temperature.

Figure 8:
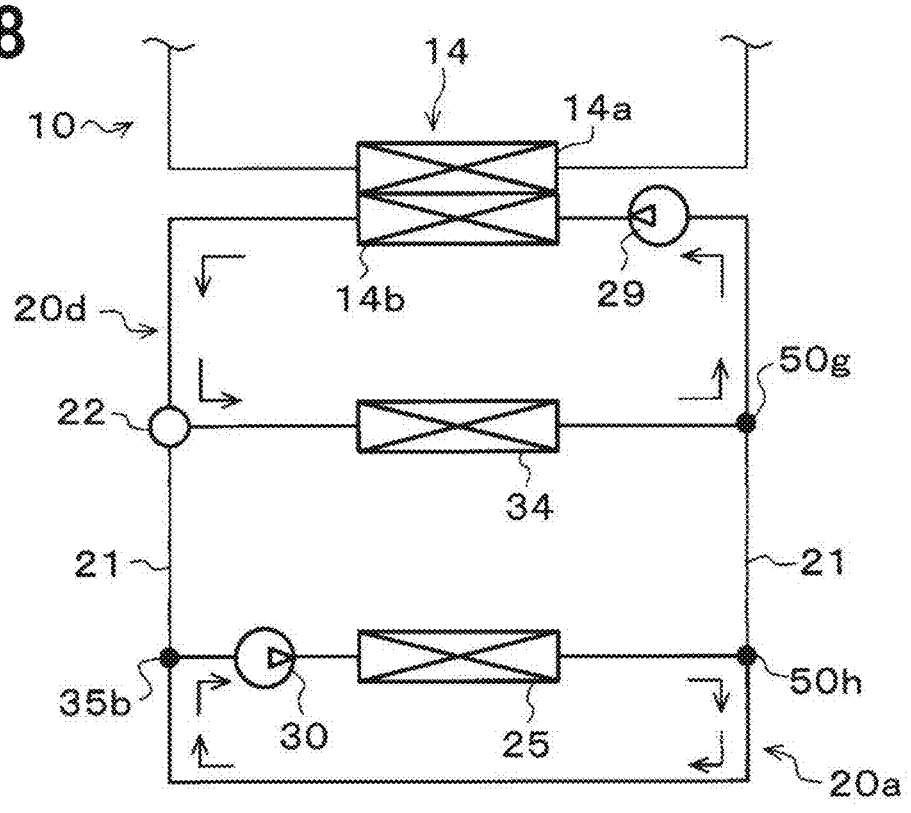
FIG. 8 is an explanatory view illustrating an independent circulation state in the dehumidification-heating/outside air heat absorption mode of the first embodiment.
Figure 9:
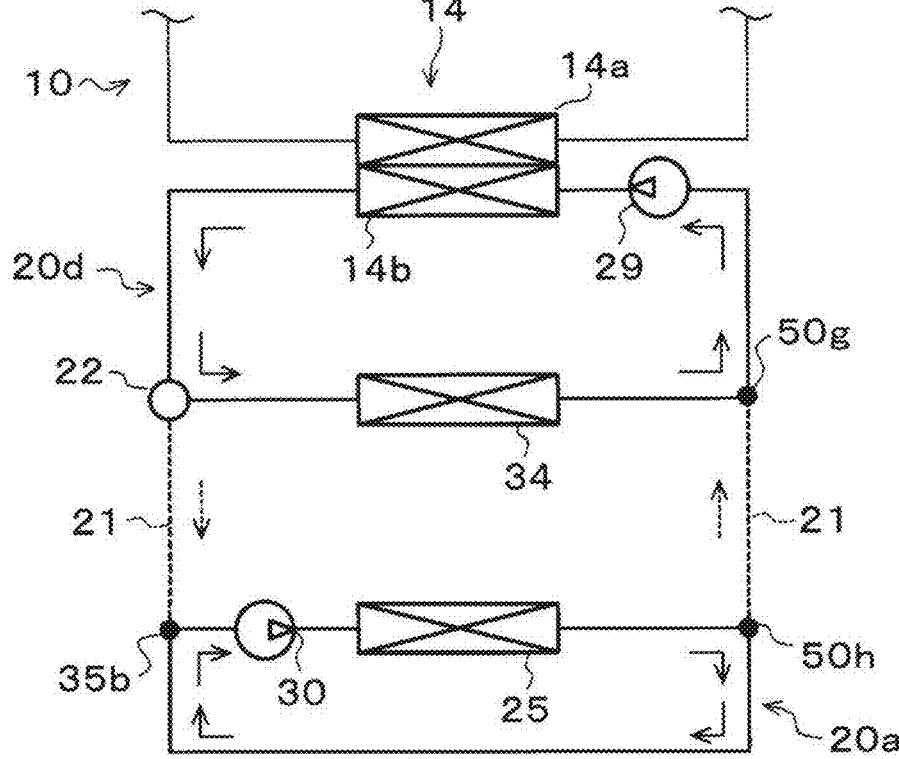
FIG. 9 is an explanatory view illustrating a circuit linkage state in the dehumidification-heating/outside air heat absorption mode of the first embodiment.

In the air cooling circuit 20*a* in the independent circulation state in the dehumidification-heating/outside air heat absorption mode, the heat medium is circulated via the cooler core 25 by the second low-temperature side pump 30, as illustrated in FIG. 8. In the air cooling circuit 20*a* in the independent circulation state in the dehumidification-heating/outside air heat absorption mode, the heat medium circulates via the cooler core 25 without passing through the chiller 14. Therefore, in the independent circulation state in the dehumidification-heating/outside air heat absorption mode, the temperature zone of the heat medium related to the air cooling circuit 20*a* is higher than the temperature zone of the heat medium related to the outside air heat absorption circuit 20*d*.

Also, in the dehumidification-heating/outside air heat absorption mode, the heat medium can be caused to flow in and out between the outside air heat absorption circuit 20*d* and the air cooling circuit 20*a* by controlling the operation of the four-way valve 35. By allowing the heat medium to flow in and out between the outside air heat absorption circuit 20*d* and the air cooling circuit 20*a*, it is possible to switch to the circuit linkage state in the dehumidification-heating/outside air heat absorption mode, as illustrated in FIGS. 7 and 9.

Specifically, the four-way valve 35 in the dehumidification-heating/outside air heat absorption mode distributes the heat medium having flowed in from the first inflow-outlet 35*a* to a flow to flow out of the second inflow-outlet 35*b* and a flow to flow out of the fourth inflow-outlet 35*d*. At this time, the ratio between the flow rate of the heat medium on the second inflow-outlet 35*b* side and the flow rate of the heat medium on the fourth inflow-outlet 35*d* side is determined depending on the difference between the target cooling capacity required when dehumidification-heating is performed and the temperature of the heat medium flowing through the cooler core 25.

As a result, in the dehumidification-heating/outside air heat absorption mode, a part of the heat medium flowing through the outside air heat absorption circuit 20*d* can be caused to flow into the air cooling circuit 20*a* via the four-way valve 35 by controlling the operation of the four-way valve 35 as described above. At this time, a part of the heat medium flowing through the air cooling circuit 20*a* flows into the outside air heat absorption circuit 20*d* via the heat medium flow path connecting the eighth connection part 50*h* and the seventh connection part 50*g*.

That is, in the dehumidification-heating/outside air heat absorption mode, the heat medium flow path connecting the first inflow-outlet 35*a* and the second inflow-outlet 35*b* of the four-way valve 35 and the heat medium flow path connecting the eighth connection part 50*h* and the seventh connection part 50*g* correspond to the coupling part 21. The four-way valve 35 corresponds to the flow rate adjustment part 22.

In the outside air heat absorption circuit 20*d* in the dehumidification-heating/outside air heat absorption mode, the heat medium absorbs heat from the outside air in the second outside air heat exchanger 34 as described above, and thus the heat medium is cooled to the target temperature lower than the outside air temperature by the endothermic action of the refrigerant in the chiller 14.

Therefore, as the flow rate of the heat medium flowing from the outside air heat absorption circuit 20*d* into the air cooling circuit 20*a* via the coupling part 21 increases, the temperature of the heat medium flowing through the air cooling circuit 20*a* can be lowered. That is, by adjusting the flow rate of the heat medium flowing between the outside air heat absorption circuit 20*d* and the air cooling circuit 20*a*, the temperature zone of the heat medium flowing through the air cooling circuit 20*a* can be adjusted to a desired temperature zone higher than the temperature zone of the heat medium flowing through the outside air heat absorption circuit 20*d*.

In other words, the temperature zone of the heat medium flowing through the outside air heat absorption circuit 20*d* can be brought close to the target value of a temperature zone determined depending on the outside air temperature, and the temperature zone of the heat medium flowing through the air cooling circuit 20*a* can be brought close to a temperature zone corresponding to the target blowing temperature related to a dehumidification-heating operation.

For the high-temperature side heat medium circuit 40 in the dehumidification-heating/outside air heat absorption mode, the high-temperature side pump 43 is caused to exert a predetermined pumping capacity. Therefore, in the high-temperature side heat medium circuit 40, the heat medium flows through the high-temperature side pump 43, the heat medium passage 12*b* in the water-refrigerant heat exchanger 12, the electric heater 42, the first five-way valve 36, the heater core 41, and the high-temperature side pump 43 in this order and circulates.

As a result, the ventilation air dehumidified by the cooler core 25 is heated in the heater core 41 by the heat pumped up with the heat pump cycle 10 and the heat generated in the electric heater 42, and is supplied to the vehicle interior. That is, in the high-temperature side heat medium circuit 40, the air heating circuit 40*a* that heats the ventilation air by the heat of the heat medium is configured.

Figure 7:
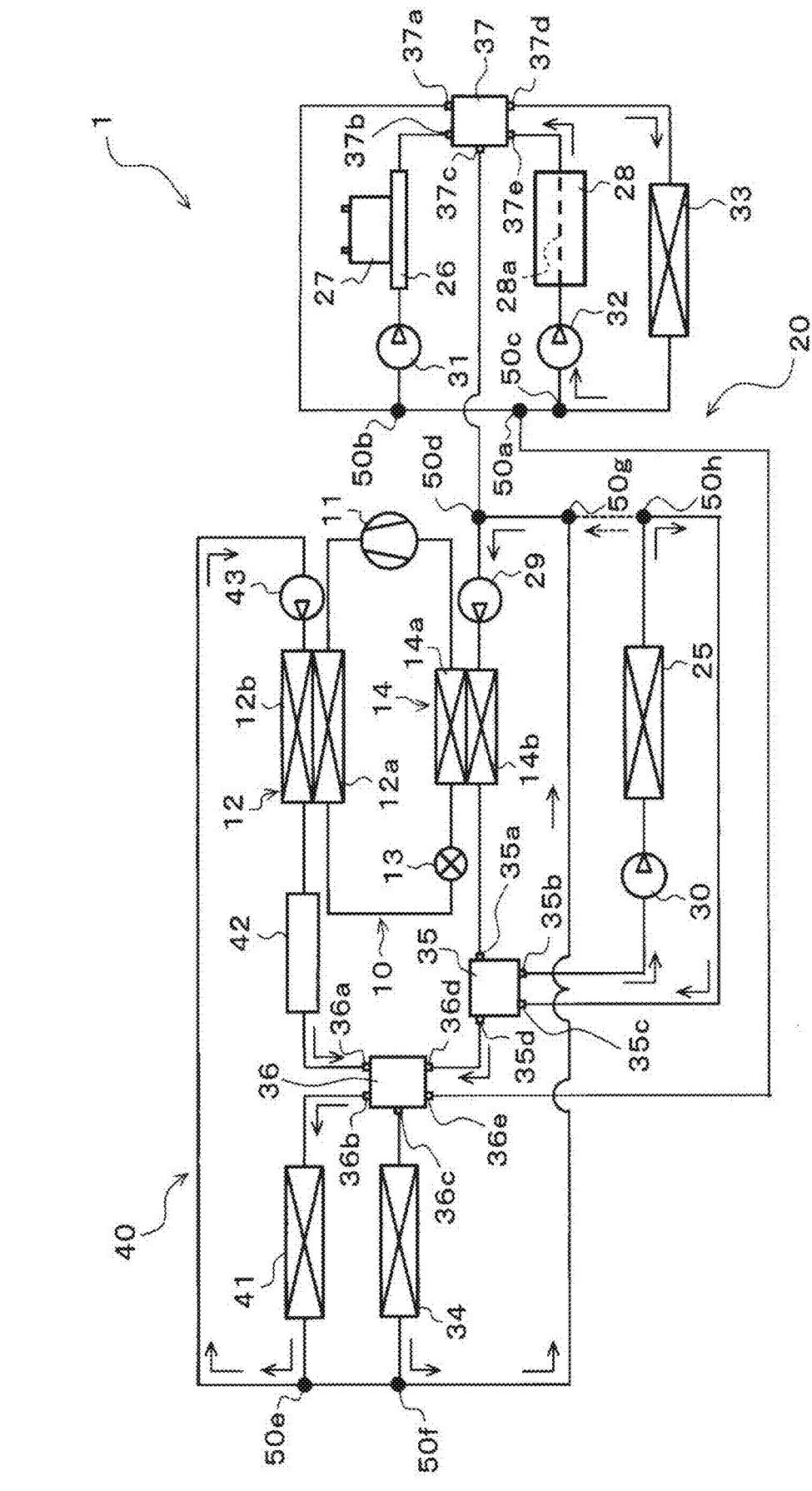
FIG. 7 is an explanatory view illustrating a flow of the heat medium in a dehumidification-heating/outside air heat absorption mode of the first embodiment.

In FIG. 7, the heat medium in the low-temperature side heat medium circuit 20 flows through the fourth low-temperature side pump 32, the equipment heat exchange unit 28, the fifth inflow-outlet 37*e* of the second five-way valve 37, the fourth inflow-outlet 37*d*, the first outside air heat exchanger 33, the third connection part 50*c*, and the fourth low-temperature side pump 32 in this order and circulates.

According to this aspect, in the equipment heat exchange unit 28, the heat medium heated by the waste heat of the in-vehicle equipment circulates via the first outside air heat exchanger 33, and thus the waste heat of the in-vehicle equipment can be dissipated to the outside air.

In the dehumidification-heating/outside air heat absorption mode, temperature zones suitable for the dehumidification-heating and the outside air heat absorption can be created respectively with one chiller 14 by adjusting the switching between the independent circulation state and the circuit linkage state and the flow rate of the heat medium between the outside air heat absorption circuit 20*d* and the air cooling circuit 20*a*.

Subsequently, as yet another example of the operation mode in which a plurality of different temperature zones are created with one chiller 14 by linking the plurality of circulation circuits, an outside air heat absorption/equipment waste heat recovery mode will be described with reference to FIGS. 10 to 12.

In the outside air heat absorption/equipment waste heat recovery mode, the temperature zone of the heat medium required for the second outside air heat exchanger 34 to absorb heat from the outside air is lower than the temperature zone of the heat medium required for the equipment heat exchange unit 28 to recover the waste heat of the in-vehicle equipment. Therefore, in the outside air heat absorption/equipment waste heat recovery mode, the refrigerant discharge capacity of the compressor 11 and the decompression level in the expansion valve 13 are determined to satisfy the cooling capacity required for the second outside air heat exchanger 34 to absorb heat from the outside air.

In the outside air heat absorption/equipment waste heat recovery mode, the temperature zone of the heat medium required for the second outside air heat exchanger 34 corresponds to the first temperature zone, and the temperature zone of the heat medium required for the equipment heat exchange unit 28 corresponds to the second temperature zone. The outside air whose heat is absorbed by the second outside air heat exchanger 34 corresponds to the first temperature adjustment target, and the in-vehicle equipment cooled by the equipment heat exchange unit 28 corresponds to the second temperature adjustment target.

The low-temperature side heat medium circuit 20 in the outside air heat absorption/equipment waste heat recovery mode includes the outside air heat absorption circuit 20*d* and the equipment waste heat recovery circuit 20*c* as the circulation circuits, and the independent circulation state or the circuit linkage state is switched to between the outside air heat absorption circuit 20*d* and the equipment waste heat recovery circuit 20*c*. In the outside air heat absorption/equipment waste heat recovery mode, the outside air heat absorption circuit 20*d* corresponds to the first circuit, and the equipment waste heat recovery circuit 20*c* corresponds to the second circuit.

In the independent circulation state in the outside air heat absorption/equipment waste heat recovery mode, the first low-temperature side pump 29 is first caused to exert a predetermined pumping capacity. The four-way valve 35 is controlled such that the heat medium having flowed in from the first inflow-outlet 35*a* flows out of the fourth inflow-outlet 35*d*.

The first five-way valve 36 is controlled such that the heat medium having flowed in from the fourth inflow-outlet 36*d* flows out of the third inflow-outlet 37*c* and the heat medium having flowed in from the first inflow-outlet 36*a* flows out of the second inflow-outlet 36*b*. As a result, the outside air heat absorption circuit 20*d* is configured as in the dehumidification-heating/outside air heat absorption mode. Description of the configuration of the outside air heat absorption circuit 20*d* will be omitted.

In the independent circulation state in the outside air heat absorption/equipment waste heat recovery mode, the fourth low-temperature side pump 32 is further caused to exert a predetermined pumping capacity. The second five-way valve 37 is controlled such that the heat medium having flowed in from the fifth inflow-outlet 37*e* flows out of the fourth inflow-outlet 37*d*. As a result, in the outside air heat absorption/equipment waste heat recovery mode, the equipment waste heat recovery circuit 20*c* is configured.

In the equipment waste heat recovery circuit 20*c* in this case, the heat medium flows through the fourth low-temperature side pump 32, the equipment heat exchange unit 28, the fifth inflow-outlet 37*e* of the second five-way valve 37, the fourth inflow-outlet 37*d*, the first outside air heat exchanger 33, the third connection part 50*c*, and the fourth low-temperature side pump 32 in this order and circulates. Therefore, in the independent circulation state in the outside air heat absorption/equipment waste heat recovery mode, the temperature zone of the heat medium related to the equipment waste heat recovery circuit 20*c* is higher than the temperature zone of the heat medium related to the outside air heat absorption circuit 20*d*.

According to the equipment waste heat recovery circuit 20*c*, the heat medium, heated by the waste heat of the in-vehicle equipment in the equipment heat exchange unit 28, circulates via the first outside air heat exchanger 33, and thus the waste heat of the in-vehicle equipment can be dissipated to the outside air. Therefore, in the outside air heat absorption/equipment waste heat recovery mode, the outside air heat absorption circuit 20*d* corresponds to the first circuit, and the equipment waste heat recovery circuit 20*c* corresponds to the second circuit, as illustrated in FIG. 11.

In the outside air heat absorption circuit 20*d* in the independent circulation state in the outside air heat absorption/equipment waste heat recovery mode, the cooling capacity of the chiller 14 is adjusted by controlling the operation of the heat pump cycle 10, so that the heat medium temperature in the second outside air heat exchanger 34 becomes lower than the outside air temperature. On the other hand, the in-vehicle equipment has a temperature higher than the outside air temperature due to waste heat. Therefore, the heat medium flowing through the equipment waste heat recovery circuit 20*c* can recover the waste heat of the in-vehicle equipment at a temperature higher than that of the outside air heat absorption circuit 20*d*.

By controlling the operation of the first five-way valve 36 in the outside air heat absorption/equipment waste heat recovery mode, the heat medium can be caused to flow in and out between the outside air heat absorption circuit 20*d* and the equipment waste heat recovery circuit 20*c*. By allowing the heat medium to flow in and out between the outside air heat absorption circuit 20*d* and the equipment waste heat recovery circuit 20*c*, it is possible to switch to the circuit linkage state in the outside air heat absorption/equipment waste heat recovery mode, as illustrated in FIGS. 10 and 12.

Specifically, the first five-way valve 36 in the outside air heat absorption/equipment waste heat recovery mode distributes the heat medium having flowed in from the fourth inflow-outlet 36*d* to a flow to flow out of the third inflow-outlet 36*c* and a flow to flow out of the fifth inflow-outlet 36*e*. At this time, the ratio between the flow rates of the heat medium on the third inflow-outlet 36*c* side and the fifth inflow-outlet 36*e* side is determined depending on the target value of a heat absorption amount in the second outside air heat exchanger 34 and the target value of a heat absorption amount in the equipment heat exchange unit 28. The target value of the heat absorption amount in the second outside air heat exchanger 34 is determined from the relationship with the outside air temperature, and the target value of the heat absorption amount in the equipment heat exchange unit 28 is determined from the temperature of the in-vehicle equipment.

The second five-way valve 37 in the outside air heat absorption/equipment waste heat recovery mode distributes the heat medium having flowed in from the fifth inflow-outlet 37*e* to a flow to flow out of the fourth inflow-outlet 37*d* and a flow to flow out of the third inflow-outlet 37*c*. The ratio between the flow rate of the heat medium on the fourth inflow-outlet 37*d* side and the flow rate of the heat medium in the third inflow-outlet 37*c* is linked to the flow rate ratio on the first five-way valve 36 side.

As a result, in the outside air heat absorption/equipment waste heat recovery mode, a part of the heat medium flowing through the outside air heat absorption circuit 20*d* can be caused to flow into the equipment waste heat recovery circuit 20*c* via the first five-way valve 36 by controlling the operations of the first five-way valve 36 and the second five-way valve 37 as described above. In addition, the thermal management system 1 can cause a part of the heat medium flowing through the equipment waste heat recovery circuit 20*c* to flow into the outside air heat absorption circuit 20*d* via the second five-way valve 37.

That is, in the outside air heat absorption/equipment waste heat recovery mode, the heat medium flow path connecting the fifth inflow-outlet 36*e* of the first five-way valve 36, the first connection part 36*a*, and the third connection part 50*c*, and the heat medium flow path connecting the third inflow-outlet 37*c* of the second five-way valve 37 and the fourth connection part 50*d*, correspond to the coupling part 21. The first five-way valve 36 and the second five-way valve 37 correspond to the flow rate adjustment part 22.

In the outside air heat absorption circuit 20*d* in the outside air heat absorption/equipment waste heat recovery mode, the heat medium absorbs heat from the outside air in the second outside air heat exchanger 34 as described above, and thus the heat medium is cooled to a target temperature lower than the outside air temperature by the endothermic action of the refrigerant in the chiller 14.

Therefore, as the flow rate of the heat medium flowing from the outside air heat absorption circuit 20*d* into the equipment waste heat recovery circuit 20*c* via the coupling part 21 increases, the temperature of the heat medium flowing through the equipment waste heat recovery circuit 20*c* can be lowered. That is, by adjusting the flow rate of the heat medium flowing between the outside air heat absorption circuit 20*d* and the equipment waste heat recovery circuit 20*c*, the temperature zone of the heat medium flowing through the equipment waste heat recovery circuit 20*c* can be adjusted to a desired temperature zone higher than the temperature zone of the heat medium flowing through the outside air heat absorption circuit 20*d*.

In other words, the temperature zone of the heat medium flowing through the outside air heat absorption circuit 20*d* can be brought close to the target value of a temperature zone determined depending on the outside air temperature, and the temperature zone of the heat medium flowing through the equipment waste heat recovery circuit 20*c* can be brought close to a temperature zone determined based on the temperature of the in-vehicle equipment.

For the high-temperature side heat medium circuit 40 in the outside air heat absorption/equipment waste heat recovery mode, the high-temperature side pump 43 is caused to exert a predetermined pumping capacity. The first five-way valve 36 is controlled such that the heat medium having flowed in from the first inflow-outlet 36*a* flows out of the second inflow-outlet 36*b*. Therefore, in the high-temperature side heat medium circuit 40, the heat medium flows through the high-temperature side pump 43, the heat medium passage 12*b* in the water-refrigerant heat exchanger 12, the electric heater 42, the first five-way valve 36, the heater core 41, and the high-temperature side pump 43 in this order and circulates, thereby constituting the air heating circuit 40*a*.

As a result, the ventilation air to be supplied to the vehicle interior is heated in the heater core 41 by the waste heat of the in-vehicle equipment pumped up with the heat pump cycle 10 and the heat generated in the electric heater 42. That is, in the outside air heat absorption/equipment waste heat recovery mode, a heating operation, in which the outside air and the waste heat of the in-vehicle equipment are used as heat sources, can be realized.

In the outside air heat absorption/equipment waste heat recovery mode, temperature zones suitable for the outside air heat absorption and the recovery of the waste heat of the in-vehicle equipment can be created respectively with one chiller 14 by adjusting the flow rate of the heat medium between the outside air heat absorption circuit 20*d* and the equipment waste heat recovery circuit 20*c*.

Next, as yet another example of the operation mode in which a plurality of different temperature zones are created with one chiller 14 by linking the plurality of circulation circuits, an outside air heat absorbing/battery cooling mode will be described with reference to FIGS. 13 to 15.

In the outside air heat absorption/battery cooling mode, the temperature zone of the heat medium required for the second outside air heat exchanger 34 to absorb heat from the outside air is lower than the temperature zone of the heat medium required for the battery heat exchange unit 26 to cool the battery 27. Therefore, in the outside air heat absorption/battery cooling mode, the refrigerant discharge capacity of the compressor 11 and the decompression level in the expansion valve 13 are determined to satisfy the cooling capacity required for the second outside air heat exchanger 34 to absorb heat from the outside air.

In the outside air heat absorption/battery cooling mode, the temperature zone of the heat medium required for the second outside air heat exchanger 34 corresponds to the first temperature zone, and the temperature zone of the heat medium required for the battery heat exchange unit 26 corresponds to the second temperature zone. In addition, the outside air whose heat is absorbed by the second outside air heat exchanger 34 corresponds to the first temperature adjustment target, and the battery 27 whose temperature is adjusted by the battery heat exchange unit 26 corresponds to the second temperature adjustment target.

The low-temperature side heat medium circuit 20 in the outside air heat absorption/battery cooling mode includes the outside air heat absorption circuit 20*d* and the battery temperature control circuit 20*b* as the circulation circuits, and the independent circulation state or the circuit linkage state is switched to between the outside air heat absorption circuit 20*d* and the battery temperature control circuit 20*b*. In the outside air heat absorption/battery cooling mode, the outside air heat absorption circuit 20*d* corresponds to the first circuit, and the battery temperature control circuit 20*b* corresponds to the second circuit.

In the independent circulation state in the outside air heat absorption/battery cooling mode, the first low-temperature side pump 29 and the second low-temperature side pump 30 are first caused to exert predetermined pumping capacities. The four-way valve 35 is controlled such that the heat medium having flowed in from the first inflow-outlet 35*a* flows out of the fourth inflow-outlet 35*d*.

The first five-way valve 36 is controlled such that the heat medium having flowed in from the fourth inflow-outlet 36*d* flows out of the third inflow-outlet 37*c* and the heat medium having flowed in from the first inflow-outlet 36*a* flows out of the second inflow-outlet 36*b*. As a result, the outside air heat absorption circuit 20*d* is configured. In the independent circulation state in the outside air heat absorption/battery cooling mode, the third low-temperature side pump 31 is further caused to exert a predetermined pumping capacity. The second five-way valve 37 is controlled such that the heat medium having flowed in from the second inflow-outlet 37*b* flows out of the first inflow-outlet 37*a*. As a result, in the outside air heat absorption/battery cooling mode, the battery temperature control circuit 20*b* is configured.

In the battery temperature control circuit 20b in this case, the heat medium flows through the third low-temperature side pump 31, the battery heat exchange unit 26, the second inflow-outlet 37b of the second five-way valve 37, the first inflow-outlet 37a, the second connection part 50b, and the third low-temperature side pump 31 in this order and circulates. Therefore, in the independent circulation state in the outside air heat absorption/battery cooling mode, heat exchange with the battery 27 is performed in the battery heat exchange unit 26, and thus the temperature zone of the heat medium related to the battery temperature control circuit 20b is higher than the temperature zone of the heat medium related to the outside air heat absorption circuit 20d. Therefore, in the outside air heat absorption/battery cooling mode, the outside air heat absorption circuit 20d corresponds to the first circuit, and the battery temperature control circuit 20b corresponds to the second circuit, as illustrated in FIG. 14.

In the outside air heat absorption circuit 20d in the independent circulation state in the outside air heat absorption/battery cooling mode, the cooling capacity of the chiller 14 is adjusted by controlling the operation of the heat pump cycle 10, so that the heat medium temperature in the second outside air heat exchanger 34 becomes lower than the outside air temperature. On the other hand, the battery 27 has a temperature higher than the outside air temperature as it is charged and discharged. Therefore, the heat medium flowing through the battery temperature control circuit 20b can cool, at a temperature higher than that of the outside air heat absorption circuit 20d, the battery 27. Therefore, the temperature zone of the heat medium to pass through the second outside air heat exchanger 34 is adjusted to a predetermined temperature zone determined to be lower than the outside air temperature.

By controlling the operation of the first five-way valve 36 in the outside air heat absorption/battery cooling mode, the heat medium can be caused to flow in and out between the outside air heat absorption circuit 20d and the battery temperature control circuit 20b. By allowing the heat medium to flow in and out between the outside air heat absorption circuit 20d and the battery temperature control circuit 20b, it is possible to switch to the circuit linkage state in the outside air heat absorption/battery cooling mode, as illustrated in FIGS. 13 and 15.

Specifically, the first five-way valve 36 in the outside air heat absorption/battery cooling mode distributes the heat medium having flowed in from the fourth inflow-outlet 36d to a flow to flow out of the third inflow-outlet 36c and a flow to flow out of the fifth inflow-outlet 36e. At this time, the ratio between the flow rates of the heat medium on the third inflow-outlet 36c side and the fifth inflow-outlet 36e side is determined depending on the target value of the heat absorption amount in the second outside air heat exchanger 34 and the target value of a heat absorption amount in the battery heat exchange unit 26. The target value of the heat absorption amount in the second outside air heat exchanger 34 is determined from the relationship with the outside air temperature, and the target value of the heat absorption amount in the battery heat exchange unit 26 is determined from the temperature of the battery 27.

The second five-way valve 37 in the outside air heat absorption/battery cooling mode distributes the heat medium having flowed in from the second inflow-outlet 37b to a flow to flow out of the first inflow-outlet 37a and a flow to flow out of the third inflow-outlet 37c. The ratio between the flow rate of the heat medium on the first inflow-outlet 37a side and the flow rate of the heat medium in the third inflow-outlet 37c is linked to the flow rate ratio on the first five-way valve 36 side.

As a result, in the outside air heat absorption/battery cooling mode, a part of the heat medium flowing through the outside air heat absorption circuit 20d can be caused to flow into the battery temperature control circuit 20b via the first five-way valve 36 by controlling the operations of the first five-way valve 36 and the second five-way valve 37 as described above. In addition, the thermal management system 1 can cause a part of the heat medium flowing through the battery temperature control circuit 20b to flow into the outside air heat absorption circuit 20d via the second five-way valve 37.

That is, in the outside air heat absorption/battery cooling mode, the heat medium flow path connecting the fifth inflow-outlet 36e of the first five-way valve 36, the first connection part 50a, and the second connection part 50b, and the heat medium flow path connecting the third inflow-outlet 37c of the second five-way valve 37 and the fourth connection part 50d, correspond to the coupling part 21. The first five-way valve 36 and the second five-way valve 37 correspond to the flow rate adjustment part 22.

In the outside air heat absorption circuit 20d in the outside air heat absorption/battery cooling mode, the heat medium absorbs heat from the outside air in the second outside air heat exchanger 34 as described above, and thus the heat medium is cooled to the target temperature lower than the outside air temperature by the endothermic action of the refrigerant in the chiller 14.

Therefore, as the flow rate of the heat medium flowing from the outside air heat absorption circuit 20d into the battery temperature control circuit 20b via the coupling part 21 increases, the temperature of the heat medium flowing through the battery temperature control circuit 20b can be lowered. That is, by adjusting the flow rate of the heat medium flowing between the outside air heat absorption circuit 20d and the battery temperature control circuit 20b, the temperature zone of the heat medium flowing through the battery temperature control circuit 20b can be adjusted to a desired temperature zone higher than the temperature zone of the heat medium flowing through the outside air heat absorption circuit 20d.

In other words, the temperature zone of the heat medium flowing through the outside air heat absorption circuit 20d can be brought close to the target value of a temperature zone determined depending on the outside air temperature, and the temperature zone of the heat medium flowing through the battery temperature control circuit 20b can be brought close to a temperature zone determined based on the proper temperature range of the battery 27.

For the high-temperature side heat medium circuit 40 in the outside air heat absorption/battery cooling mode, the high-temperature side pump 43 is caused to exert a predetermined pumping capacity. The first five-way valve 36 is controlled such that the heat medium having flowed in from the first inflow-outlet 36a flows out of the second inflow-outlet 36b. Therefore, in the high-temperature side heat medium circuit 40, the air heating circuit 40a is configured.

As a result, the ventilation air to be supplied to the vehicle interior is heated in the heater core 41 by the heat that is pumped up by the heat pump cycle 10 and generated in the battery 27 and by the heat generated in the electric heater 42. That is, in the outside air heat absorption/battery cooling mode, a heating operation, in which the outside air and the heat generated in the battery as it is charged and discharged are used as heat sources, can be realized.

In the outside air heat absorption/battery cooling mode, temperature zones suitable for the outside air heat absorption and the cooling of the battery 27 can be created respectively with one chiller 14 by adjusting the switching between the independent circulation state and the circuit linkage state and adjusting the flow rate of the heat medium between the outside air heat absorption circuit 20*d* and the battery temperature control circuit 20*b*.

In the examples of the operation mode described above, the operation mode, in which two circulation circuits are linked to create two different temperature zones with one chiller 14, has been described. However, the thermal management system 1 can adopt other aspects. Here, an example of a three-circuit linkage mode, in which three circulation circuits are linked to create three different temperature zones with one chiller 14, will be described with reference to FIGS. 16 to 20.

Figure 16:
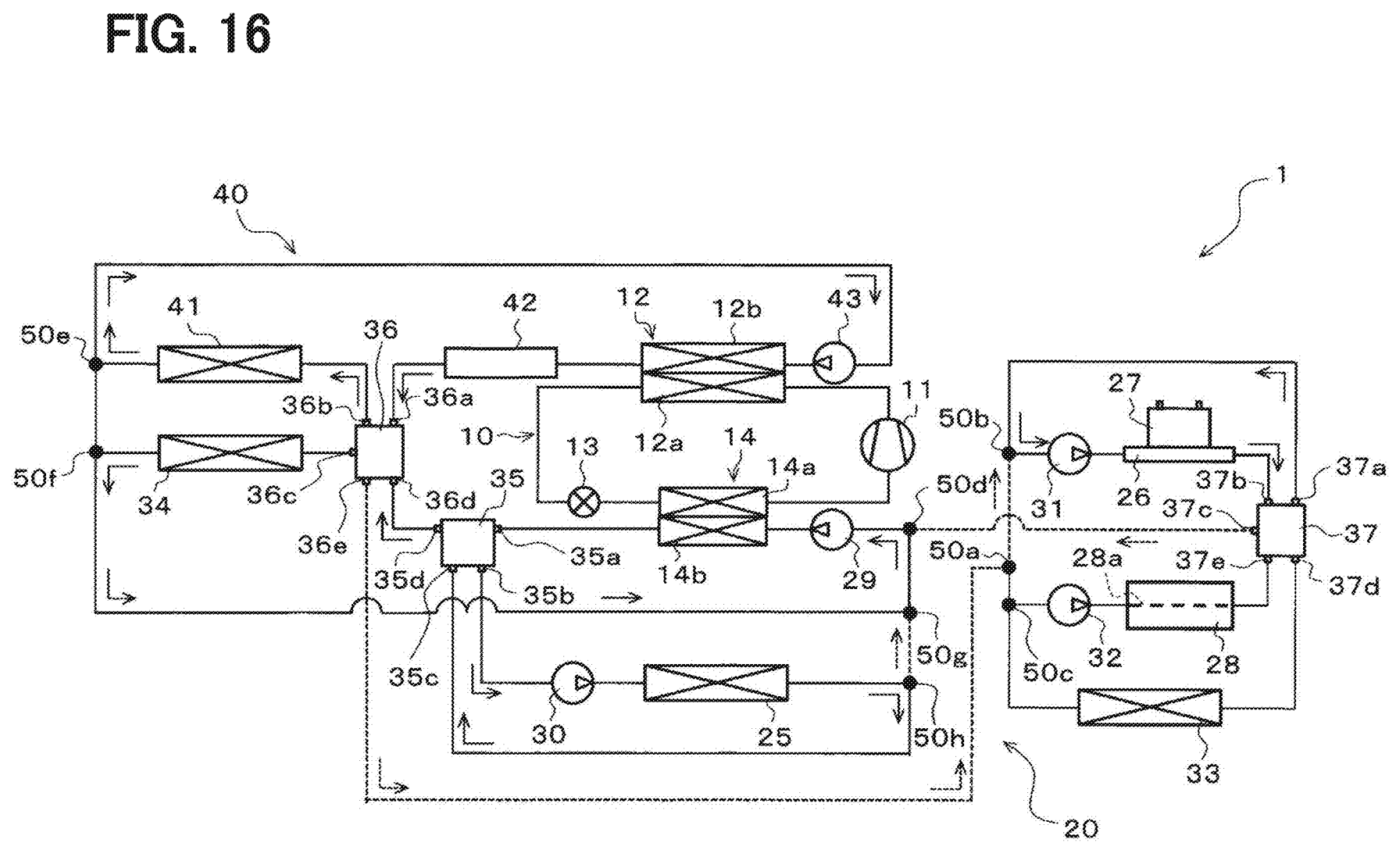

The three-circuit linkage mode illustrated in FIG. 16 includes, as the three circulation circuits, the outside air heat absorption circuit 20*d*, the air cooling circuit 20*a*, and the battery temperature control circuit 20*b*, and the heat medium can be caused to flow in and out among these three circulation circuits.

In this case, the temperature zone of the heat medium required for the second outside air heat exchanger 34 to absorb heat from the outside air is lower than the temperature zone of the heat medium required, in performing an air conditioning operation, for the cooler core 25 to cool the ventilation air. At the same time, the temperature zone of the heat medium required for the second outside air heat exchanger 34 is lower than the temperature zone of the heat medium required for the battery heat exchange unit 26 to cool the battery 27. Therefore, in the three-circuit linkage mode, the refrigerant discharge capacity of the compressor 11 and the decompression level in the expansion valve 13 are determined to satisfy the cooling capacity required for the second outside air heat exchanger 34 to absorb heat from the outside air.

In the three-circuit linkage mode, four states can be created by independent/linkage aspects related to the three circulation circuits of the outside air heat absorption circuit 20*d*, the air cooling circuit 20*a*, and the battery temperature control circuit 20*b*. In the three-circuit linkage mode in this case, the outside air heat absorption circuit 20*d* corresponds to the first circuit, and the air cooling circuit 20*a* corresponds to the second circuit. The battery temperature control circuit 20*b* corresponds to a third circuit.

Therefore, the second outside air heat exchanger 34 in the outside air heat absorption circuit 20*d* corresponds to the first heat exchange unit, and the cooler core 25 in the air cooling circuit 20*a* corresponds to the second heat exchange unit. The battery heat exchange unit 26 in the battery temperature control circuit 20*b* corresponds to a third heat exchange unit. The temperature zone of the heat medium required for the second outside air heat exchanger 34 corresponds to the first temperature zone, and the temperature zone of the heat medium required for the cooler core 25 corresponds to the second temperature zone. The temperature zone of the heat medium required for the battery heat exchange unit 26 corresponds to a third temperature zone.

Furthermore, in the three-circuit linkage mode, the outside air whose heat is absorbed by the second outside air heat exchanger 34 corresponds to the first temperature adjustment target, and the ventilation air cooled by the cooler core 25 corresponds to the second temperature adjustment target.

The battery 27 whose temperature is adjusted by the battery heat exchange unit 26 corresponds to a third temperature adjustment target.

A state, in which the heat medium circulates independently in the outside air heat absorption circuit 20*d*, the air cooling circuit 20*a*, and the battery temperature control circuit 20*b*, respectively, is referred to as an independent circulation state in the three-circuit linkage mode. A state, in which the outside air heat absorption circuit 20*d* and the air cooling circuit 20*a* are linked and the heat medium is circulated independently in the battery temperature control circuit 20*b*, is an example of a two-circuit linkage state in the three-circuit linkage mode. A state, in which the outside air heat absorption circuit 20*d* and the battery temperature control circuit 20*b* are linked and the heat medium is circulated independently in the air cooling circuit 20*a*, is another example of the two-circuit linkage state in the three-circuit linkage mode. A state, in which the outside air heat absorption circuit 20*d*, the air cooling circuit 20*a*, and the battery temperature control circuit 20*b* are linked, is referred to as a three-circuit linkage state in the three-circuit linkage mode.

In the independent circulation state in the three-circuit linkage mode, the first low-temperature side pump 29 is first caused to exert a predetermined pumping capacity. The four-way valve 35 is controlled such that the heat medium having flowed in from the first inflow-outlet 35*a* flows out of the fourth inflow-outlet 35*d*. The first five-way valve 36 is controlled such that the heat medium having flowed in from the fourth inflow-outlet 36*d* flows out of the third inflow-outlet 37*c*. As a result, the outside air heat absorption circuit 20*d* is configured.

Furthermore, the second low-temperature side pump 30 is caused to exert a predetermined pumping capacity. The four-way valve 35 is controlled such that the heat medium having flowed in from the third inflow-outlet 35*c* flows out of the second inflow-outlet 35*b*. As a result, the air cooling circuit 20*a* is configured.

Then, the third low-temperature side pump 31 is caused to exert a predetermined pumping capacity. The second five-way valve 37 is controlled such that the heat medium having flowed in from the second inflow-outlet 37*b* flows out of the first inflow-outlet 37*a*. As a result, the battery temperature control circuit 20*b* is configured.

Figure 17:
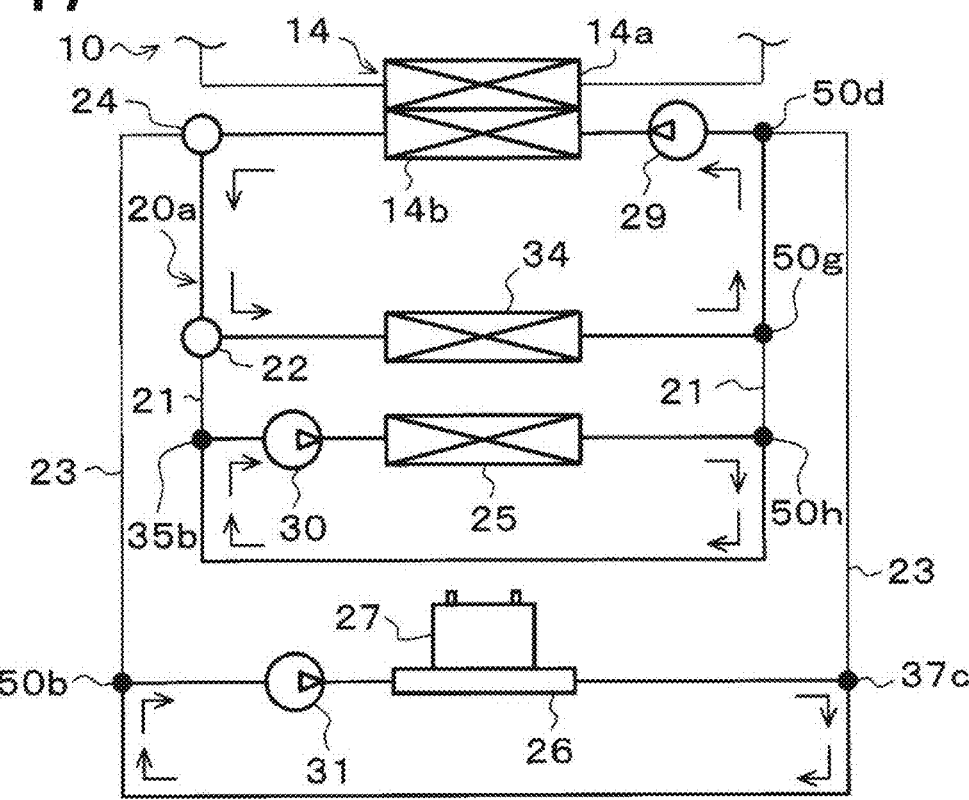
FIG. 17 is an explanatory view illustrating an independent circulation state in the example of the three-circuit linkage mode of the first embodiment.

By controlling the operation of each component of the thermal management system 1 as described above, an independent circulation state, in which the heat medium circulates independently in the outside air heat absorption circuit 20*d*, the air cooling circuit 20*a*, and the battery temperature control circuit 20*b*, is configured as illustrated in FIG. 17.

The two-circuit linkage state in the three-circuit linkage mode refers to a state in which, of the three circulation circuits, two circulation circuits are linked by flowing in and out of the heat medium and the heat medium circulates independently in the remaining one circulation circuit.

In the three-circuit linkage mode by the outside air heat absorption circuit 20*d*, the air cooling circuit 20*a*, and the battery temperature control circuit 20*b*, a state, in which the circulation circuits are linked by the flowing in and out of the heat medium between the outside air heat absorption circuit 20*d* and the air cooling circuit 20*a* and the battery temperature control circuit 20*b* is independent, can be realized.

Figure 18:
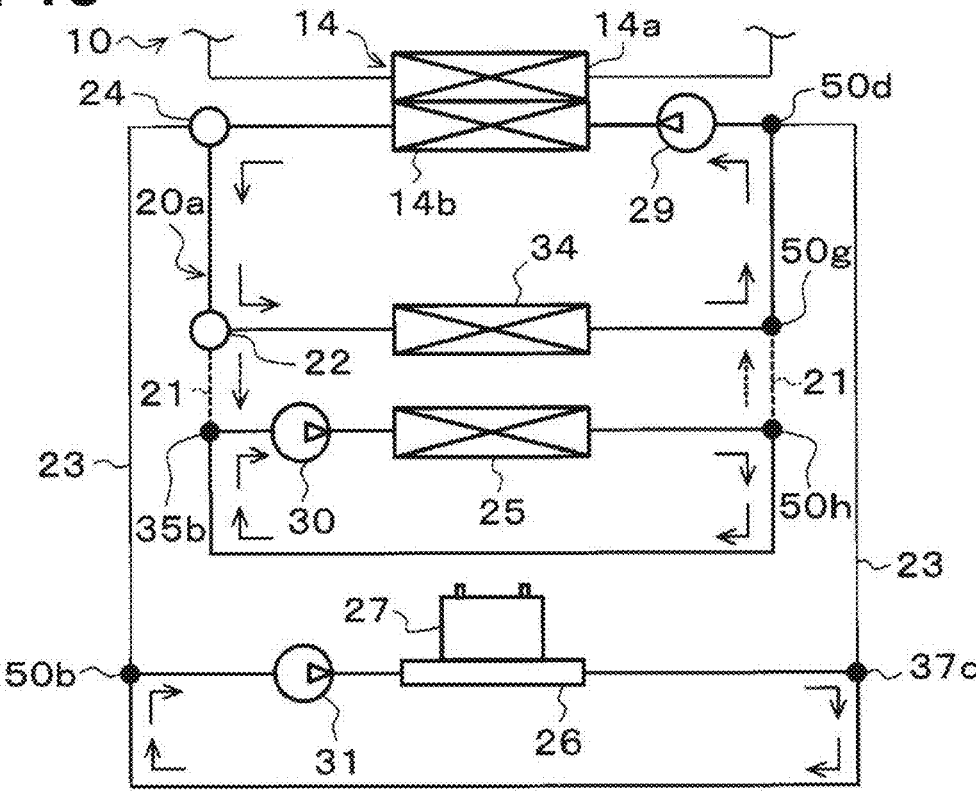
FIG. 18 is an explanatory view illustrating a two-circuit linkage state in the example of the three-circuit linkage mode of the first embodiment.

Therefore, the two-circuit linkage state by the outside air heat absorption circuit 20*d* and the air cooling circuit 20*a*, illustrated in FIG. 18, can be referred to as a modification of the dehumidification-heating/outside air heat absorption mode described above, and is a state in which, in the dehumidification-heating/outside air heat absorption mode, the heat medium is circulated independently in the battery temperature control circuit 20b. Therefore, detailed description of the two-circuit linkage state related to the outside air heat absorption circuit 20d and the air cooling circuit 20a in the three-circuit linkage mode will be omitted.

In the three-circuit linkage mode in the thermal management system 1, a state, in which the circulation circuits are linked by flowing in and out of the heat medium between the outside air heat absorption circuit 20d and the battery temperature control circuit 20b and the air cooling circuit 20a is independent, can be realized.

Figure 19:
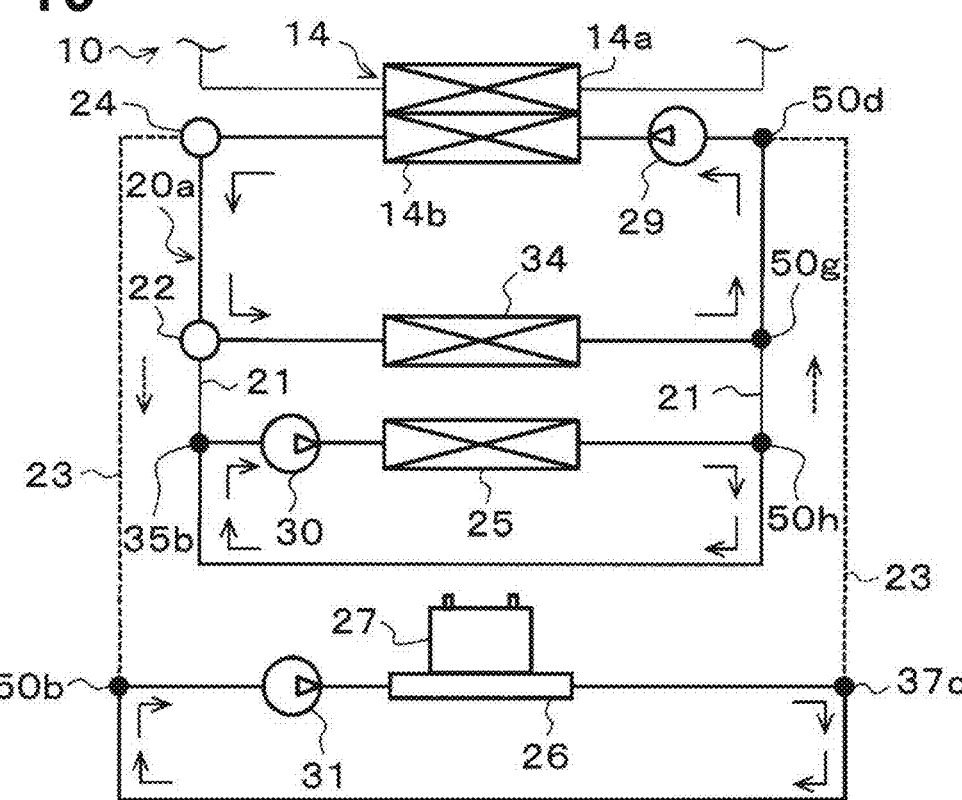
FIG. 19 is an explanatory view illustrating an another two-circuit linkage state in the example of the three-circuit linkage mode of the first embodiment.

That is, the two-circuit linkage state by the outside air heat absorption circuit 20d and the battery temperature control circuit 20b, illustrated in FIG. 19, can be referred to as a modification of the outside air heat absorption/battery cooling mode described above, and is a state in which, in the outside air heat absorption/battery cooling mode, the heat medium is circulated independently in the air cooling circuit 20a. Therefore, detailed description, again, of the two-circuit linkage state related to the outside air heat absorption circuit 20d and the battery temperature control circuit 20b in the three-circuit linkage mode will be omitted.

In the three-circuit linkage state related to the outside air heat absorption circuit 20d, the air cooling circuit 20a, and the battery temperature control circuit 20b, the flowing in and out of the heat medium between the outside air heat absorption circuit 20d and the air cooling circuit 20a and the flowing in and out of the heat medium between the outside air heat absorption circuit 20d and the battery temperature control circuit 20b are controlled.

The flowing in and out of the heat medium between the outside air heat absorption circuit 20d and the air cooling circuit 20a is realized by controlling the operation of the four-way valve 35. The four-way valve 35 distributes the heat medium having flowed in from the first inflow-outlet 35a to a flow to flow out of the second inflow-outlet 35b and a flow to flow out of the fourth inflow-outlet 35d. At this time, the ratio between the flow rate of the heat medium on the second inflow-outlet 35b side and the flow rate of the heat medium on the fourth inflow-outlet 35d side is determined depending on the difference between the target cooling capacity required for cooling the ventilation air and the temperature of the heat medium flowing through the cooler core 25.

Regarding the linkage between the outside air heat absorption circuit 20d and the air cooling circuit 20a, the heat medium flow path connecting the first inflow-outlet 35a and the second inflow-outlet 35b of the four-way valve 35 and the heat medium flow path connecting the eighth connection part 50h and the seventh connection part 50g correspond to the coupling part 21. The four-way valve 35 corresponds to the flow rate adjustment part 22.

In the outside air heat absorption circuit 20d in this case, the heat medium absorbs heat from the outside air in the second outside air heat exchanger 34, and thus the heat medium is cooled to a target temperature lower than the outside air temperature by the endothermic action of the refrigerant in the chiller 14. In addition, in the air cooling circuit 20a, the ventilation air is cooled to realize the dehumidification-heating and the air conditioning, and thus the temperature zone of the heat medium in the air cooling circuit 20a is controlled so as to have a target value higher than the temperature zone on the outside air heat absorption circuit 20d side.

Therefore, as the flow rate of the heat medium flowing from the outside air heat absorption circuit 20d into the air cooling circuit 20a via the coupling part 21 increases, the temperature of the heat medium flowing through the air cooling circuit 20a can be lowered. That is, by adjusting the flow rate of the heat medium flowing between the outside air heat absorption circuit 20d and the air cooling circuit 20a, the temperature zone of the heat medium flowing through the air cooling circuit 20a can be adjusted to a desired temperature zone higher than the temperature zone of the heat medium flowing through the outside air heat absorption circuit 20d.

In the three-circuit linkage mode, the flowing in and out of the heat medium between the outside air heat absorption circuit 20d and the battery temperature control circuit 20b is realized by controlling the operations of the first five-way valve 36 and the second five-way valve 37. The first five-way valve 36 distributes the heat medium having flowed in from the fourth inflow-outlet 36d to a flow to flow out of the third inflow-outlet 36c and a flow to flow out of the fifth inflow-outlet 36e.

At this time, the ratio between the flow rates of the heat medium on the third inflow-outlet 36c side and the fifth inflow-outlet 36e side is determined depending on the target value of the heat absorption amount in the second outside air heat exchanger 34 and the target value of a heat absorption amount in the battery heat exchange unit 26. The target value of the heat absorption amount in the second outside air heat exchanger 34 is determined from the relationship with the outside air temperature, and the target value of the heat absorption amount in the battery heat exchange unit 26 is determined from the temperature of the battery 27.

The second five-way valve 37 distributes the heat medium having flowed in from the second inflow-outlet 37b to a flow to flow out of the first inflow-outlet 37a and a flow to flow out of the third inflow-outlet 37c. The ratio between the flow rate of the heat medium on the first inflow-outlet 37a side and the flow rate of the heat medium in the third inflow-outlet 37c is linked to the flow rate ratio on the first five-way valve 36 side.

Regarding the linkage between the outside air heat absorption circuit 20d and the battery temperature control circuit 20b, the heat medium flow path connecting the fifth inflow-outlet 36e of the first five-way valve 36, the first connection part 50a, and the second connection part 50b corresponds to an example of a low-temperature side coupling part 23. Similarly, the heat medium flow path connecting the third inflow-outlet 37c of the second five-way valve 37 and the fourth connection part 50d corresponds to an example of the low-temperature side coupling part 23. The first five-way valve 36 and the second five-way valve 37 correspond to a low-temperature side flow rate adjustment part 24.

In the outside air heat absorption circuit 20d in this case, the heat medium absorbs heat from the outside air in the second outside air heat exchanger 34, and thus the heat medium is cooled to a target temperature lower than the outside air temperature by the endothermic action of the refrigerant in the chiller 14. Therefore, as the flow rate of the heat medium flowing from the outside air heat absorption circuit 20d into the battery temperature control circuit 20b via the low-temperature side coupling part 23 increases, the temperature of the heat medium flowing through the battery temperature control circuit 20b can be lowered.

That is, by adjusting the flow rate of the heat medium flowing between the outside air heat absorption circuit 20d and the battery temperature control circuit 20b, the temperature zone of the heat medium flowing through the battery temperature control circuit 20b can be adjusted to a desired temperature zone higher than the temperature zone of the heat medium flowing through the outside air heat absorption circuit 20d.

In the three-circuit linkage mode, the temperature zone of the heat medium circulating through the air cooling circuit 20a, the second circuit, and the temperature zone of the heat medium circulating through the battery temperature control circuit 20b, the third circuit, can be appropriately adjusted as long as the temperature zones are higher than the temperature zone of the heat medium related to the outside air heat absorption circuit 20d, the first circuit. The temperature zone of the heat medium related to the air cooling circuit 20a and the temperature zone of the heat medium related to the battery temperature control circuit 20b can be adjusted to different temperature zones as long as the temperature zones are higher than the temperature zone of the heat medium related to the outside air heat absorption circuit 20d.

Figure 20:
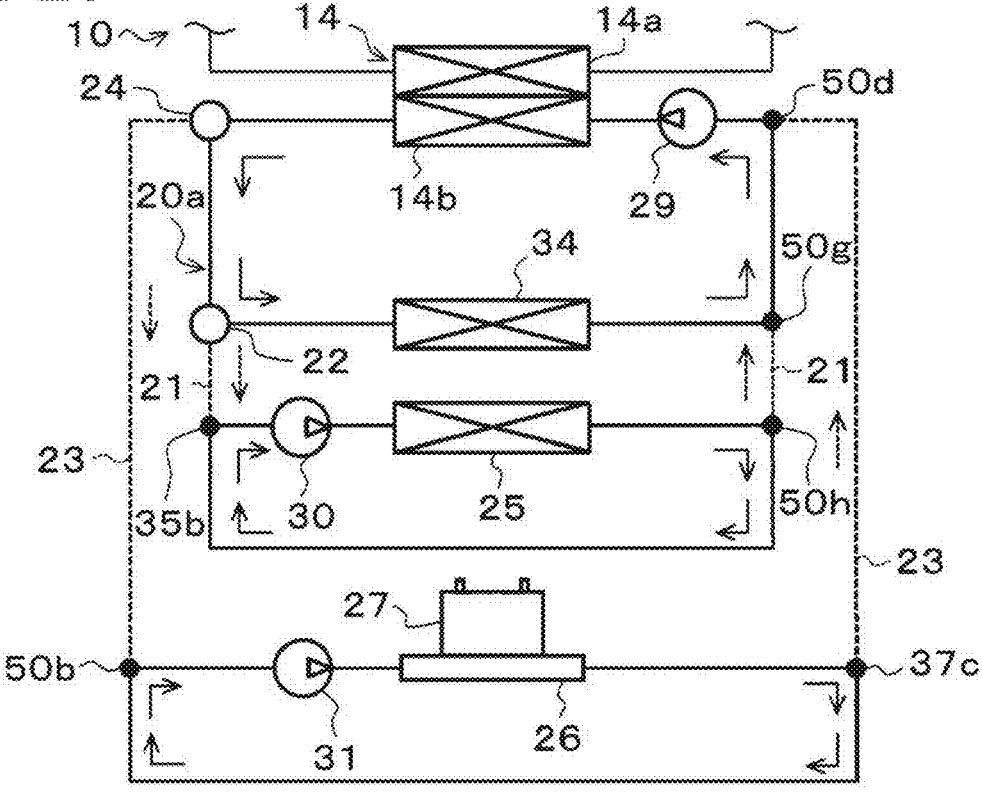
FIG. 20 is an explanatory view illustrating a three-circuit linkage state in the example of the three-circuit linkage mode of the first embodiment.

That is, according to the thermal management system 1, the temperature zones of the heat medium in the outside air heat absorption circuit 20d, the air cooling circuit 20a, and the battery temperature control circuit 20b can be adjusted to different temperature zones with one chiller 14 by executing the three-circuit linkage mode illustrated in FIG. 20.

As described above, the thermal management system 1 according to the first embodiment includes the heat pump cycle 10 and the low-temperature side heat medium circuit 20, and a plurality of circulation circuits, such as the air cooling circuit 20a and the battery temperature control circuit 20b, can be configured in the low-temperature side heat medium circuit 20. Then, the thermal management system 1 controls the operation of the flow rate adjustment part 22 to adjust the flow rate of the heat medium flowing through the coupling part 21 connecting the circulation circuits to each other. Therefore, the temperature zones of the heat medium in the plurality of circulation circuits can be adjusted to be different by using the heat medium cooled with one chiller 14.

As a result, the thermal management system 1 can distribute the cooling capacity realized by one chiller 14 to the heat the exchange units (the cooler core 25 and the battery heat exchange unit 26) in different circulation circuits depending on the flow rates of the heat medium flowing through the coupling parts 21. That is, the thermal management system 1 can realize the distribution of the cooling capacity in a simpler control aspect than in the case of the distribution in a vapor compression refrigeration cycle or the like, and can create a plurality of different temperature zones by using the cold heat generated with one chiller 14 via the heat medium circuits.

In addition, the thermal management system 1 controls the operation of the flow rate adjustment part 22 to adjust the flow rate of the heat medium when a part of the heat medium flowing through one circulation circuit is caused to flow into the other circulation circuit via the coupling part 21. As a result, the temperature zones of the heat medium in one circulation circuit and the other circulation circuit can be brought close to the target values of the temperature zones respectively determined for the one circulation circuit and the other circulation circuit.

In the air conditioning/battery cooling mode, the thermal management system 1 cools the ventilation air to be supplied to the vehicle interior by the cooler core 25 disposed in the air cooling circuit 20a, as illustrated in FIGS. 4 to 6. At the same time, the thermal management system 1 can cool the battery 27, an example of the heat generating equipment, by the battery heat exchange unit 26 disposed in the battery temperature control circuit 20b.

Therefore, the thermal management system 1 controls the flowing in and out of the heat medium between the air cooling circuit 20a and the battery temperature control circuit 20b using one chiller 14, so that a temperature zone of the heat medium suitable for air conditioning the vehicle interior and a temperature zone of the heat medium suitable for cooling the battery 27 can be created.

Figure 10:
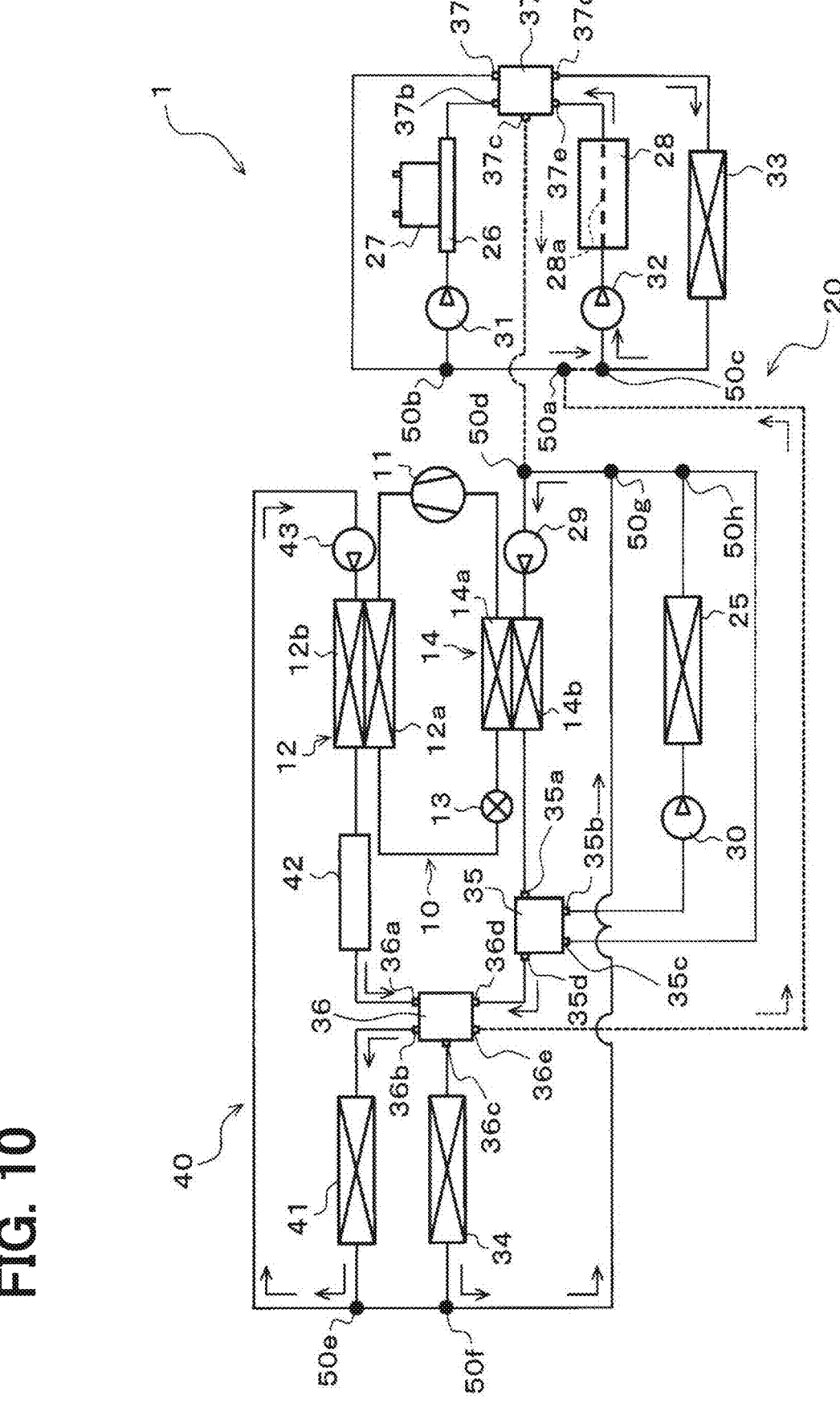
FIG. 10 is an explanatory view illustrating a flow of the heat medium in an outside air heat absorption/equipment waste heat recovery mode of the first embodiment.
Figure 11:
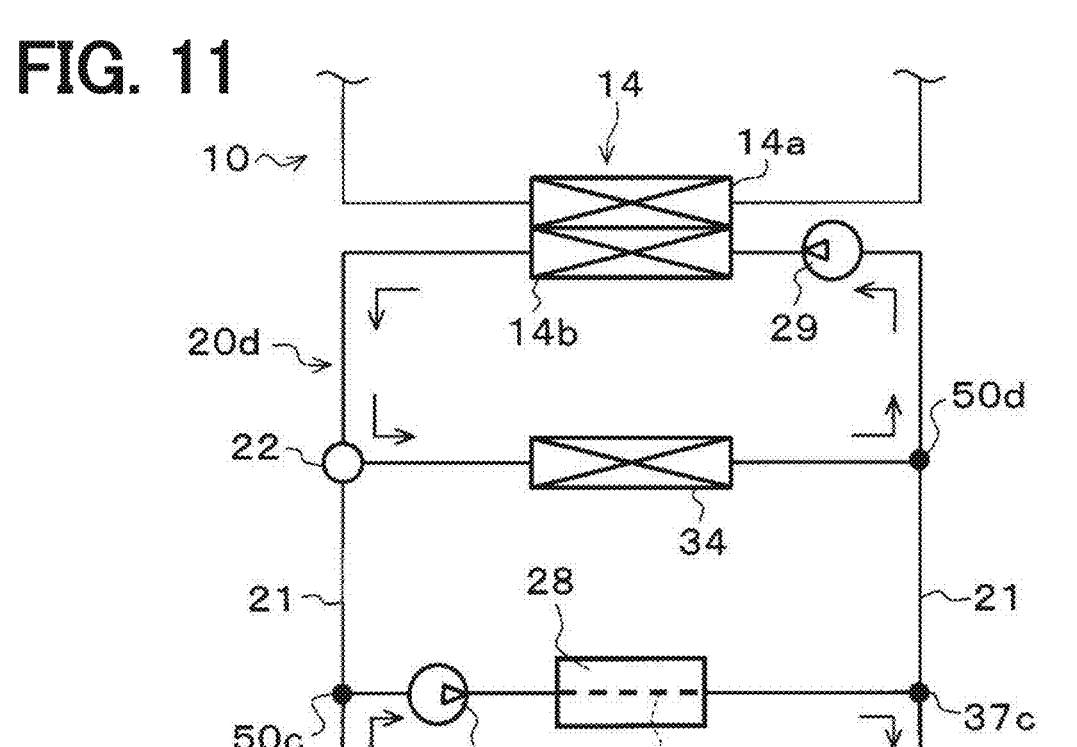
FIG. 11 is an explanatory view illustrating an independent circulation state in the outside air heat absorption/equipment waste heat recovery mode of the first embodiment.
Figure 12:
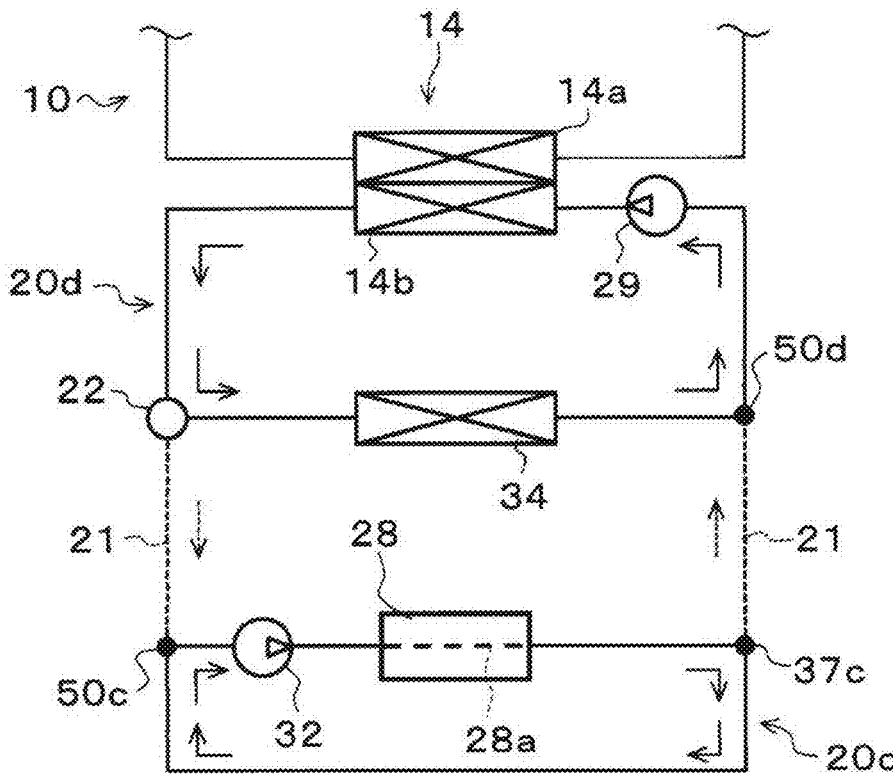
FIG. 12 is an explanatory view illustrating a circuit linkage state in the outside air heat absorption/equipment waste heat recovery mode of the first embodiment.

In the outside air heat absorption/equipment waste heat recovery mode, the thermal management system 1 can absorb heat from the outside air by the second outside air heat exchanger 34 in the outside air heat absorption circuit 20d, as illustrated in FIGS. 10 to 12. At the same time, the thermal management system 1 can recover the waste heat of the in-vehicle equipment, the heat generating equipment, by the equipment heat exchange unit 28 disposed in the equipment waste heat recovery circuit 20c.

Therefore, the thermal management system 1 controls the flowing in and out of the heat medium between the outside air heat absorption circuit 20d and the equipment waste heat recovery circuit 20c, whereby a temperature zone of the heat medium suitable for absorbing heat from the outside air and a temperature zone of the heat medium suitable for recovering the waste heat occurring in the in-vehicle equipment can be created.

Figure 13:
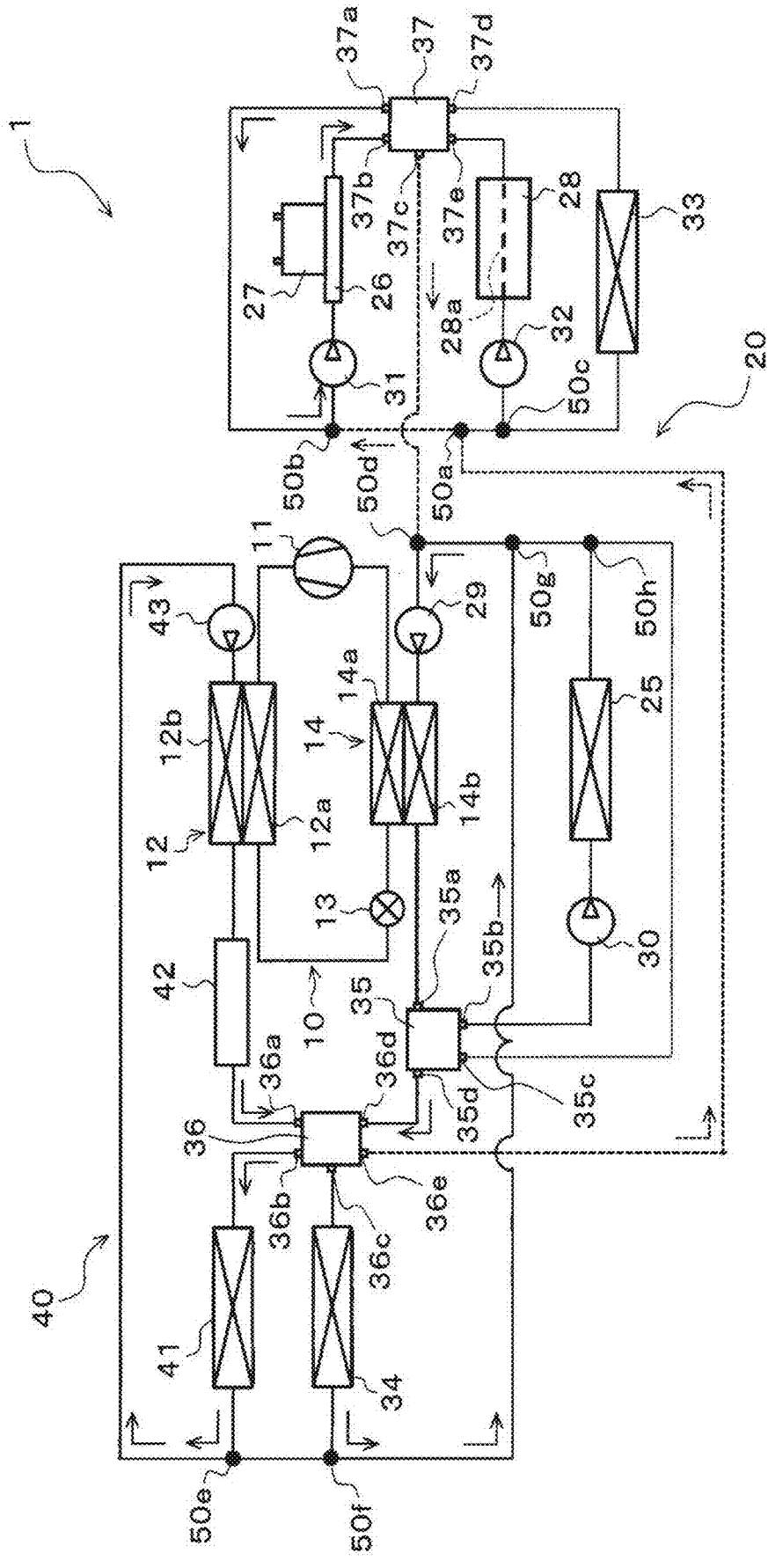
FIG. 13 is an explanatory view illustrating a flow of the heat medium in an outside air heat absorption/battery cooling mode of the first embodiment.
Figure 14:
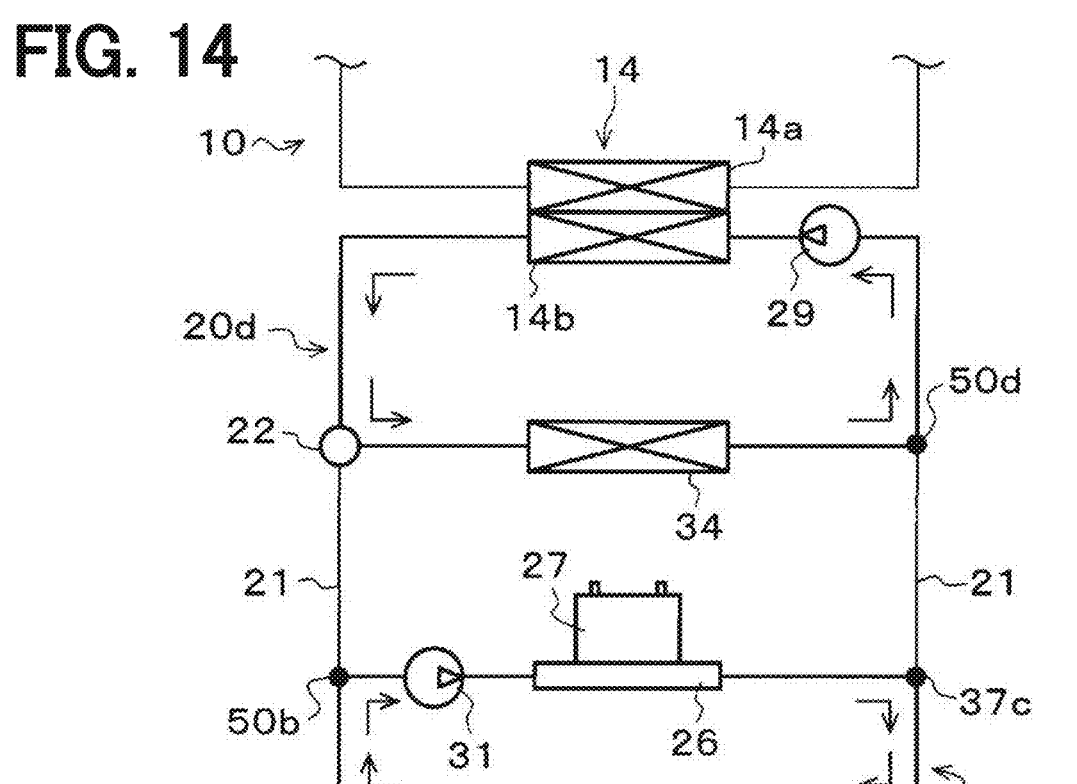
FIG. 14 is an explanatory view illustrating an independent circulation state in the outside air heat absorption/battery cooling mode of the first embodiment.
Figure 15:
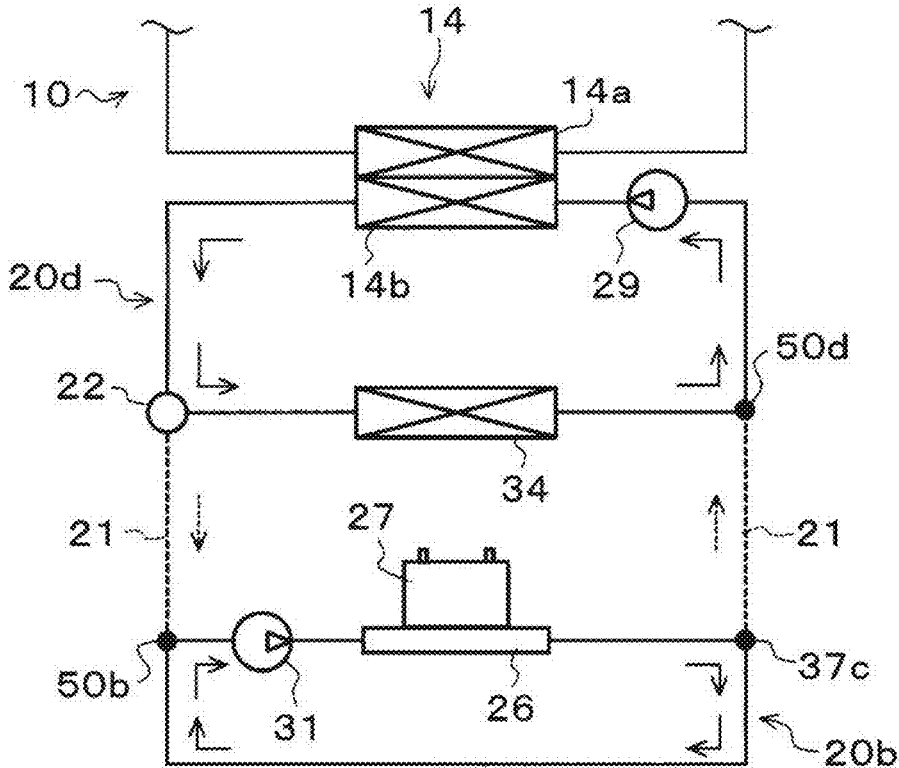
FIG. 15 is an explanatory view illustrating a circuit linkage state in the outside air heat absorption/battery cooling mode of the first embodiment.

In the outside air heat absorption/battery cooling mode, the thermal management system 1 can absorb heat from outside air by the second outside air heat exchanger 34 in the outside air heat absorption circuit 20d, as illustrated in FIGS. 13 to 15. At the same time, the thermal management system 1 absorbs heat from the battery 27, the heat generating equipment, by the battery heat exchange unit 26 in the battery temperature control circuit 20b, whereby the battery 27 can be cooled.

Therefore, the thermal management system 1 controls the flowing in and out of the heat medium between the outside air heat absorption circuit 20d and the battery temperature control circuit 20b, whereby a temperature zone of the heat medium suitable for absorbing heat from the outside air and a temperature zone of the heat medium suitable for cooling the battery 27 can be created by using one chiller 14.

In the three-circuit linkage mode, the thermal management system 1 can control the flowing in and out of the heat medium among the outside air heat absorption circuit 20d, the air cooling circuit 20a, and the equipment waste heat recovery circuit 20c, as illustrated in FIGS. 16 to 20. That is, the thermal management system 1 can appropriately perform heat absorption from the outside air in the outside air heat absorption circuit 20d, cooling of the ventilation air in the air cooling circuit 20a, and temperature adjustment of the battery 27 in the battery temperature control circuit 20b, respectively.

Therefore, by using one chiller 14, the thermal management system 1 can control the flowing in and out of the heat medium between the outside air heat absorption circuit 20d and the air cooling circuit 20a and control the flowing in and out of the heat medium between the outside air heat absorption circuit 20d and the battery temperature control circuit 20b. As a result, the thermal management system 1 can create a temperature zone of the heat medium suitable for absorbing heat from the outside air, a temperature zone of the heat medium suitable for the air conditioning operation, and a temperature zone of the heat medium suitable for cooling the battery 27, respectively.

Second Embodiment

Next, a second embodiment different from the above-described embodiment will be described with reference to FIGS. 21 to 23. The second embodiment is different from the above-described embodiment in configurations and the like of a low-temperature side heat medium circuit 20 and a high-temperature side heat medium circuit 40. Other basic configurations and the like are the same as those in the above-described embodiment, and thus the description thereof, again, will be omitted.

First, a configuration of a thermal management system 1 according to the second embodiment will be described with reference to FIG. 21. In the thermal management system 1 according to the second embodiment, the configurations of the low-temperature side heat medium circuit 20 and the high-temperature side heat medium circuit 40 are different from those in the first embodiment in order to link an air heating circuit 40a in the high-temperature side heat medium circuit 40 and a battery temperature control circuit 20b in the low-temperature side heat medium circuit 20. Other points are the same as those in the first embodiment, and thus the description thereof, again, will be omitted.

In the thermal management system 1 according to the second embodiment, a high-temperature side three-way valve 44 is disposed between a second inflow-outlet 36b of a first five-way valve 36 and the heat medium inlet side of a heater core 41. The high-temperature side three-way valve 44 is an electric three-way flow regulating valve that has one inflow port and two outflow ports and can continuously adjust a passage area ratio between the two outflow ports.

The inflow port of the high-temperature side three-way valve 44 is connected to the second inflow-outlet 36b of the first five-way valve 36, and one of the outflow ports of the high-temperature side three-way valve 44 is connected to the heat medium inlet side of the heater core 41. As illustrated in FIG. 21, the other of the outflow ports of the high-temperature side three-way valve 44 is connected to a ninth connection part 50i disposed in the battery temperature control circuit 20b in the low-temperature side heat medium circuit 20.

The ninth connection part 50i is formed in a three-way joint shape having three inflow-outlets communicating with each other, similarly to the first connection part 50a to the eighth connection part 50h described above. A second connection part 50b is connected to one of the inflow-outlets of the ninth connection part 50i. The suction port side of a third low-temperature side pump 31 is connected to another of the inflow-outlets of the ninth connection part 50i. The other side of the outflow ports of the high-temperature side three-way valve 44 is connected to yet another of the inflow-outlets of the ninth connection part 50i.

The thermal management system 1 according to the second embodiment further includes a tenth connection part 50j and an eleventh connection part 50k formed in a three-way joint shape, similarly to the ninth connection part 50i.

Figure 21:
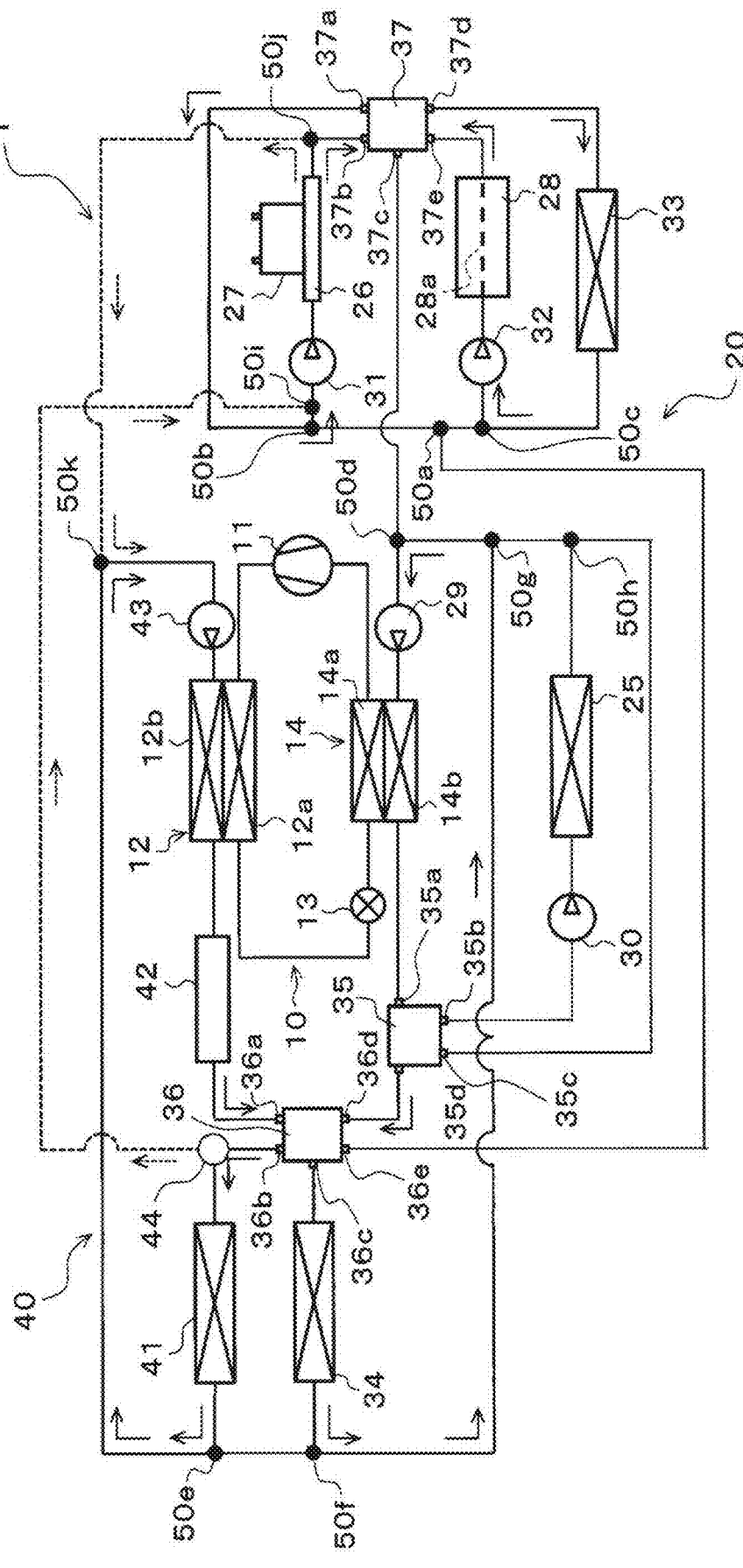
FIG. 21 is an overall configuration view of a thermal management system according to a second embodiment.

As illustrated in FIG. 21, the tenth connection part 50j is disposed between the heat medium outlet of a battery heat exchange unit 26 and a second inflow-outlet 37b of a second five-way valve 37. That is, the heat medium outlet side of the battery heat exchange unit 26 is connected to one of the inflow-outlets of the tenth connection part 50j, and the second inflow-outlet 37b of the second five-way valve 37 is connected to another of the inflow-outlets of the tenth connection part 50j.

The eleventh connection part 50k positioned between a fifth connection part 50e and the suction port of a high-temperature side pump 43 is connected to yet another of the inflow-outlets of the tenth connection part 50j. An inflow-outlet of the fifth connection part 50e is connected to one of the inflow-outlets of the eleventh connection part 50k, and the suction port side of the high-temperature side pump 43 is connected to another of the inflow-outlets of the eleventh connection port 50k. Yet another of the inflow-outlets of the eleventh connection part 50k is connected to the yet another of the inflow-outlets of the tenth connection part 50j.

In the thermal management system 1 according to the second embodiment, a heating/battery warm-up mode can be realized as an operation mode in which a part of the heat medium flowing through the high-temperature side heat medium circuit 40 is caused to flow into the low-temperature side heat medium circuit 20 to cause both to be linked to each other.

The heating/battery warm-up mode of the second embodiment will be described with reference to FIGS. 21 to 23. In the thermal management system 1 in the heating/battery warm-up mode, the air heating circuit 40a for heating the ventilation air to be supplied to the vehicle interior and the battery temperature control circuit 20b for adjusting the temperature of a battery 27 are formed.

In the heating/battery warm-up mode, the flowing in and out of the heat medium between the air heating circuit 40a and the battery temperature control circuit 20b is allowed, and an independent circulation state or a circuit linkage state is switched to. In the heating/battery warm-up mode, the air heating circuit 40a corresponds to a part of the high-temperature side heat medium circuit, and the battery temperature control circuit 20b corresponds to a second circuit.

In the independent circulation state in the heating/battery warm-up mode, the high-temperature side pump 43 is caused to exert a predetermined pumping capacity. The first five-way valve 36 is controlled such that the heat medium having flowed in from the first inflow-outlet 36a flows out of the second inflow-outlet 36b. The high-temperature side three-way valve 44 is controlled such that all the heat medium having flowed out of the second inflow-outlet 36b of the first five-way valve 36 flows out toward the heater core 41.

Figure 22:
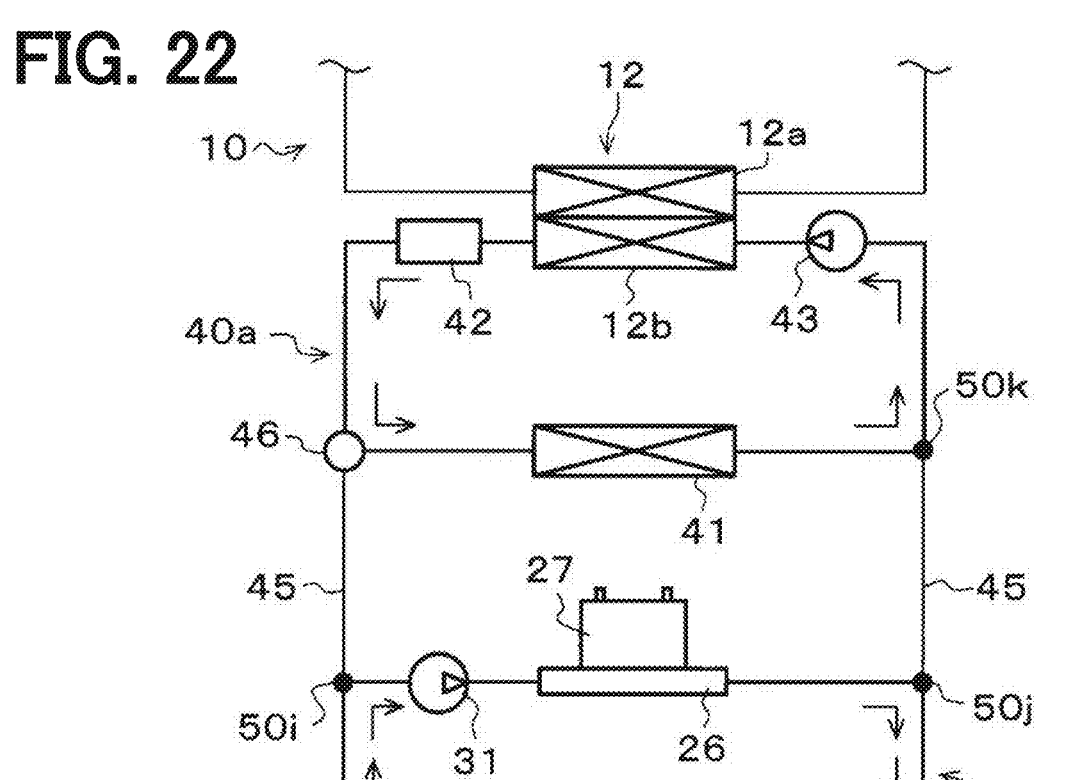
FIG. 22 is an explanatory view illustrating an independent circulation state in a heating/battery warm-up mode of the second embodiment.
Figure 23:
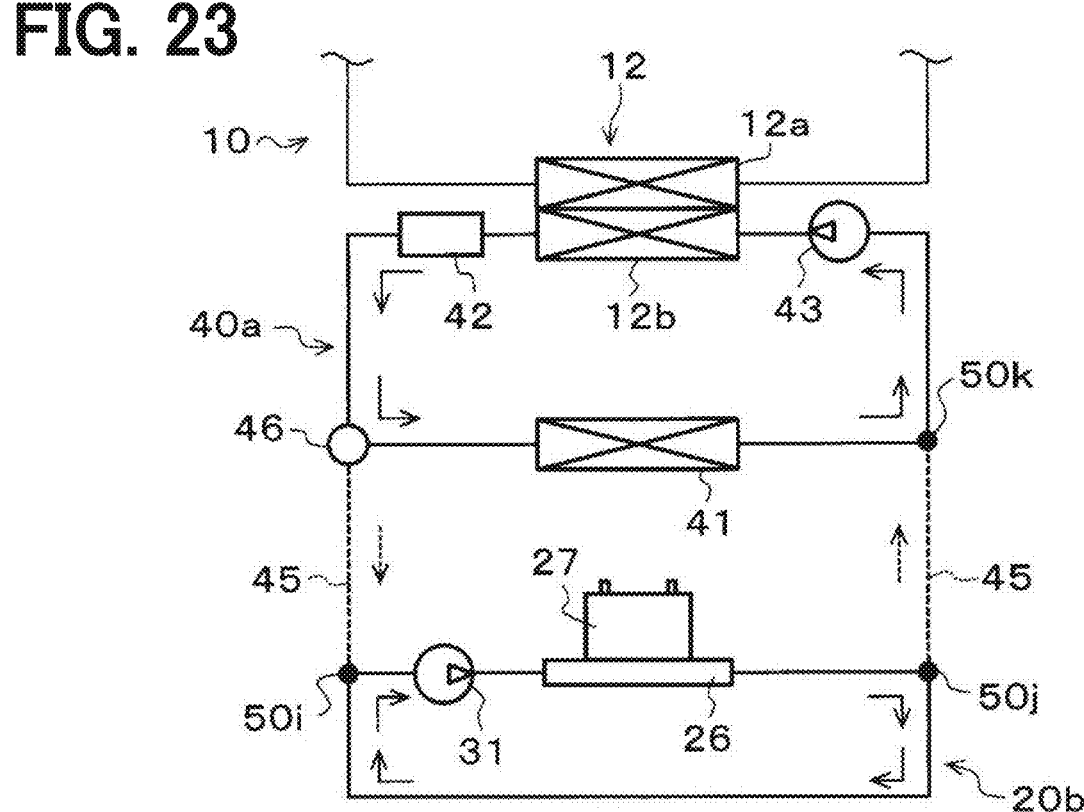
FIG. 23 is an explanatory view illustrating a circuit linkage state in the heating/battery warm-up mode of the second embodiment.

As illustrated in FIGS. 21 and 22, the air heating circuit 40a is formed in the independent circulation state in the heating/battery warm-up mode. In the air heating circuit 40a, the heat medium flows through the high-temperature side pump 43, a heat medium passage 12b in a water-refrigerant heat exchanger 12, an electric heater 42, the first five-way valve 36, the high-temperature side three-way valve 44, the heater core 41, the fifth connection part 50e, the eleventh connection part 50k, and the high-temperature side pump 43 in this order and circulates.

As a result, the heat medium, heated by the heat generated in the electric heater 42 and by the heat of the refrigerant in the water-refrigerant heat exchanger 12, flows into the heater core 41, so that the ventilation air can be heated by the heat of the heat medium.

In the independent circulation state in the heating/battery warm-up mode, the third low-temperature side pump 31 is caused to exert a predetermined pumping capacity. The second five-way valve 37 is controlled such that at least the heat medium having flowed in from the second inflow-outlet 37b flows out of the first inflow-outlet 37a. As a result, the battery temperature control circuit 20b in the heating/battery warm-up mode is configured.

In the battery temperature control circuit 20b in this case, the heat medium flows through the third low-temperature side pump 31, the battery heat exchange unit 26, the tenth connection part 50j, the second inflow-outlet 37b of the second five-way valve 37, the first inflow-outlet 37a, the second connection part 50*b*, the ninth connection part 50*i*, and the third low-temperature side pump 31 in this order and circulates.

In the air heating circuit 40*a* of the independent circulation state in the heating/battery warm-up mode, the heat medium is heated in the water-refrigerant heat exchanger 12 and the electric heater 42, and in the battery temperature control circuit 20*b*, the heat medium is heated by heat exchange with the battery 27 in the battery heat exchange unit 26. Since the heat medium in the air heating circuit 40*a* is heated for a heating operation, the heat medium has a temperature zone higher than the temperature zone of the heat medium circulating through the battery temperature control circuit 20*b*.

Also, in the heating/battery warm-up mode, the heat medium can be caused to flow in and out between the air heating circuit 40*a* and the battery temperature control circuit 20*b* by controlling the operation of the high-temperature side three-way valve 44. By allowing the heat medium to flow in and out between the air heating circuit 40*a* and the battery temperature control circuit 20*b*, the circuit linkage state in the heating/battery warm-up mode can be switched to, as illustrated in FIGS. 21 and 23.

Specifically, in the heating/battery warm-up mode, the high-temperature side three-way valve 44 distributes the heat medium having flowed in from the first five-way valve 36 side to a flow to flow out toward the heater core 41 and a flow to flow out toward the battery temperature control circuit 20*b* via the ninth connection part 50*i*. At this time, the ratio between the flow rate of the heat medium toward the heater core 41 and the flow rate of the heat medium toward the battery temperature control circuit 20*b* is determined depending on the heating capacity for warming up the battery 27 in the battery temperature control circuit 20*b*.

As a result, in the heating/battery warm-up mode, a part of the heat medium flowing through the air heating circuit 40*a* can be caused to flow into the battery temperature control circuit 20*b* via the high-temperature side three-way valve 44 by controlling the operation of the high-temperature side three-way valve 44 as described above. Therefore, when the temperature of the battery 27 is lower than the proper temperature range due to environmental factors such as a low outside air temperature, the battery 27 can be warmed up using the heat and the like pumped up with the heat pump cycle 10 by causing the heat medium to flow from the air heating circuit 40*a* into the battery temperature control circuit 20*b*.

That is, in the heating/battery warm-up mode, the heat medium flow path connecting the other side of the outflow ports of the high-temperature side three-way valve 44 and the ninth connection part 50*i*, and the heat medium flow path connecting the tenth connection part 50*j* and the eleventh connection part 50*k*, correspond to a high-temperature side coupling part 45. The high-temperature side three-way valve 44 corresponds to a high-temperature side flow rate adjustment part 46.

In the air heating circuit 40*a* in the heating/battery warm-up mode, the heat medium is heated by the heat pumped up with the heat pump cycle 10 and the heat generated in the electric heater 42 in order to heat the ventilation air in the heater core 41, as described above. Therefore, the temperature zone of the heat medium in the air heating circuit 40*a* has a temperature zone higher than the temperature zone of the heat medium circulating through the battery temperature control circuit 20*b*.

Therefore, as the flow rate of the heat medium flowing from the air heating circuit 40*a* into the battery temperature control circuit 20*b* via the high-temperature side coupling part 45 increases, the temperature of the heat medium flowing through the battery temperature control circuit 20*b* can be raised. That is, by adjusting the flow rate of the heat medium flowing between the air heating circuit 40*a* and the battery temperature control circuit 20*b*, the temperature zone of the heat medium flowing through the battery temperature control circuit 20*b* can be adjusted to a temperature zone suitable for warming up the battery 27.

According to the thermal management system 1 of the second embodiment, a part of the heat medium flowing through the high-temperature side heat medium circuit 40 can be caused to flow into and out of the circulation circuit formed in the low-temperature side heat medium circuit 20 as in the heating/battery warm-up mode, as described above. As a result, the temperature zone of the heat medium in the circulation circuit in the low-temperature side heat medium circuit 20 can be adjusted using the heat medium flowing through the high-temperature side heat medium circuit 40.

The thermal management system 1 according to the second embodiment has the same configuration as that of the first embodiment described above, except that configurations corresponding to the high-temperature side coupling part 45 and the high-temperature side flow rate adjustment part 46 are added. Therefore, the thermal management system 1 according to the second embodiment can obtain the same effects as those of the first embodiment.

Third Embodiment

Subsequently, a third embodiment different from the above-described embodiments will be described with reference to FIGS. 24 to 28. In the third embodiment, configurations of a heat pump cycle 10, a low-temperature side heat medium circuit 20, and a high-temperature side heat medium circuit 40 are different from those in the above-described embodiments. The same or equivalent portions as those in the above-described embodiments are denoted by the same reference numerals.

Figure 24:
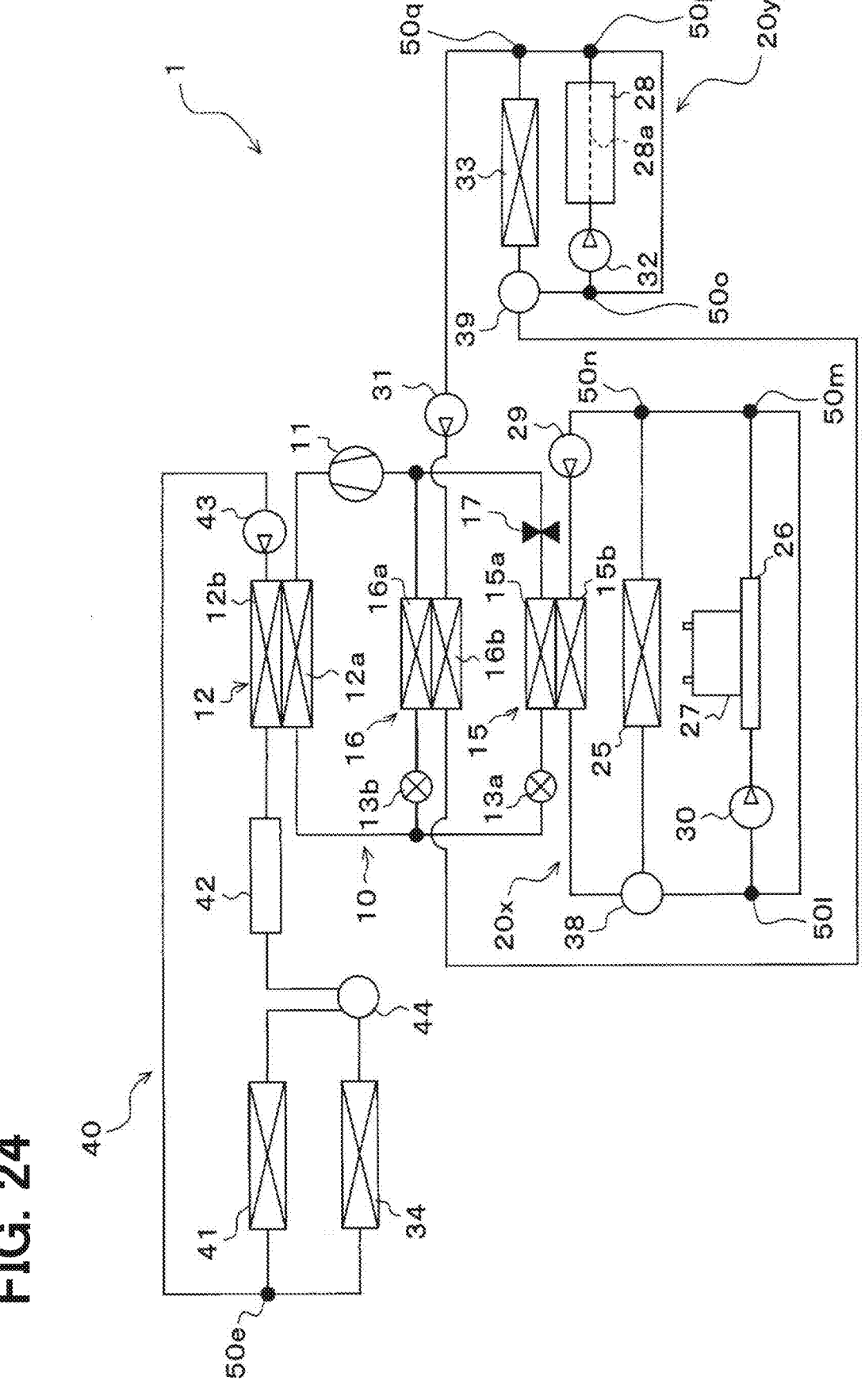
FIG. 24 is an overall configuration view of a thermal management system according to a third embodiment.

In a thermal management system 1 according to the third embodiment, the heat pump cycle 10 includes a compressor 11, a water-refrigerant heat exchanger 12, a first expansion valve 13*a*, a second expansion valve 13*b*, a first chiller 15, a second chiller 16, and an evaporation pressure regulating valve 17, as illustrated in FIG. 24. In the third embodiment, a two-chiller system, including two chillers, is configured as the heat pump cycle 10.

In the heat pump cycle 10 in the third embodiment, the compressor 11 and the water-refrigerant heat exchanger 12 are the same as those in the above-described embodiments, and thus description thereof is omitted. The first expansion valve 13*a* and the first chiller 15, and the second expansion valve 13*b* and the second chiller 16 are connected in parallel to the refrigerant outlet side of the water-refrigerant heat exchanger 12.

The first expansion valve 13*a* is a decompression unit that decompresses a part of the refrigerant having flowed out of the water-refrigerant heat exchanger 12. The second expansion valve 13*b* is a decompression unit that decompresses the remaining part of the refrigerant having flowed out of the water-refrigerant heat exchanger 12. As any of the first expansion valve 13*a* and the second expansion valve 13*b*, an electric expansion valve can be adopted as in the above-described embodiments.

As the first expansion valve 13*a* and the second expansion valve 13*b*, an expansion valve, having a fully opening function of causing the refrigerant to flow and a fully closing function of blocking the flow of the refrigerant without exerting a decompression action, may be adopted. An on-off valve that opens and closes a refrigerant flow path may be disposed on the upstream side of each of the first expansion valve 13a and the second expansion valve 13b.

A refrigerant passage 15a in the first chiller 15 is connected to the refrigerant outlet of the first expansion valve 13a. The first chiller 15 includes the refrigerant passage 15a that causes the low-pressure refrigerant decompressed by the first expansion valve 13a to flow through, and a heat medium passage 15b through which the heat medium circulating through a first low-temperature side heat medium circuit 20x flows. The first chiller 15 is an evaporation part that exchanges heat between the low-pressure refrigerant flowing through the refrigerant passage 15a and the heat medium flowing through the heat medium passage 15b to exert an endothermic action.

On the other hand, a refrigerant passage 16a in the second chiller 16 is connected to the refrigerant outlet of the second expansion valve 13b. The second chiller 16 includes the refrigerant passage 16a that causes the low-pressure refrigerant decompressed by the second expansion valve 13b to flow through and a heat medium passage 16b through which the heat medium circulating through a second low-temperature side heat medium circuit 20y flows. The second chiller 16 is an evaporation part that exchanges heat between the low-pressure refrigerant flowing through the refrigerant passage 16a and the heat medium flowing through the heat medium passage 16b to exert an endothermic action.

The evaporation pressure regulating valve 17 is connected to the outlet side of the refrigerant passage 15a in the first chiller 15. The evaporation pressure regulating valve 17 maintains the refrigerant evaporation temperature in the first chiller 15 to be equal to or higher than a frosting suppression temperature (in the present embodiment, 1° C.) at which frosting in the first chiller 15 can be suppressed. The evaporation pressure regulating valve 17 includes a mechanical mechanism that increases the valve opening degree as the refrigerant pressure on the refrigerant outlet side of the first chiller 15 rises.

The suction port side of the compressor 11 is connected to the outlet of the evaporation pressure regulating valve 17. The refrigerant flow path is connected between the outlet of the evaporation pressure regulating valve 17 and the suction port of the compressor 11 such that the refrigerant having flowed out of the heat medium passage 16b in the second chiller 16 joins together.

The thermal management system 1 according to the third embodiment includes the first low-temperature side heat medium circuit 20x as a heat medium circuit through which the heat medium cooled by the first chiller 15 circulates. The first low-temperature side heat medium circuit 20x includes the heat medium passage 15b in the first chiller 15, a cooler core 25, a battery heat exchange unit 26, a first low-temperature side pump 29, a second low-temperature side pump 30, and a first low-temperature side three-way valve 38.

Figure 25:
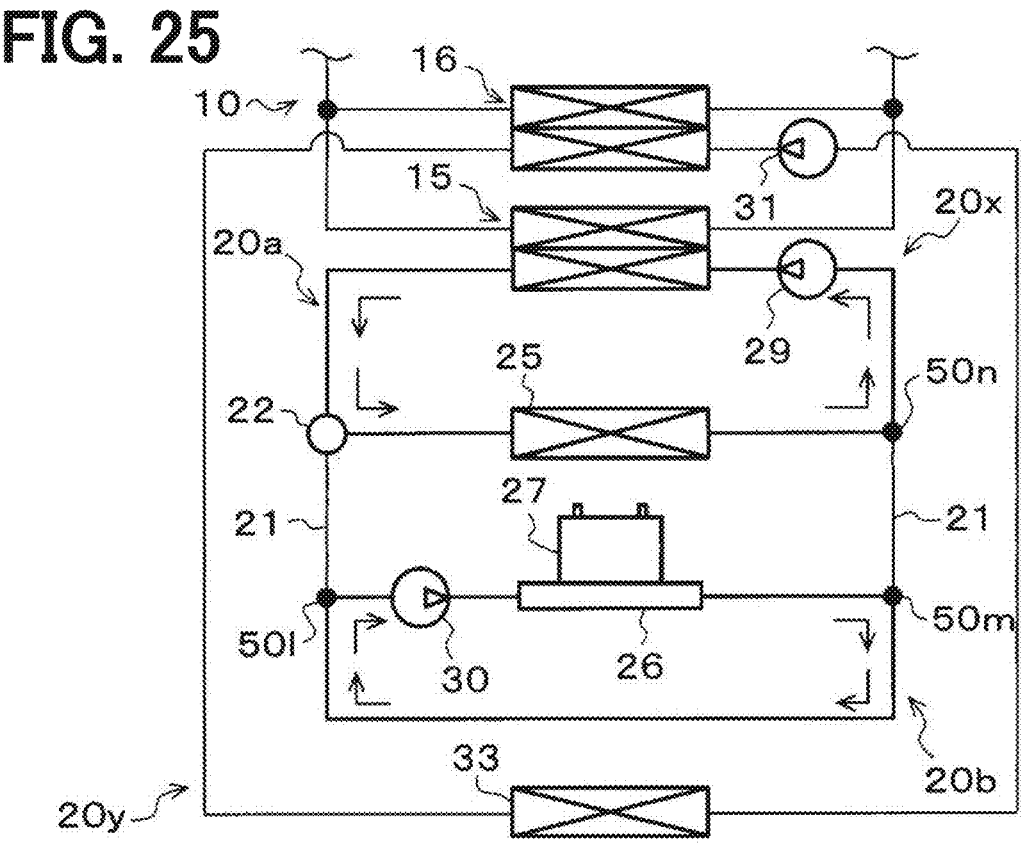
FIG. 25 is an explanatory view illustrating an independent circulation state in an air conditioning/battery cooling mode of the third embodiment.

As illustrated in FIG. 25 and the like, the first low-temperature side heat medium circuit 20x includes an air cooling circuit 20a and a battery temperature control circuit 20b. The air cooling circuit 20a in the first low-temperature side heat medium circuit 20x is configured such that the heat medium circulates via the first chiller 15 and the cooler core 25. The battery temperature control circuit 20b in the first low-temperature side heat medium circuit 20x is configured such that the heat medium circulates via the second low-temperature side pump 30 and the battery heat exchange unit 26.

In the first low-temperature side heat medium circuit 20x, the first low-temperature side pump 29 is connected to the inlet side of the heat medium passage 15b in the first chiller 15. The first low-temperature side three-way valve 38 as a flow rate adjustment part 22 is connected to the outlet side of the heat medium passage 15b in the first chiller 15. The first low-temperature side three-way valve 38 is an electric three-way flow regulating valve that has one inflow port and two outflow ports and can continuously adjust a passage area ratio between the two outflow ports.

The inflow port of the first low-temperature side three-way valve 38 is connected to the outlet side of the heat medium passage 15b in the first chiller 15, and one of the outflow ports of the first low-temperature side three-way valve 38 is connected to the heat medium inlet side of the cooler core 25. The other of the outflow ports of the first low-temperature side three-way valve 38 is connected to the suction port side of the second low-temperature side pump 30 via a twelfth connection part 50I. The heat medium outlet side of the cooler core 25 is connected to the suction port side of the first low-temperature side pump 29 via a fourteenth connection part 50n.

The discharge port of the second low-temperature side pump 30 is connected to the heat medium inlet side of the battery heat exchange unit 26. The battery heat exchange unit 26 has the same configuration as those in the above-described embodiments. The heat medium outlet side of the battery heat exchange unit 26 is connected to the suction port side of the second low-temperature side pump 30 via a thirteenth connection part 50m and the twelfth connection part 50I.

Therefore, in the first low-temperature side heat medium circuit 20x, the heat medium flows through the first low-temperature side pump 29, the heat medium passage 15b in the first chiller 15, the first low-temperature side three-way valve 38, the cooler core 25, the fourteenth connection part 50n, and the first low-temperature side pump 29 in this order and circulates, as illustrated in FIG. 25. As a result, the air cooling circuit 20a in the third embodiment is configured. The air cooling circuit 20a in the third embodiment corresponds to a first circuit in the first low-temperature side heat medium circuit 20x.

In the first low-temperature side heat medium circuit 20x, the heat medium flows through the second low-temperature side pump 30, the battery heat exchange unit 26, the thirteenth connection part 50m, the twelfth connection part 50I, and the second low-temperature side pump 30 in this order and circulates. As a result, the battery temperature control circuit 20b according to the third embodiment is configured. The battery temperature control circuit 20b in the third embodiment corresponds to a second circuit in the first low-temperature side heat medium circuit 20x.

As described above, the twelfth connection part 50I to the fourteenth connection part 50n are disposed in the first low-temperature side heat medium circuit 20x. The twelfth connection part 50I to the fourteenth connection part 50n are formed in a three-way joint shape, similarly to the first connection part 50a to the eleventh connection part 50k described above.

The suction port side of the second low-temperature side pump 30 and the other side of the inflow-outlets of the thirteenth connection part 50m are connected to two inflow-outlets of the twelfth connection part 50I, respectively. The other of the outflow ports of the first low-temperature side three-way valve 38 is connected to the remaining one of the inflow-outlets of the twelfth connection part 50I. As a result, the flowing in and out of the heat medium between the air cooling circuit 20a and the battery temperature control circuit 20b can be realized via the heat medium passage connecting the first low-temperature side three-way valve 38 and the twelfth connection part 50I.

The heat medium outlet side of the battery heat exchange unit 26 and the remaining one of the inflow-outlets of the twelfth connection part 50I are connected to two inflow-outlets of the thirteenth connection part 50m, respectively. The remaining one of the inflow-outlets of the fourteenth connection part 50n is connected to the remaining one of the inflow-outlets of the thirteenth connection part 50m.

The heat medium outlet side of the cooler core 25 and the suction port side of the first low-temperature side pump 29 are connected to two inflow-outlets of the fourteenth connection part 50n, respectively. As described above, the remaining one of the inflow-outlets of the thirteenth connection part 50m is connected to the remaining one of the inflow-outlets of the fourteenth connection part 50n. As a result, the flowing in and out of the heat medium between the air cooling circuit 20a and the battery temperature control circuit 20b can be realized via the heat medium passage connecting the thirteenth connection part 50m and the fourteenth connection part 50n.

Therefore, in the first low-temperature side heat medium circuit 20x, the heat medium passage connecting the first low-temperature side three-way valve 38 and the twelfth connection part 50I, and the heat medium passage connecting the thirteenth connection part 50m and the fourteenth connection part 50n, correspond to a coupling part 21 in the first low-temperature side heat medium circuit 20x. The first low-temperature side three-way valve 38 corresponds to the flow rate adjustment part 22 in the first low-temperature side heat medium circuit 20x.

The thermal management system 1 according to the third embodiment includes a second low-temperature side heat medium circuit 20y as a heat medium circuit through which the heat medium cooled by the second chiller 16 circulates. The second low-temperature side heat medium circuit 20y includes the heat medium passage 16b in the second chiller 16, an equipment heat exchange unit 28, a third low-temperature side pump 31, a fourth low-temperature side pump 32, a first outside air heat exchanger 33, and a second low-temperature side three-way valve 39.

Figure 27:
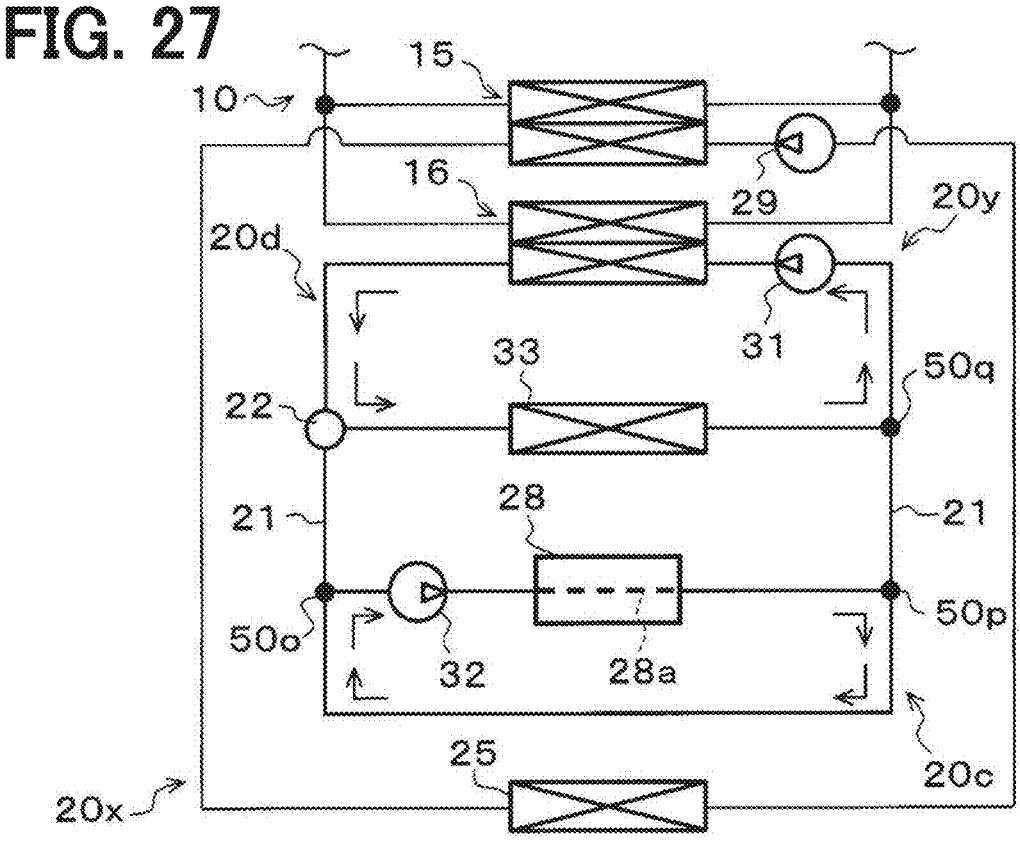
FIG. 27 is an explanatory view illustrating an independent circulation state in an outside air heat absorption/equipment waste heat recovery mode of the third embodiment.

As illustrated in FIG. 27 and the like, the second low-temperature side heat medium circuit 20y includes an outside air heat absorption circuit 20d and an equipment waste heat recovery circuit 20c. The outside air heat absorption circuit 20d in the second low-temperature side heat medium circuit 20y is configured such that the heat medium circulates via the second chiller 16 and the first outside air heat exchanger 33. The equipment waste heat recovery circuit 20c in the second low-temperature side heat medium circuit 20y is configured such that the heat medium circulates via the fourth low-temperature side pump 32 and the equipment heat exchange unit 28.

In the second low-temperature side heat medium circuit 20y, the third low-temperature side pump 31 is connected to the inlet side of the heat medium passage 16b in the second chiller 16. The second low-temperature side three-way valve 39 is connected to the outlet side of the heat medium passage 16b in the second chiller 16. The second low-temperature side three-way valve 39 is an electric three-way flow regulating valve, similarly to the first low-temperature side three-way valve 38.

The inflow port of the second low-temperature side three-way valve 39 is connected to the outlet side of the heat medium passage 16b in the second chiller 16, and one of the outflow ports of the second low-temperature side three-way valve 39 is connected to the heat medium inlet side of the first outside air heat exchanger 33. The other of the outflow ports of the second low-temperature side three-way valve 39 is connected to the suction port side of the fourth low-temperature side pump 32 via a fifteenth connection part 50o. The heat medium outlet side of the first outside air heat exchanger 33 is connected to the suction port side of the third low-temperature side pump 31 via a seventeenth connection part 50q.

The discharge port of the fourth low-temperature side pump 32 is connected to the inlet side of a heat medium passage 28a in the equipment heat exchange unit 28. The equipment heat exchange unit 28 has the same configuration as those in the above-described embodiments. The outlet of the heat medium passage 28a in the equipment heat exchange unit 28 is connected to the suction port side of the fourth low-temperature side pump 32 via a sixteenth connection part 50p and the fifteenth connection part 50o.

Therefore, in the second low-temperature side heat medium circuit 20y, the heat medium flows through the third low-temperature side pump 31, the heat medium passage 16b in the second chiller 16, the second low-temperature side three-way valve 39, the first outside air heat exchanger 33, the seventeenth connection part 50q, and the third low-temperature side pump 31 in this order and circulates, as illustrated in FIG. 27. As a result, the outside air heat absorption circuit 20d in the third embodiment is configured. The outside air heat absorption circuit 20d according to the third embodiment corresponds to a first circuit in the second low-temperature side heat medium circuit 20y.

In the second low-temperature side heat medium circuit 20y, the heat medium flows through the fourth low-temperature side pump 32, the heat medium passage 28a in the equipment heat exchange unit 28, the sixteenth connection part 50p, the fifteenth connection part 50o, and the fourth low-temperature side pump 32 in this order and circulates. As a result, the equipment waste heat recovery circuit 20c in the third embodiment is configured. The equipment waste heat recovery circuit 20c according to the third embodiment corresponds to a second circuit in the second low-temperature side heat medium circuit 20y.

The fifteenth connection part 50o to the seventeenth connection part 50q are disposed in the second low-temperature side heat medium circuit 20y. The fifteenth connection part 50o to the seventeenth connection part 50q are formed in a three-way joint shape, similarly to the first connection part 50a to the fourteenth connection part 50n described above.

The suction port side of the fourth low-temperature side pump 32 and the other side of the inflow-outlets of the sixteenth connection part 50p are connected to two inflow-outlets of the fifteenth connection part 50o, respectively. The other of the outflow ports of the second low-temperature side three-way valve 39 is connected to the remaining one of the inflow-outlets of the fifteenth connection part 50o. As a result, the flowing in and out of the heat medium between the outside air heat absorption circuit 20d and the equipment waste heat recovery circuit 20c can be realized via the heat medium passage connecting the second low-temperature side three-way valve 39 and the fifteenth connection part 50o.

The outlet side of the heat medium passage 28a in the equipment waste heat recovery circuit 20c and the remaining one of the inflow-outlets of the fifteenth connection part 50*o* are connected to two inflow-outlets of the sixteenth connection part 50*p*, respectively. The remaining one inflow-outlet side of the seventeenth connection part 50*q* is connected to the remaining one of the inflow-outlets of the sixteenth connection part 50*p*.

The heat medium outlet side of the first outside air heat exchanger 33 and the suction port side of the third low-temperature side pump 31 are connected to two inflow-outlets of the seventeenth connection part 50*q*, respectively. As described above, the remaining one of the inflow-outlets of the sixteenth connection part 50*p* is connected to the remaining one of the inflow-outlets of the seventeenth connection part 50*q*. As a result, the flowing in and out of the heat medium between the outside air heat absorption circuit 20*d* and the equipment waste heat recovery circuit 20*c* can be realized via the heat medium passage connecting the sixteenth connection part 50*p* and the seventeenth connection part 50*q*.

Therefore, in the second low-temperature side heat medium circuit 20*y*, the heat medium passage connecting the second low-temperature side three-way valve 39 and the fifteenth connection part 50*o*, and the heat medium passage connecting the sixteenth connection part 50*p* and the seventeenth connection part 50*q*, correspond to a coupling part 21 in the second low-temperature side heat medium circuit 20*y*. The second low-temperature side three-way valve 39 corresponds to a flow rate adjustment part 22 in the second low-temperature side heat medium circuit 20*y*.

The configuration of the high-temperature side heat medium circuit 40 according to the third embodiment will be described with reference to FIG. 23. In the thermal management system 1 according to the third embodiment, the high-temperature side heat medium circuit 40 includes the heater core 41, the electric heater 42, the high-temperature side pump 43, the high-temperature side three-way valve 44, and the second outside air heat exchanger 34, and is configured to circulate the heat medium having flowed through the water-refrigerant heat exchanger 12.

The discharge port of the high-temperature side pump 43 is connected to the inlet side of the heat medium passage 12*b* in the water-refrigerant heat exchanger 12. The heat medium inlet side of the electric heater 42 is connected to the outlet side of the heat medium passage 12*b* in the water-refrigerant heat exchanger 12. The configurations of the high-temperature side pump 43 and the electric heater 42 are the same as those in the above-described embodiments.

The high-temperature side three-way valve 44 is connected to the heat medium outlet side of the electric heater 42. The high-temperature side three-way valve 44 is an electric three-way flow regulating valve, as in the above-described embodiments. As described above, the heat medium outlet side of the electric heater 42 is connected to the inflow port of the high-temperature side three-way valve 44. The heat medium inlet side of the heater core 41 is connected to one of the outflow ports of the high-temperature side three-way valve 44, and the heat medium inlet side of the second outside air heat exchanger 34 is connected to the other of the outflow ports of the high-temperature side three-way valve 44.

The heat medium outlet side of the heater core 41 is connected to the suction port side of the high-temperature side pump 43 via the fifth connection part 50*e*. The heat medium outlet side of the second outside air heat exchanger 34 is connected to one of the inflow-outlets constituting the fifth connection part 50*e*. Therefore, the heat medium having flowed out of the second outside air heat exchanger 34 can join together with the heat medium having flowed out of the heater core 41, and is sucked into the suction port of the high-temperature side pump 43.

Since the configurations of an interior air conditioning unit 60 and a control device 70 in the third embodiment are the same as those in the above-described embodiments, detailed description thereof, again, will be omitted.

As described above, the thermal management system 1 according to the third embodiment includes the first low-temperature side heat medium circuit 20*x* and the second low-temperature side heat medium circuit 20*y* as the low-temperature side heat medium circuits, and each of the first low-temperature side heat medium circuit 20*x* and the second low-temperature side heat medium circuit 20*y* has a plurality of circulation circuits.

Therefore, in each of the first low-temperature side heat medium circuit 20*x* and the second low-temperature side heat medium circuit 20*y*, an operation mode, in which a plurality of different temperature zones are created with one chiller by linking the plurality of circulation circuits, can be realized.

An operation mode, in which a plurality of different temperature zones are created with one first chiller 15 in the first low-temperature side heat medium circuit 20*x*, will be first described with reference to FIGS. 25 and 26. Since the first low-temperature side heat medium circuit 20*x* includes the air cooling circuit 20*a* and the battery temperature control circuit 20*b*, examples of the operation mode in this case include an air conditioning/battery cooling mode.

Also, in an air conditioning/battery cooling mode according to the third embodiment, the thermal management system 1 can switch between an independent circulation state and a circuit linkage state for the air cooling circuit 20*a* and the battery temperature control circuit 20*b*, as in the above-described embodiments.

The independent circulation state in the air conditioning/battery cooling mode according to the third embodiment causes the first low-temperature side pump 29 to exert a predetermined pumping capacity. The first low-temperature side three-way valve 38 is controlled such that the inflow-outlet on the first chiller 15 side communicates with the inflow-outlet on the cooler core 25 side and the inflow-outlet on the twelfth connection part 50I side is closed. As a result, the air cooling circuit 20*a* is configured.

Therefore, in the air cooling circuit 20*a* in the third embodiment, the heat medium flows through the first low-temperature side pump 29, the first chiller 15, the first low-temperature side three-way valve 38, the cooler core 25, the fourteenth connection part 50*n*, and the first low-temperature side pump 29 in this order and circulates.

In the battery temperature control circuit 20*b*, the second low-temperature side pump 30 is caused to exert a predetermined pumping capacity. As a result, in the battery temperature control circuit 20*b* in the third embodiment, the heat medium flows through the second low-temperature side pump 30, the battery heat exchange unit 26, the thirteenth connection part 50*m*, the twelfth connection part 50I, and the second low-temperature side pump 30 in this order and circulates.

In the air cooling circuit 20*a* in the independent circulation state in the air conditioning/battery cooling mode according to the third embodiment, the cooling capacity of the first chiller 15 is controlled by controlling the operation of the heat pump cycle 10, so that the cooling capacity corresponds to the target blowing temperature related to an air conditioning operation. Therefore, the temperature zone of the heat medium to pass through the first chiller 15 is adjusted to a temperature zone determined to correspond to the target blowing temperature.

On the other hand, in the battery temperature control circuit 20*b* in the independent circulation state in the air conditioning/battery cooling mode, the heat medium is circulated via the battery heat exchange unit 26 by the third low-temperature side pump 31, as illustrated in FIG. 25. Since the heat medium in the battery temperature control circuit 20*b* in the independent circulation state exchanges heat with the battery 27 when passing through the battery heat exchange unit 26, the temperature of the heat medium rises. That is, in the independent circulation state in the air conditioning/battery cooling mode, the temperature zone of the heat medium circulating through the battery temperature control circuit 20*b* is higher than the temperature zone of the heat medium circulating through the air cooling circuit 20*a*.

In the air conditioning/battery cooling mode according to the third embodiment, the heat medium can be caused to flow in and out between the air cooling circuit 20*a* and the battery temperature control circuit 20*b* by controlling the operation of the first low-temperature side three-way valve 38. As illustrated in FIG. 26, by allowing the heat medium to flow in and out between the air cooling circuit 20*a* and the battery temperature control circuit 20*b*, it is possible to switch to the circuit linkage state in the air conditioning/battery cooling mode.

Specifically, the first low-temperature side three-way valve 38 distributes the heat medium having flowed in from the first chiller 15 side to a flow to flow toward the cooler core 25 and a flow to flow toward the twelfth connection part 50I. At this time, the ratio between the flow rate of the heat medium to flow toward the cooler core 25 and the flow rate of the heat medium to flow toward the twelfth connection part 50I is determined depending on the difference between the target battery temperature determined for the battery 27 and the temperature of the heat medium flowing through the battery temperature control circuit 20*b*.

In the air conditioning/battery cooling mode according to the third embodiment, a part of the heat medium flowing through the air cooling circuit 20*a* can be caused to flow into the battery temperature control circuit 20*b* via the first low-temperature side three-way valve 38 and the twelfth connection part 50I by controlling the operation of the first low-temperature side three-way valve 38 in this manner.

In the air cooling circuit 20*a* according to the third embodiment, the heat medium circulates via the first chiller 15 and the cooler core 25 as described above, and thus the heat medium is cooled to the predetermined target temperature by the endothermic action of the refrigerant in the first chiller 15.

Therefore, as the flow rate of the heat medium flowing from the air cooling circuit 20*a* into the battery temperature control circuit 20*b* via the coupling part 21 increases, the temperature of the heat medium flowing through the battery temperature control circuit 20*b* can be lowered. That is, by controlling the flow rate of the heat medium to flow in and out between the air cooling circuit 20*a* and the battery temperature control circuit 20*b*, the temperature zone of the heat medium flowing through the battery temperature control circuit 20*b* can be adjusted to a desired temperature zone higher than the temperature zone of the heat medium flowing through the air cooling circuit 20*a*. In other words, the temperature zone of the heat medium flowing through the air cooling circuit 20*a* can be brought close to a temperature zone corresponding to the target blowing temperature related to the air conditioning operation, and the temperature zone of the heat medium flowing through the battery temperature control circuit 20*b* can be brought close to a temperature zone determined based on the proper temperature range of the battery 27.

In the air conditioning/battery cooling mode according to the third embodiment, temperature zones suitable for the air conditioning and the battery cooling can be respectively created with one first chiller 15 by adjusting the flow rate of the heat medium between the air cooling circuit 20*a* and the battery temperature control circuit 20*b* in the first low-temperature side heat medium circuit 20*x*.

Figure 28:
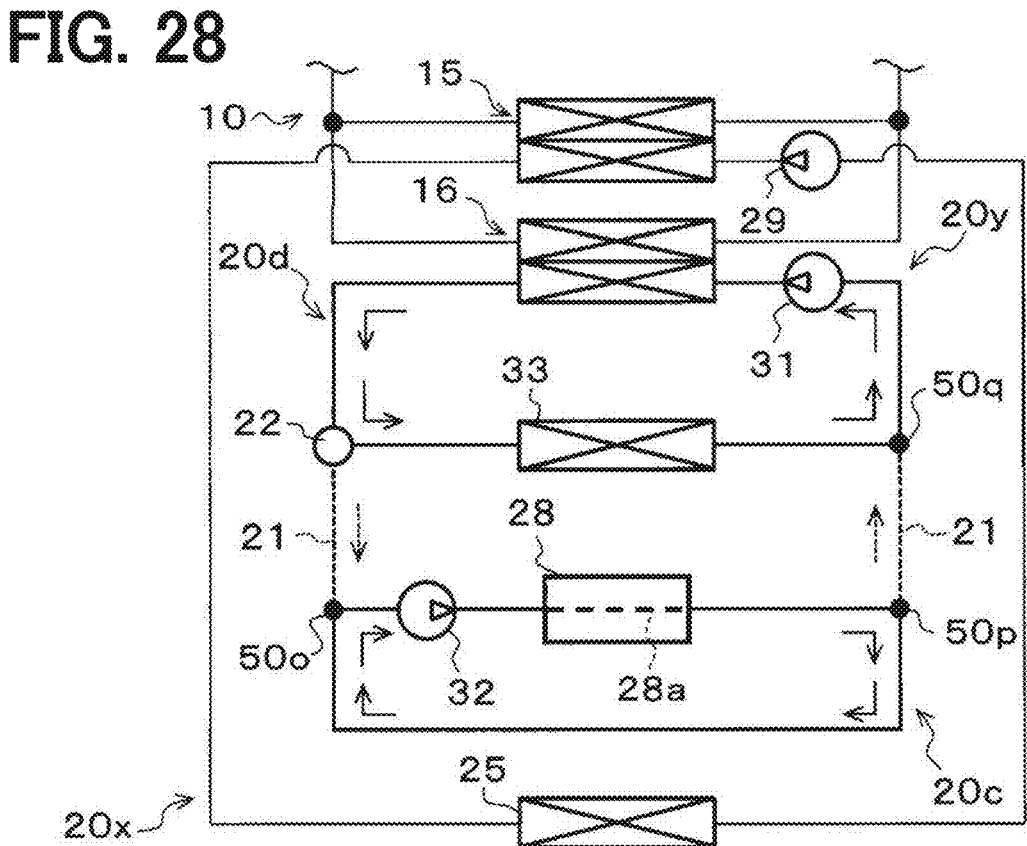
FIG. 28 is an explanatory view illustrating a circuit linkage state in the outside air heat absorption/equipment waste heat recovery mode of the third embodiment.

Next, an operation mode, in which a plurality of different temperature zones are created with one second chiller 16 in the second low-temperature side heat medium circuit 20*y*, will be described with reference to FIGS. 27 and 28. Since the second low-temperature side heat medium circuit 20*y* includes the outside air heat absorption circuit 20*d* and the equipment waste heat recovery circuit 20*c*, examples of the operation mode in this case include an outside air heat absorption/equipment waste heat recovery mode.

Also, in the outside air heat absorption/equipment waste heat recovery mode according to the third embodiment, the thermal management system 1 can switch between the independent circulation state and the circuit linkage state for the outside air heat absorption circuit 20*d* and the equipment waste heat recovery circuit 20*c*, as in the above-described embodiments.

In the independent circulation state in the outside air heat absorption/equipment waste heat recovery mode according to the third embodiment, the third low-temperature side pump 31 is caused to exert a predetermined pumping capacity. The second low-temperature side three-way valve 39 is controlled such that the inflow-outlet on the second chiller 16 side communicates with the inflow-outlet on the first outside air heat exchanger 33 side and the inflow-outlet on the fifteenth connection part 50*o* side is closed. As a result, the outside air heat absorption circuit 20*d* is configured.

Therefore, in the outside air heat absorption circuit 20*d* in the third embodiment, the heat medium flows through the third low-temperature side pump 31, the second chiller 16, the second low-temperature side three-way valve 39, the first outside air heat exchanger 33, the seventeenth connection part 50*q*, and the third low-temperature side pump 31 in this order and circulates.

In the equipment waste heat recovery circuit 20*c*, the fourth low-temperature side pump 32 is caused to exert a predetermined pumping capacity. As a result, in the equipment waste heat recovery circuit 20*c* in the third embodiment, the heat medium flows through the fourth low-temperature side pump 32, the equipment heat exchange unit 28, the sixteenth connection part 50*p*, the fifteenth connection part 50*o*, and the fourth low-temperature side pump 32 in this order and circulates.

In the outside air heat absorption circuit 20*d* in the independent circulation state in the outside air heat absorption/equipment waste heat recovery mode according to the third embodiment, the cooling capacity of the chiller 14 is adjusted such that the heat medium temperature in the first outside air heat exchanger 33 becomes lower than the outside air temperature in order to cause the heat medium to absorb heat from the outside air. On the other hand, the in-vehicle equipment has a temperature higher than the outside air temperature due to waste heat. Therefore, the heat medium flowing through the equipment waste heat recovery circuit 20*c* can recover the waste heat of the in-vehicle equipment at a temperature higher than the heat medium in the outside air heat absorption circuit 20*d*.

In the outside air heat absorption/equipment waste heat recovery mode according to the third embodiment, the heat medium can be caused to flow in and out between the outside air heat absorption circuit 20d and the equipment waste heat recovery circuit 20c by controlling the operation of the second low-temperature side three-way valve 39. By allowing the heat medium to flow in and out between the outside air heat absorption circuit 20d and the equipment waste heat recovery circuit 20c, it is possible to switch to the circuit linkage state in the outside air heat absorption/equipment waste heat recovery mode, as illustrated in FIG. 28.

Specifically, the second low-temperature side three-way valve 39 distributes the heat medium having flowed in from the second chiller 16 side to a flow to flow toward the first outside air heat exchanger 33 and a flow to flow toward the fifteenth connection part 50o. At this time, the ratio between the flow rate of the heat medium to flow toward the first outside air heat exchanger 33 and the flow rate of the heat medium to flow toward the fifteenth connection part 50o is determined depending on the target value of a heat absorption amount in the first outside air heat exchanger 33 and the target value of a heat absorption amount in the equipment heat exchange unit 28. The target value of the heat absorption amount in the first outside air heat exchanger 33 is determined from the relationship with the outside air temperature, and the target value of the heat absorption amount in the equipment heat exchange unit 28 is determined from the temperature of the in-vehicle equipment.

In the outside air heat absorption/equipment waste heat recovery mode according to the third embodiment, a part of the heat medium flowing through the outside air heat absorption circuit 20d can be caused to flow into the equipment waste heat recovery circuit 20c via the second low-temperature side three-way valve 39 and the fifteenth connection part 50o by controlling the operation of the second low-temperature side three-way valve 39.

In the outside air heat absorption circuit 20d according to the third embodiment, the heat medium circulates through the second chiller 16 and the first outside air heat exchanger 33 as described above, and thus the heat medium is cooled to a predetermined target temperature by the endothermic action of the refrigerant in the second chiller 16.

Therefore, as the flow rate of the heat medium flowing from the outside air heat absorption circuit 20d into the equipment waste heat recovery circuit 20c via the coupling part 21 increases, the temperature of the heat medium flowing through the equipment waste heat recovery circuit 20c can be lowered. That is, by adjusting the flow rate of the heat medium flowing in and out between the outside air heat absorption circuit 20d and the equipment waste heat recovery circuit 20c, the temperature zone of the heat medium flowing through the equipment waste heat recovery circuit 20c can be adjusted to a desired temperature zone higher than the temperature zone of the heat medium flowing through the outside air heat absorption circuit 20d. In other words, the temperature zone of the heat medium flowing through the outside air heat absorption circuit 20d can be brought close to the target value of a temperature zone determined depending on the outside air temperature, and the temperature zone of the heat medium flowing through the equipment waste heat recovery circuit 20c can be brought close to a temperature zone determined based on the temperature of the in-vehicle equipment.

In the outside air heat absorption/equipment waste heat recovery mode according to the third embodiment, the flow rate of the heat medium between the outside air heat absorption circuit 20d and the equipment waste heat recovery circuit 20c is adjusted in the second low-temperature side heat medium circuit 20y. As a result, the thermal management system 1 can create temperature zones suitable for the heat absorption from the outside air and the recovery of the waste heat of the in-vehicle equipment with one second chiller 16, respectively.

According to the thermal management system 1 of the third embodiment, the first low-temperature side heat medium circuit 20x, including the first chiller 15, and the second low-temperature side heat medium circuit 20y, including the second chiller 16, can be controlled in parallel. Therefore, the thermal management system 1 can individually adjust the temperature zone of the heat medium in each of the air cooling circuit 20a, the battery temperature control circuit 20b, the equipment waste heat recovery circuit 20c, and the outside air heat absorption circuit 20d to a proper temperature zone.

As described above, the thermal management system 1 according to the third embodiment includes, as components of the heat pump cycle 10, the first expansion valve 13a, the second expansion valve 13b, the first chiller 15, and the second chiller 16, as illustrated in FIG. 24. The first low-temperature side heat medium circuit 20x, including the first chiller 15, includes the air cooling circuit 20a and the battery temperature control circuit 20b as the circulation circuits.

Figure 26:
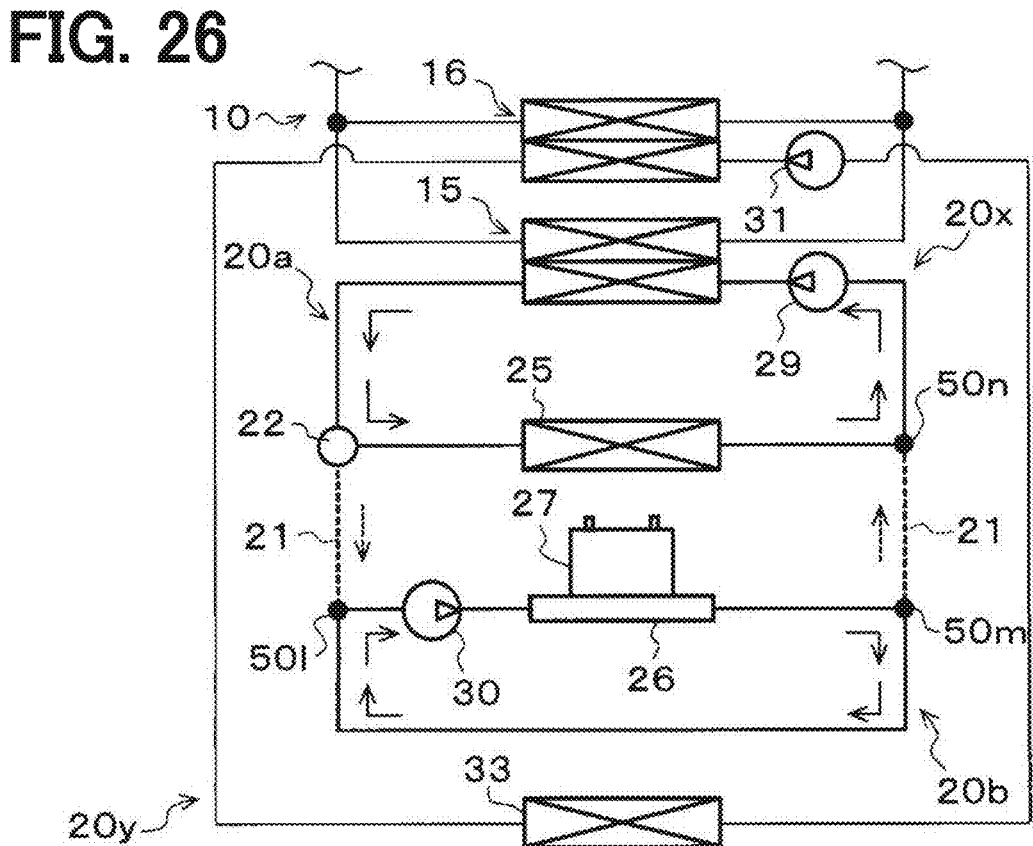
FIG. 26 is an explanatory view illustrating a circuit linkage state in the air conditioning/battery cooling mode of the third embodiment.

Therefore, according to the thermal management system 1 of the third embodiment, the flow of the heat medium between the air cooling circuit 20a and the battery temperature control circuit 20b can be adjusted in the first low-temperature side heat medium circuit 20x, as illustrated in FIGS. 25 and 26. As a result, the thermal management system 1 can create, in the first low-temperature side heat medium circuit 20x, the temperature zone of the heat medium related to the air cooling circuit 20a and the temperature zone of the heat medium related to the battery temperature control circuit 20b by using the first chiller 15.

In the thermal management system 1 according to the third embodiment, the second low-temperature side heat medium circuit 20y includes the outside air heat absorption circuit 20d and the equipment waste heat recovery circuit 20c as the circulation circuits. In the second low-temperature side heat medium circuit 20y, the thermal management system 1 can adjust the flow of the heat medium between the outside air heat absorption circuit 20d and the equipment waste heat recovery circuit 20c, as illustrated in FIGS. 27 and 28. As a result, the thermal management system 1 can create, in the second low-temperature side heat medium circuit 20y, proper temperature zones for the temperature zones of the heat medium related to the outside air heat absorption circuit 20d and the equipment waste heat recovery circuit 20c by using the second chiller 16.

The present disclosure is not limited to the above-described embodiments, and can be variously modified as follows without departing from the gist of the present disclosure.

In the above-described embodiments, the first circuit and the second circuit in the low-temperature side heat medium circuit are described as examples, but the first circuit and the second circuit are not limited to the configurations of the circulation circuits described as examples. The first circuit in the low-temperature side heat medium circuit may be configured such that the heat medium circulates via the chiller and a first heat exchange unit that exchanges heat between the heat medium and a heat exchange target, and may include other components.

The second circuit in the low-temperature side heat medium circuit may be configured such that the heat medium circulates via a heat medium pump that pumps the heat medium and a second heat exchange unit that is disposed at a position different from the first heat exchange unit and exchanges heat between the heat medium and a heat exchange target, and may include other components. The heat exchange targets in the first heat exchange unit and the second heat exchange unit are not necessarily different heat exchange targets such as the ventilation air and the battery, and various heat exchange targets can be adopted.

In the above-described embodiments, for the flowing in and out of the heat medium between the circulation circuit, the first circuit, and the circulation circuit, the second circuit, the flow rate adjustment part 22 adjusts the flow rate ratio between the flow rate of the heat medium circulating through the first circuit and the flow rate of the heat medium flowing into the second circuit via the coupling part 21. A control aspect of the heat medium flowing in and out between the first circuit and the second circuit is not limited to this aspect. For example, regarding the first circuit and the second circuit, it is also possible to adjust the temperature zone of the heat medium flowing through the first circuit and the temperature zone of the heat medium flowing through the second circuit by using a temporal ratio between a period when the operation is performed in the independent circulation state and a period of being the circuit linkage state.

In the first embodiment described above, a configuration, in which the air cooling circuit 20a, the battery temperature control circuit 20b, and the outside air heat absorption circuit 20d are linked, has been described as the three-circuit linking mode, but the present disclosure is not limited to this aspect. For example, a configuration, in which the air cooling circuit 20a, the equipment waste heat recovery circuit 20c, and the outside air heat absorption circuit 20d are linked, can also be adopted as another configuration example of the three-circuit linkage mode.

In the above-described embodiments, the four-way valve 35, the first five-way valve 36, the second five-way valve 37, the first low-temperature side three-way valve 38, the second low-temperature side three-way valve 39, and the high-temperature side three-way valve 44 are adopted as the flow rate adjustment part 22, the low-temperature side flow rate adjustment part 24, and the high-temperature side flow rate adjustment part 46, respectively. However, the flow rate adjustment part 22, the low-temperature side flow rate adjustment part 24, and the high-temperature side flow rate adjustment part 46 are not limited to the configurations using these multi-way valves. For example, the flow rate adjustment part 22 and the like may be configured by combining a plurality of valves such as on-off valves. A configuration corresponding to the first five-way valve 36 or the second five-way valve 37 may be realized by combining a plurality of three-way valves.

Although the present disclosure has been described in accordance with the embodiments, it is understood that the present disclosure is not limited to the embodiments and the structures. The present disclosure also encompasses various modifications and variations within the scope of equivalents. In addition, various combinations and modes, and other combinations and modes, including only one element, more elements, or less elements, are also within the scope and idea of the present disclosure.

What is claimed is:

1. A thermal management system comprising:

a heat pump cycle including a compressor configured to compress and discharge a refrigerant, a condenser configured to condense the refrigerant discharged from the compressor, a decompression unit configured to decompress the refrigerant flowing out of the condenser, and a chiller configured to exchange heat between the refrigerant decompressed by the decompression unit and a heat medium to evaporate the refrigerant;

a low-temperature side heat medium circuit through which the heat medium cooled by the chiller circulates; and a controller, wherein the low-temperature side heat medium circuit includes:

a first circuit having a first heat exchanger configured to cool a first temperature adjustment target by heat exchange between the heat medium cooled by the chiller and the first temperature adjustment target associated with a predetermined first temperature zone, the first circuit being configured to circulate the heat medium via the chiller and the first heat exchanger;

a second circuit having a second heat exchanger configured to exchange heat between a second temperature adjustment target associated with a second temperature zone higher than the first temperature zone and the heat medium cooled by the chiller, the second circuit being configured to circulate the heat medium via the second heat exchanger;

a coupling part configured to connect the first circuit and the second circuit and to flow in and out of the heat medium; and a flow rate adjustment valve configured to adjust a flow rate of the heat medium flowing in and out between the first circuit and the second circuit, the controller is configured to control an operation of the flow rate adjustment valve and to adjust the flow rate of the heat medium in the coupling part, to make a temperature of the heat medium flowing through the first circuit at the first temperature zone and a temperature of the heat medium flowing through the second circuit at the second temperature zone have respective values, the first temperature adjustment target is air to be supplied to a space to be air conditioned, the first heat exchanger is a cooler core that exchanges heat between the heat medium cooled by the chiller and the air to cool the air, the second temperature adjustment target is a heat generating equipment that generates heat when being operated, and the second heat exchanger is an equipment heat exchanger in which heat is exchanged between the heat medium cooled by the chiller and the heat generating equipment to adjust a temperature of the heat generating equipment.

2. The thermal management system according to claim 1, wherein the controller is configured to control the operation of the flow rate adjustment valve and to cause a part of the heat medium flowing through the first circuit to flow into the second circuit via the coupling part, so as to bring the temperature of the heat medium flowing through the first circuit close to the first temperature zone and bring the temperature of the heat medium flowing through the second circuit close to the second temperature zone, respectively.

3. The thermal management system according to claim 1, wherein

53 the decompression unit includes a first decompression unit that decompresses the refrigerant flowing out of the condenser, and a second decompression unit connected in parallel to the first decompression unit to decompress the refrigerant flowing out of the condenser, the chiller includes a first chiller that exchanges heat between the refrigerant decompressed by the first decompression unit and the heat medium to evaporate the refrigerant, and a second chiller that exchanges heat between the refrigerant decompressed by the second decompression unit and the heat medium to evaporate the refrigerant, the low-temperature side heat medium circuit includes a first low-temperature side heat medium circuit in which the heat medium cooled by the first chiller circulates, and a second low-temperature side heat medium circuit in which the heat medium cooled by the second chiller circulates, at least one of the first low-temperature side heat medium circuit and the second low-temperature side heat medium circuit includes the first circuit, the second circuit, the coupling part, and the flow rate adjustment valve, and the controller controls the operation of the flow rate adjustment valve and adjusts a flow rate of the heat medium in the coupling part, to make the temperature of the heat medium flowing through the first circuit at the first temperature zone different from the temperature of the heat medium flowing through the second circuit at the second temperature zone.

4. The thermal management system according to claim 1, wherein the decompression unit is an expansion valve.

5. The thermal management system according to claim 1, wherein the coupling part is a connection line.

6. A thermal management system comprising:

a heat pump cycle including a compressor configured to compress and discharge a refrigerant, a condenser configured to condense the refrigerant discharged from the compressor, a decompression unit configured to decompress the refrigerant flowing out of the condenser, and a chiller configured to exchange heat between the refrigerant decompressed by the decompression unit and a heat medium to evaporate the refrigerant;

a low-temperature side heat medium circuit through which the heat medium cooled by the chiller circulates; and a controller, wherein the low-temperature side heat medium circuit includes:

a first circuit having a first heat exchanger configured to cool a first temperature adjustment target by heat exchange between the heat medium cooled by the chiller and the first temperature adjustment target associated with a predetermined first temperature zone, the first circuit being configured to circulate the heat medium via the chiller and the first heat exchanger;

a second circuit having a second heat exchanger configured to exchange heat between a second temperature adjustment target associated with a second temperature zone higher than the first temperature zone and the heat medium cooled by the chiller, the second circuit being configured to circulate the heat medium via the second heat exchanger;

a coupling part configured to connect the first circuit and the second circuit and to flow in and out of the heat medium; and a flow rate adjustment valve configured to adjust a flow rate of the heat medium flowing in and out between the first circuit and the second circuit, the controller is configured to control an operation of the flow rate adjustment valve and to adjust the flow rate of the heat medium in the coupling part, to make a temperature of the heat medium flowing through the first circuit at the first temperature zone and a temperature of the heat medium flowing through the second circuit at the second temperature zone have respective values, the first temperature adjustment target is outside air, the first heat exchanger is an outside air heat exchanger that exchanges heat between the heat medium cooled by the chiller and the outside air, the second temperature adjustment target is a heat generating equipment that generates heat when being operated, and the second heat exchanger is an equipment heat exchanger that exchanges heat between the heat medium cooled by the chiller and the heat generating equipment to adjust a temperature of the heat generating equipment.

7. A thermal management system comprising:

a heat pump cycle including a compressor configured to compress and discharge a refrigerant, a condenser configured to condense the refrigerant discharged from the compressor, a decompression unit configured to decompress the refrigerant flowing out of the condenser, and a chiller configured to exchange heat between the refrigerant decompressed by the decompression unit and a heat medium to evaporate the refrigerant;

a low-temperature side heat medium circuit through which the heat medium cooled by the chiller circulates; and a controller, wherein the low-temperature side heat medium circuit includes:

a first circuit having a first heat exchanger configured to cool a first temperature adjustment target by heat exchange between the heat medium cooled by the chiller and the first temperature adjustment target associated with a predetermined first temperature zone, the first circuit being configured to circulate the heat medium via the chiller and the first heat exchanger;

a second circuit having a second heat exchanger configured to exchange heat between a second temperature adjustment target associated with a second temperature zone higher than the first temperature zone and the heat medium cooled by the chiller, the second circuit being configured to circulate the heat medium via the second heat exchanger;

a coupling part configured to connect the first circuit and the second circuit and to flow in and out of the heat medium; and a flow rate adjustment valve configured to adjust a flow rate of the heat medium flowing in and out between the first circuit and the second circuit, the controller is configured to control an operation of the flow rate adjustment valve and to adjust the flow rate of the heat medium in the coupling part, to make a temperature of the heat medium flowing through the first circuit at the first temperature zone and a temperature of the heat medium flowing through the second circuit at the second temperature zone have respective values, the low-temperature side heat medium circuit includes:

a third circuit having a third heat exchanger configured to exchange heat between a third temperature adjustment target associated with a third temperature zone higher than the first temperature zone and the heat medium cooled by the chiller, and a low-temperature side pump configured to pump the heat medium and to flow through the third heat exchanger, the third circuit being configured to allow the heat medium to circulate via the third heat exchanger and the low-temperature side pump;

a low-temperature side coupling part configured to connect the first circuit and the third circuit and to flow in and out the heat medium; and a low-temperature side flow rate adjustment valve configured to adjust, in the low-temperature side coupling part, a flow rate of the heat medium flowing in and out between the first circuit and the third circuit, and the controller is configured to control an operation of the low-temperature side flow rate adjustment valve and to cause a part of the heat medium flowing through the first circuit to flow into the third circuit via the low-temperature side coupling part, so as to bring a temperature of the heat medium flowing through the first circuit close to the first temperature zone and bring a temperature of the heat medium flowing through the third circuit close to the third temperature zone, respectively.

8. A thermal management system comprising:

a heat pump cycle including a compressor configured to compress and discharge a refrigerant, a condenser configured to condense the refrigerant discharged from the compressor, a decompression unit configured to decompress the refrigerant flowing out of the condenser, and a chiller configured to exchange heat between the refrigerant decompressed by the decompression unit and a heat medium to evaporate the refrigerant;

a low-temperature side heat medium circuit through which the heat medium cooled by the chiller circulates;

a high-temperature side heat medium circuit in which the heat medium, heated by the heat of the refrigerant dissipated in the condenser, circulates, and a controller, wherein the low-temperature side heat medium circuit includes:

a first circuit having a first heat exchanger configured to cool a first temperature adjustment target by heat exchange between the heat medium cooled by the chiller and the first temperature adjustment target associated with a predetermined first temperature zone, the first circuit being configured to circulate the heat medium via the chiller and the first heat exchanger;

a second circuit having a second heat exchanger configured to exchange heat between a second temperature adjustment target associated with a second temperature zone higher than the first temperature zone and the heat medium cooled by the chiller, the second circuit being configured to circulate the heat medium via the second heat exchanger;

a coupling part configured to connect the first circuit and the second circuit and to flow in and out of the heat medium; and a flow rate adjustment valve configured to adjust a flow rate of the heat medium flowing in and out between the first circuit and the second circuit, the controller is configured to control an operation of the flow rate adjustment valve and to adjust the flow rate of the heat medium in the coupling part, to make a temperature of the heat medium flowing through the first circuit at the first temperature zone and a temperature of the heat medium flowing through the second circuit at the second temperature zone have respective values, the high-temperature side heat medium circuit includes:

a heater core configured to heat air to be supplied to the space to be air conditioned by exchanging heat between the heat medium heated by the heat of the refrigerant and air; and a high-temperature side pump that pumps the heat medium to the heater core, the high-temperature side heat medium circuit being configured to allow the heat medium to circulate via the heater core and the high-temperature side pump;

a high-temperature side coupling part that connects the high-temperature side heat medium circuit and the second circuit of the low-temperature side heat medium circuit, to allow the heat medium to flow in and out; and a high-temperature side flow rate adjustment valve configured to adjust, in the high-temperature side coupling part, a flow rate of the heat medium flowing in and out between the high-temperature side heat medium circuit and the second circuit, and the controller is configured to control an operation of the high-temperature side flow rate adjustment valve and to cause a part of the heat medium flowing through the high-temperature side heat medium circuit to flow into the second circuit via the high-temperature side coupling part, so as to bring a temperature of the heat medium flowing through the second circuit close to the second temperature zone.

* * * * *